(12) United States Patent
Scott et al.

(10) Patent No.: US 12,291,246 B2
(45) Date of Patent: May 6, 2025

(54) RAILROAD CAR HAVING MULTIPLE PENETRATION RESISTANT AND PROTECTIVE STRUCTURES

(71) Applicant: CNGMOTIVE, INC., Frankfort, IL (US)

(72) Inventors: David I. Scott, Frankfort, IL (US); Pedro T. Santos, Houston, TX (US); Robert Thomas Scott, Shorewood, IL (US)

(73) Assignee: CNGMOTIVE, INC., Frankfort, IL (US)

( * ) Notice: Subject to any disclaimer, the term of this patent is extended or adjusted under 35 U.S.C. 154(b) by 839 days.

(21) Appl. No.: 17/491,653

(22) Filed: Oct. 1, 2021

(65) Prior Publication Data

US 2022/0041191 A1 Feb. 10, 2022

Related U.S. Application Data

(63) Continuation of application No. 16/214,531, filed on Dec. 10, 2018, now Pat. No. 11,142,224.
(Continued)

(51) Int. Cl.
*B61D 5/06* (2006.01)
*B61D 5/00* (2006.01)
(Continued)

(52) U.S. Cl.
CPC .............. *B61D 5/06* (2013.01); *B61D 5/00* (2013.01); *B61D 5/02* (2013.01); *B61D 15/06* (2013.01);
(Continued)

(58) Field of Classification Search
CPC . B61D 5/02; B61D 5/00; B61D 15/06; B61D 5/06; B61D 17/10; B61D 17/06; B61D 17/08; B61D 17/12; B61G 7/14
See application file for complete search history.

(56) References Cited

U.S. PATENT DOCUMENTS 308,948 A 12/1884 Bruce
1,453,476 A * 5/1923 Mauran .................... B61D 5/02
410/68
(Continued)

FOREIGN PATENT DOCUMENTS

CA 2827019 A1 3/2015
WO 2014031999 A2 2/2014
(Continued)

OTHER PUBLICATIONS

"Extended European Search Report", from corresponding European Patent Application No. 18888411.8 (11 pages), Aug. 19, 2021.
(Continued)

*Primary Examiner* — Zachary L Kuhfuss
*Assistant Examiner* — Cheng Lin
(74) *Attorney, Agent, or Firm* — Neal, Gerber & Eisenberg LLP

(57) ABSTRACT

A railroad car including a plurality of penetration resistant and protective structures including a penetration resistant and protective underframe, penetration resistant and protective first end, second end, and center bulkheads, penetration resistant and protective first, second, third, and fourth side walls, and protective first and second roof hatches, all configured to protect internal cylinder assemblies, the pipes that communicate the gas from the cylinders of the cylinder assemblies, and the safety critical valves, regulators, and other equipment connected to such cylinders and pipes of the railroad car in an accident (such as a derailment, crash and/or roll-over).

18 Claims, 56 Drawing Sheets

Related U.S. Application Data

(60) Provisional application No. 62/656,019, filed on Apr. 11, 2018, provisional application No. 62/597,783, filed on Dec. 12, 2017.

(51) Int. Cl.

| | | |
|---|---|---|
| *B61D 5/02* | (2006.01) | |
| *B61D 15/06* | (2006.01) | |
| *B61D 17/06* | (2006.01) | |
| *B61D 17/08* | (2006.01) | |
| *B61D 17/10* | (2006.01) | |
| *B61D 17/12* | (2006.01) | |
| *B61G 7/14* | (2006.01) | |

(52) U.S. Cl.
CPC .............. *B61D 17/06* (2013.01); *B61D 17/08* (2013.01); *B61D 17/10* (2013.01); *B61D 17/12* (2013.01); *B61G 7/14* (2013.01)

(56) References Cited

U.S. PATENT DOCUMENTS

| | | | |
|---|---|---|---|
| 1,523,252 A * | 1/1925 | Bradley | B61D 5/02 105/362 |
| 1,631,304 A * | 6/1927 | Willoughby | B61D 5/02 105/362 |
| 1,937,617 A * | 12/1933 | Willoughby | B61D 5/02 280/830 |
| 2,024,411 A * | 12/1935 | Willoughby | B61D 5/02 280/830 |
| 2,760,446 A | 8/1956 | Michael | |
| 6,076,471 A | 6/2000 | Burian et al. | |
| 6,279,217 B1 | 8/2001 | Gallinger et al. | |
| 6,378,444 B1 | 4/2002 | Dastas et al. | |
| 7,004,080 B2 | 2/2006 | Creighton et al. | |
| 7,905,693 B2 | 3/2011 | Ramirez et al. | |
| 9,255,506 B2 * | 2/2016 | Cook | F01N 3/20 |
| 9,260,118 B2 | 2/2016 | Douglas et al. | |
| 2002/0174796 A1 | 11/2002 | Kumar et al. | |
| 2004/0094561 A1 | 5/2004 | Degutis et al. | |
| 2007/0284156 A1 | 12/2007 | Grady et al. | |
| 2008/0223250 A1 | 9/2008 | Bachman | |
| 2009/0126600 A1 * | 5/2009 | Zupancich | B65D 90/06 220/592.2 |
| 2010/0199881 A1 | 8/2010 | Clark et al. | |
| 2013/0199406 A1 | 8/2013 | Kanda | |
| 2014/0033738 A1 | 2/2014 | Billig et al. | |
| 2014/0033945 A1 | 2/2014 | Foege et al. | |
| 2015/0184618 A1 | 7/2015 | Lee et al. | |
| 2015/0233282 A1 | 8/2015 | Bandyopadhyay | |
| 2015/0367736 A1 | 12/2015 | Salomonsen | |
| 2015/0377153 A1 | 12/2015 | Gallagher et al. | |
| 2016/0236694 A1 | 8/2016 | Frazier et al. | |
| 2017/0145961 A1 * | 5/2017 | Myers | B61D 17/00 |
| 2017/0361702 A1 | 12/2017 | Scott et al. | |
| 2018/0111475 A1 | 4/2018 | Wexler et al. | |

FOREIGN PATENT DOCUMENTS

| | | |
|---|---|---|
| WO | 2014153110 A2 | 9/2014 |
| WO | 2017106204 A1 | 6/2017 |
| WO | 2018106530 A1 | 6/2018 |

OTHER PUBLICATIONS

"Filament Winding of Carbon Fiber and Fiberglass Structures", http://advancedcomposites.com/manufacturing-techniques/filament-winding, May 19, 2016.
"International Search Report and Written Opinion", From PCT/US2018/064894, Mar. 15, 2019.
"Part I M-1004 Specifications for Fuel Tenders", AAR Manual of Standards and Recommended Practices Interoperable Fuel Tenders for Locomotives (148 pages), Aug. 1, 2017.

\* cited by examiner

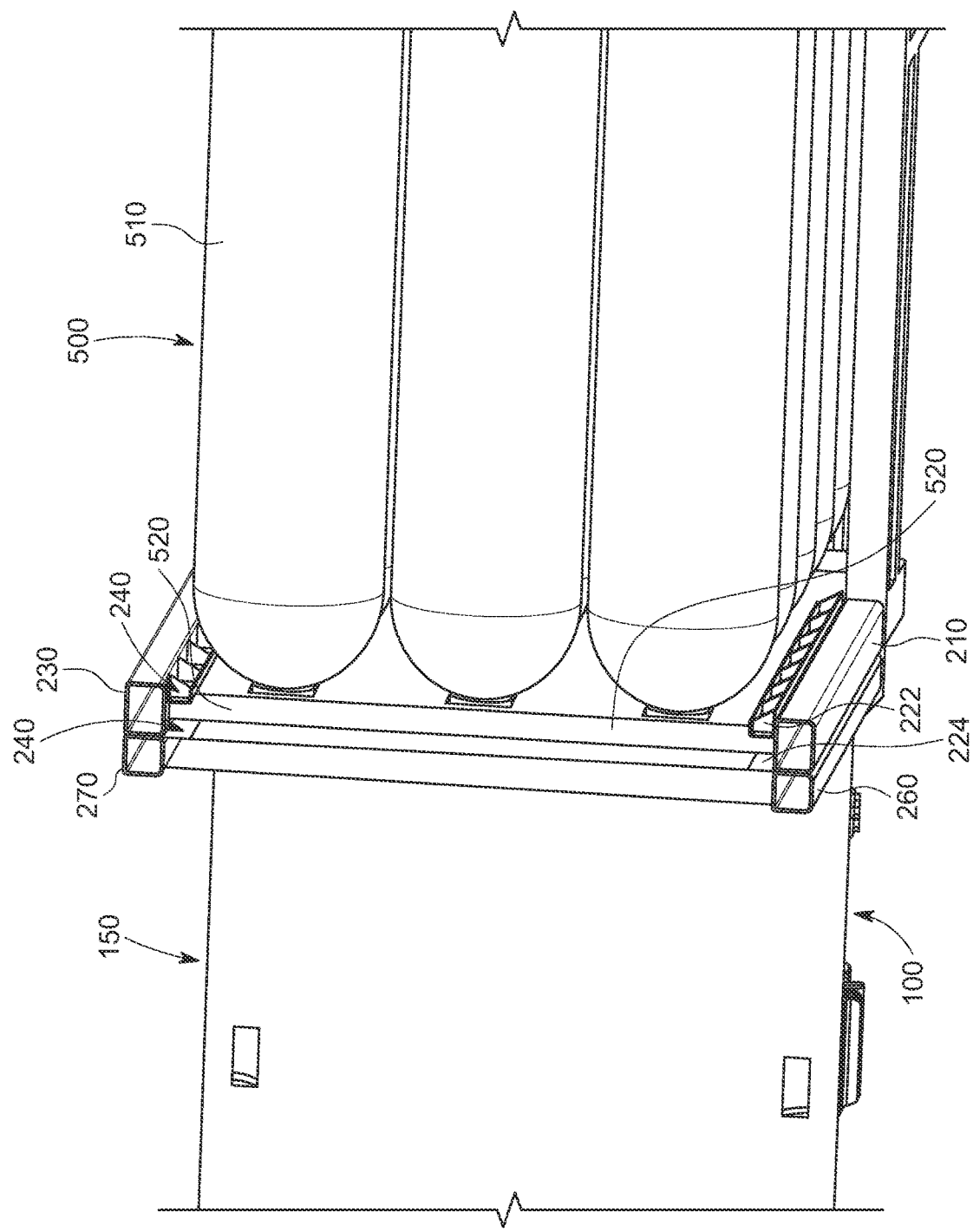

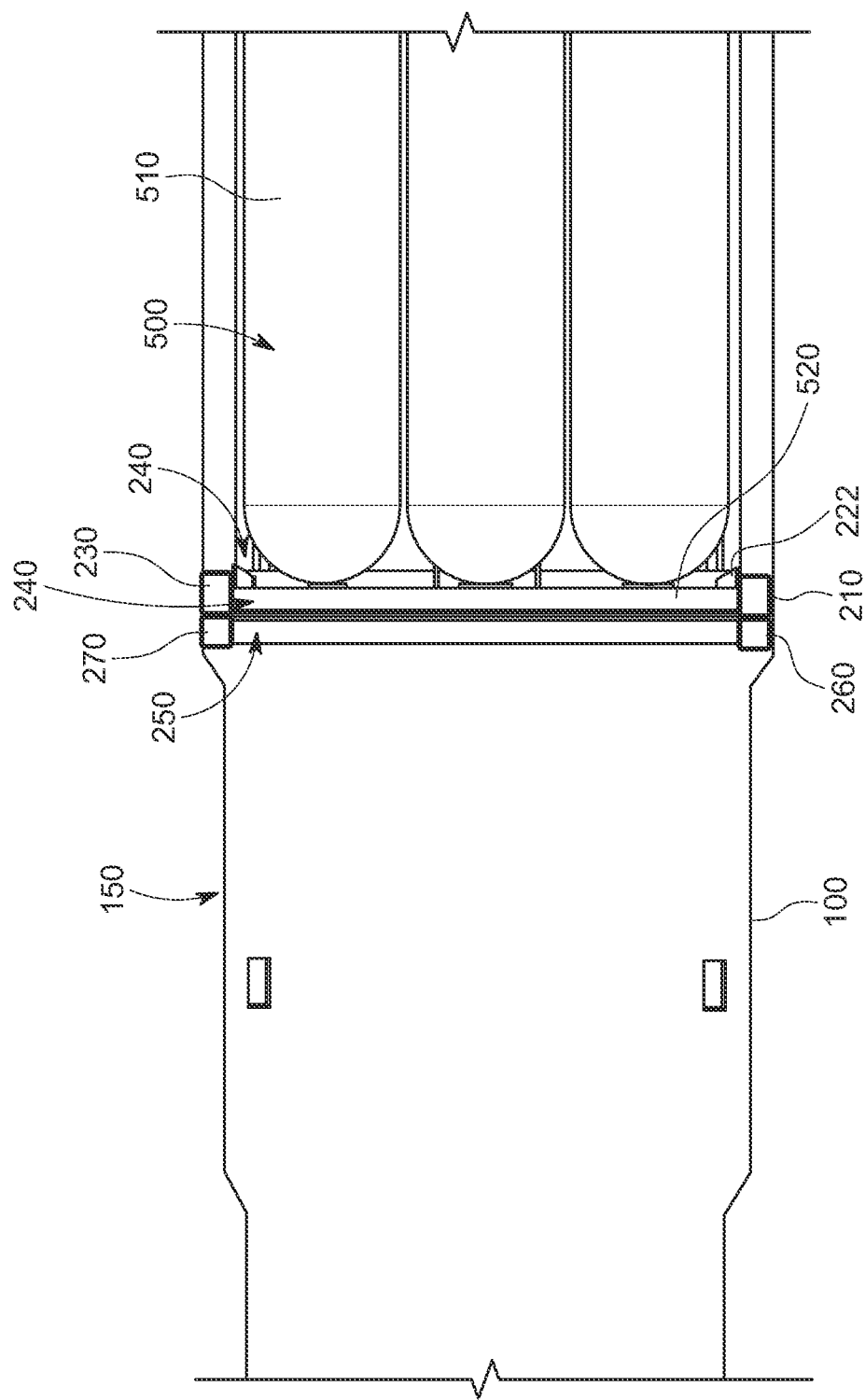

RAILROAD CAR HAVING MULTIPLE PENETRATION RESISTANT AND PROTECTIVE STRUCTURES

PRIORITY CLAIM

This continuation application claims priority to and the benefit of U.S. Non-Provisional patent application Ser. No. 16/214,531, filed Dec. 10, 2018, which claims priority to and the benefit of U.S. Provisional Patent Application No. 62/597,783, filed Dec. 12, 2017, and U.S. Provisional Patent Application No. 62/656,019, filed Apr. 11, 2018, the entire contents of each are incorporated herein by reference.

FIELD

This disclosure generally relates to railroad cars having at least one and particularly multiple penetration resistant and protective structures.

BACKGROUND

Railroad cars and trains are widely employed to transport a variety of contents. Various conventional railroad trains are powered by one or more locomotives. Many conventional locomotives have one or more diesel combustion engines. Diesel combustion engines typically release significant amounts of pollutants into the atmosphere. To reduce pollution, certain known locomotives burn natural gas instead of diesel fuel. Combustion of natural gas is cleaner than combustion of diesel and thus produce less pollutants. Thus, there is an increasing interest in the railroad industry to use natural gas burning locomotives in part due to these relatively lower emissions and also in part due to the relatively lower cost for natural gas.

Various different natural gas burning locomotives have been proposed and configured. Various such locomotives require a separate railroad car (sometimes referred to in the railroad industry as a fuel tender) that contains natural gas storage cylinders that store the natural gas for use by the locomotive. These proposed fuel tenders store the natural gas in the form of liquid natural gas (LNG) or in the form of compressed natural gas (CNG). Such proposed fuel tenders need to be connectable to the locomotive to supply the natural gas from the fuel tender to the locomotive (and its engine(s)).

Such natural gas locomotives and fuel tenders pose certain new sets of challenges for the railroad industry. One such set of challenges relates to safety. To provide sufficient quantities of compressed natural gas to power a locomotive, the natural gas must be stored in the cylinders under compression. If these cylinders are impacted during an accident (such as a derailment, crash, or roll-over of the fuel tender), there is a possibility that a cylinder will leak natural gas and present an ignition hazard.

To address these challenges, the Association of American Railroads (AAR), which regulates the characteristics of the railroad cars and locomotives used in wide spread service in North America, has thus promulgated various requirements for such fuel tenders. AAR regulation M-1004 provides a specific set of requirements for tenders for alternative fuels. For example, part of M-1004 states that as a result of certain foreseeable accident conditions: "No part of the fuel tank shall be punctured, split, crushed, or otherwise damaged so as to result in the release of fuel. The only acceptable fuel release allowed is that contained in piping external to the fuel tanks. All fuel tanks on the tender shall be capable of meeting this result."

Accordingly, there is a need to provide railroad cars that meet these AAR requirements and that are better able to protect the contents stored inside such fuel tender railroad cars (and particularly, but not limited to, the cylinders that contain compressed natural gas, the pipes that communicate the gas from the cylinders, and the safety critical valves, regulators, and other equipment connected to such cylinders and pipes) when the railroad cars undergo various situations such as accidents (and particularly, derailments, crashes, and/or roll-overs), and including various situations where the accident causes the fuel tender railroad car to come to rest aligned the rails or transverse to the rails.

SUMMARY

Various embodiments of the present disclosure solve the above problems by a railroad car that functions as a fuel tender and that has multiple penetration resistant and otherwise protective structures that independently and in combination co-act to protect the equipment in the railroad car (and particularly the cylinders that contain compressed natural gas, the pipes that communicate the gas from the cylinders, and the safety critical valves, regulators, and other equipment connected to such cylinders and pipes) when the railroad car undergoes various situations such as an accident (and particularly, a derailment, a crash, and/or a roll-over).

Various embodiments of the present disclosure provide railroad car including: (1) a first truck; (2) a second truck; (3) a penetration resistant and protective underframe supported by the first and second car trucks; (4) a penetration resistant and protective first end bulkhead integrally connected to the underframe; (5) a penetration resistant and protective second end bulkhead integrally connected to the underframe; (6) a penetration resistant and protective center bulkhead integrally connected to the underframe; (7) a first cylinder assembly integrally connected to the first end bulkhead, integrally connected to the center bulkhead, and integrally connected to the underframe; (8) a second cylinder assembly integrally connected to the second end bulkhead, integrally connected to the center bulkhead, and integrally connected to the underframe; (9) a penetration resistant and protective first side wall integrally connected to the first end bulkhead, integrally connected to the center bulkhead, and integrally connected to the underframe; (10) a penetration resistant and protective second side wall integrally connected to the second end bulkhead, integrally connected to the center bulkhead, and integrally connected to the underframe; (11) a penetration resistant and protective third side wall integrally connected to the first end bulkhead, integrally connected to the center bulkhead, and integrally connected to the underframe; (12) a penetration resistant and protective fourth side wall integrally connected to the second end bulkhead, integrally connected to the center bulkhead, and integrally connected to the underframe; (13) a first roof hatch integrally connected to the first side wall, integrally connected to the third side wall, integrally connected to the first end bulkhead, and integrally connected to center bulkhead; and (14) a second roof hatch integrally connected to the second side wall, integrally connected to the fourth side wall, integrally connected to the second end bulkhead, and integrally connected to center bulkhead.

In various such embodiments, each of the underframe, the first end bulkhead, the second end bulkhead, the center bulkhead, the first side wall, the second side wall, the third side wall, and the fourth side wall include one or more penetration resistant and otherwise protective components or structures that are configured to protect the cylinder assemblies, the pipes that communicate the gas from the cylinders, and the safety critical valves, regulators, and other equipment connected to such cylinders and pipes in case the railroad car is in an accident (such as a derailment, crash and/or roll-over).

As further discussed below, the present disclosure contemplates that one or more of these structures may be alternatively configured than described herein, one or more of these structures may be otherwise connected than described herein, and one or more of these features may be eliminated or replaced with an alternative structures.

Additional features are described herein, and will be apparent from, the following Detailed Description and the Figures.

BRIEF DESCRIPTION OF THE DRAWINGS

For a better understanding of the present disclosure, reference is made to example embodiments shown in the following drawings. The components shown in the drawings are not necessarily to scale and various components may be omitted for clarity, and, in certain instances proportions have been exaggerated so as to illustrate various features of the present disclosure.

FIG. 28 is an enlarged fragmentary top perspective view of the underframe, the first cylinder assembly, and the first end bulkhead of the railroad car of FIG. 1.

FIG. 29 is an enlarged fragmentary top view of the underframe, the first cylinder assembly, and the first end bulkhead of the railroad car of FIG. 1.

DETAILED DESCRIPTION OF EXAMPLE EMBODIMENTS

Figure 1:
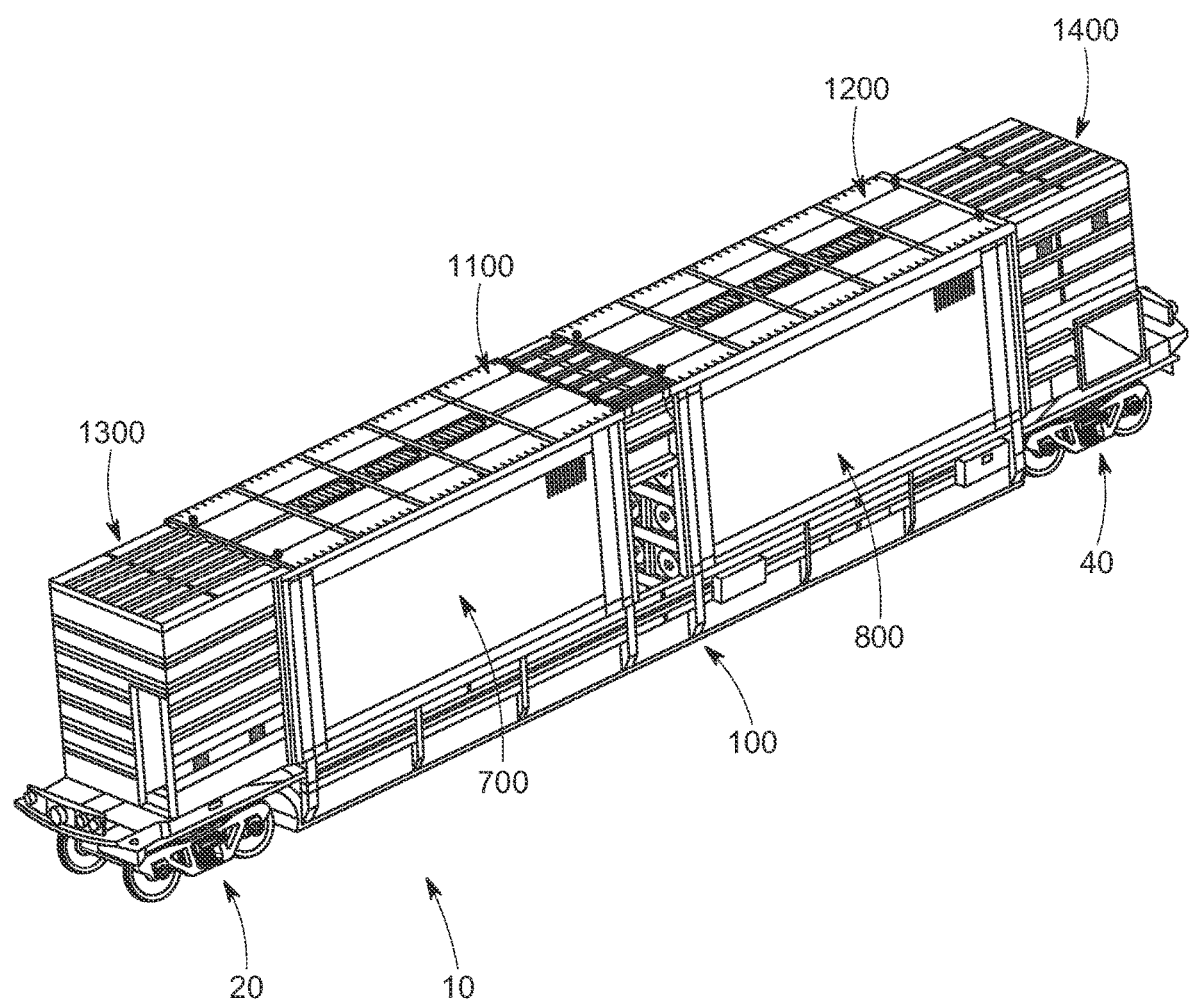
FIG. 1 is a top perspective view of one example embodiment of the railroad car having multiple penetration resistant and protective structures of the present disclosure.

While the systems, devices, and methods described herein may be embodied in various forms, the drawings show and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

Directions and orientations herein refer to the normal orientation of a railroad car in use. Thus, unless the context clearly requires otherwise, the "longitudinal" or "lengthwise" axis or direction is substantially parallel to straight tracks or rails and in the direction of movement of the railroad car on the track or rails in either direction. The "transverse" or "lateral" axis or direction is in a horizontal direction substantially perpendicular to the longitudinal axis and the straight tracks or rails. The "leading" end of the railroad car means the first end of the railroad car to encounter a turn, and the "trailing" end of the railroad car is opposite of the leading end.

Referring now to the drawings, and particularly to FIGS. 1 to 45, one example railroad car having multiple penetration resistant and otherwise protective structures of one embodiment of the present disclosure is generally shown and indicated by numeral 10. This example railroad car 10 generally includes: (1) a penetration resistant and protective underframe 100 suitably connected to and supported by conventional first and second car trucks 20 and 40; (2) a penetration resistant and protective first end bulkhead 200; (3) a penetration resistant and protective second end bulkhead 300; (4) a penetration resistant and protective center bulkhead 400; (5) a first cylinder assembly 500; (6) a second cylinder assembly 600; (7) a penetration resistant and protective first side wall 700; (8) a penetration resistant and protective second side wall 800; (9) a penetration resistant and protective third side wall 900; (10) a penetration resistant and protective fourth side wall 1000; (11) a first roof hatch 1100; and (12) a second roof hatch 1200. Although not shown, the example railroad car 10 further includes: the pipes that communicate the gas from the cylinders, and the safety critical valves, regulators, and other equipment connected to such cylinders and pipes.

The underframe 100, the first end bulkhead 200, the second end bulkhead 300, the center bulkhead 400, the first side wall 700, the second side wall 800, the third side wall 900, the fourth side wall 1000, the first roof hatch 1100, and the second roof hatch 1200 are individually and in combination configured to protect the cylinders of the cylinder assemblies 500 and 600, as well as the pipes that communicate the gas from the cylinders, and the safety critical valves, regulators, and other equipment connected to such cylinders and pipes in accidents involving the railroad car 10. These components individually and in combination are configured to deform, absorb forces, spread out forces, and otherwise protect the cylinders of the cylinder assemblies 500 and 600, as well as the pipes that communicate the gas from the cylinders, and the safety critical valves, regulators, and other equipment connected to such cylinders and pipes in such accidents. These components individually and in combination are thus configured to function as sacrificial components to protect the cylinders of the cylinder assemblies 500 and 600, as well as the pipes that communicate the gas from the cylinders, and the safety critical valves, regulators, and other equipment connected to such cylinders and pipes in accidents involving the railroad car 10. These components individually and in combination are thus configured to function as a system to protect against the consequences of accidents where part of the railroad cars is partially on or partially off the rails in a moving manner (wherein it can engage various objects) or in a stationary manner. These components individually and in combination are configured to satisfy (and in various instances exceed) the safety requirements set forth in the AAR regulation M-1004 for tenders for alternative fuels as specified above.

In this example railroad car 10: (1) the first end bulkhead 200 is suitably connected to the underframe 100; (2) the second end bulkhead 300 is suitably connected to the underframe 100; (3) the center bulkhead 400 is suitably connected to the underframe 100; (4) the first cylinder assembly 500 is suitably connected to the first end bulkhead 200 and the center bulkhead 400 and thus supported by the underframe 100; (5) the second cylinder assembly 600 is suitably connected to the second end bulkhead 300 and the center bulkhead 400 and thus supported by the underframe 100; (6) the first side wall 700 is suitably connected to the first end bulkhead 200, the center bulkhead 400, and the underframe 100; (7) the second side wall 800 is suitably connected to the second end bulkhead 300, the center bulkhead 400, and the underframe 100; (8) the third side wall 900 is suitably connected to the first end bulkhead 200, the center bulkhead 400, and the underframe 100; (9) the fourth side wall 1000 is suitably connected to the second end bulkhead 300, the center bulkhead 400, and the underframe 100; (10) the first roof hatch 1100 is suitably connected to the first end bulkhead 200, the center bulkhead 400, the first sidewall 700, and the third sidewall 900 and thus indirectly supported by the underframe 100; and (11) the second roof hatch 1200 is suitably connected to the second end bulkhead 300, the center bulkhead 400, the second sidewall 800, and the fourth sidewall 1000 and thus indirectly supported by the underframe 100.

This example railroad car 10 also generally includes: (1) a first end mechanical component storage compartment 1300 suitably connected to and supported by the first (or leading) end of the underframe 100; and (2) a second end mechanical and electrical component storage compartment 1400 suitably connected to and supported by the second (or trailing) end of the underframe 100. The first end mechanical component storage compartment 1300 and the second end mechanical and electrical component storage compartment 1400 are each configured to contain various mechanical and/or electrical components employed for the operation of the railroad car 10 and specifically including various mechanical and electrical components and controls for such components as the pipes that communicate the gas from the cylinders, and the safety critical valves, regulators, and other equipment connected to such cylinders and pipes needed for selectively supplying the gas stored in the cylinder assemblies 500 and 600 to one or more locomotives (not shown).

In certain example embodiments, the first end mechanical component storage compartment 1300 includes various gas pressure reduction apparatus (somewhat shown but not labeled in FIG. 2) configured to receive gas via gas communication pipes from the cylinder assemblies 500 and 600 at a high pressure and reduce the pressure of gas for supply to one or more locomotives. It should be appreciated that the various other mechanical and electrical components can be positioned in the first end mechanical component storage compartment.

In certain example embodiments, the second end mechanical and electrical component storage compartment 1400 contains suitable control system(s) (somewhat shown but not labeled in FIG. 2) and brake equipment (not shown) for the railroad car 10. It should be appreciated that the various other mechanical components can be positioned in the second end mechanical component storage compartment.

It should also be appreciated that the example railroad car 10 of this illustrated example includes suitable conventional car trucks 20 and 40. It should also be appreciated that the railroad cars of the present disclosure such as the example railroad car 10 will include various other conventional components of a railroad car such as but not limited to: (1) coupler assemblies and equipment (not shown); (2) braking assemblies and equipment (not shown); etc. It should thus be appreciated that the various other mechanical components (other than the components in these two compartments) can be employed for the operation of the railroad car 10, as will be readily understood by one of ordinary skill in the railroad industry. It should be appreciated that such conventional assemblies and equipment are not shown or described herein for brevity and that one of ordinary skill in the art would readily understand such additional assemblies and equipment.

The railroad car of the present disclosure such as example railroad car 10 includes a plurality of separate penetration resistant and/or otherwise protective structures that are configured to work independently and work or co-act in combination to protect the individual cylinders 510 and 610 of each of the respective cylinder assemblies 500 and 600, the pipes that communicate the gas from the cylinders, and the safety critical valves, regulators, and other equipment connected to such cylinders and pipes, all from penetrating and other deforming or damaging forces that can occur from accidents in which the railroad car 10 can be involved. These penetration resistant and otherwise protective structures independently and in combination significantly reduce the likelihood that one or more of the cylinders 510 and 610, the pipes that communicate the gas from the cylinders, and the safety critical valves, regulators, and other equipment connected to such cylinders and pipes will be damaged in an accident, and thus significantly reduce the likelihood of a gas release and subsequent ignition hazard from of any of the cylinders 510 and 610 of the respective cylinder assemblies 500 and 600, the pipes that communicate the gas from the cylinders, and/or the safety critical valves, regulators, and other equipment connected to such cylinders and pipes. These specific penetration resistant and/or otherwise protective structures are described in more detail below with respect to each of the various components.

Underframe

More specifically, as best shown in FIGS. 7 to 15, the underframe 100 includes: (1) a penetration resistant and protective bottom wall 102; (2) a penetration resistant and protective first side wall 110 integrally connected to and extending upwardly from the bottom wall 102; (3) a penetration resistant and protective second side wall 140 integrally connected to and extending upwardly from the bottom wall 102 and spaced apart from the first side wall 110; (4) a penetration resistant and protective first end section 150 integrally connected to the bottom wall 102, the first side wall 110, and the second side wall 140; and (5) a penetration resistant and protective second end section 190 integrally connected to the bottom wall 102, the first side wall 110, and the second side wall 140. In this illustrated example embodiment, these components are all steel and are suitably welded to form such integral connections. The present disclosure provides that: (1) the size, shape, and configuration of these components may vary; (2) the material(s) that these components are made from may vary; and/or (3) the attachment mechanisms used to connect these components wall may vary.

Figure 2:
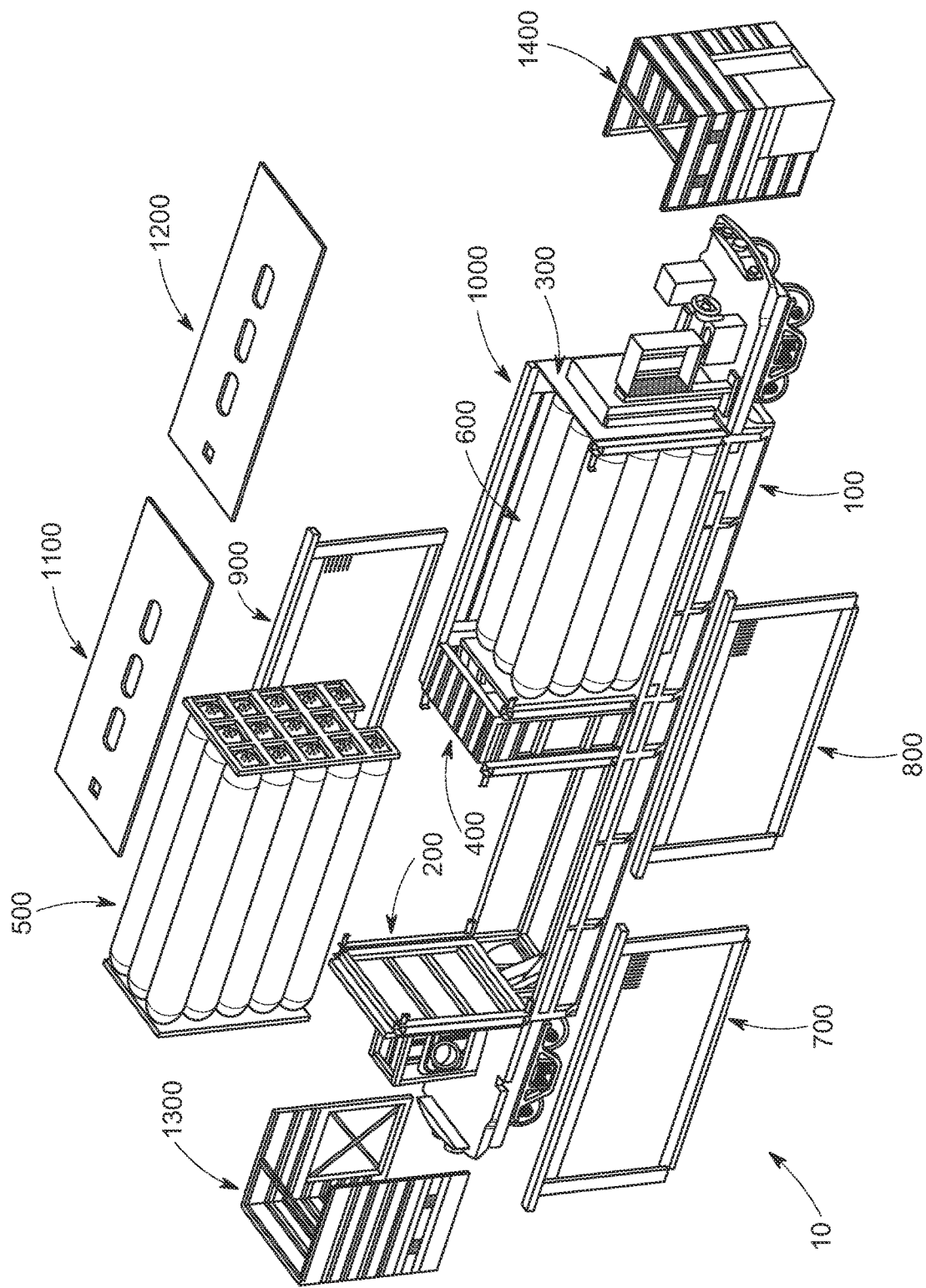
FIG. 2 is a partially exploded perspective view of the railroad car of FIG. 1.
Figure 3:
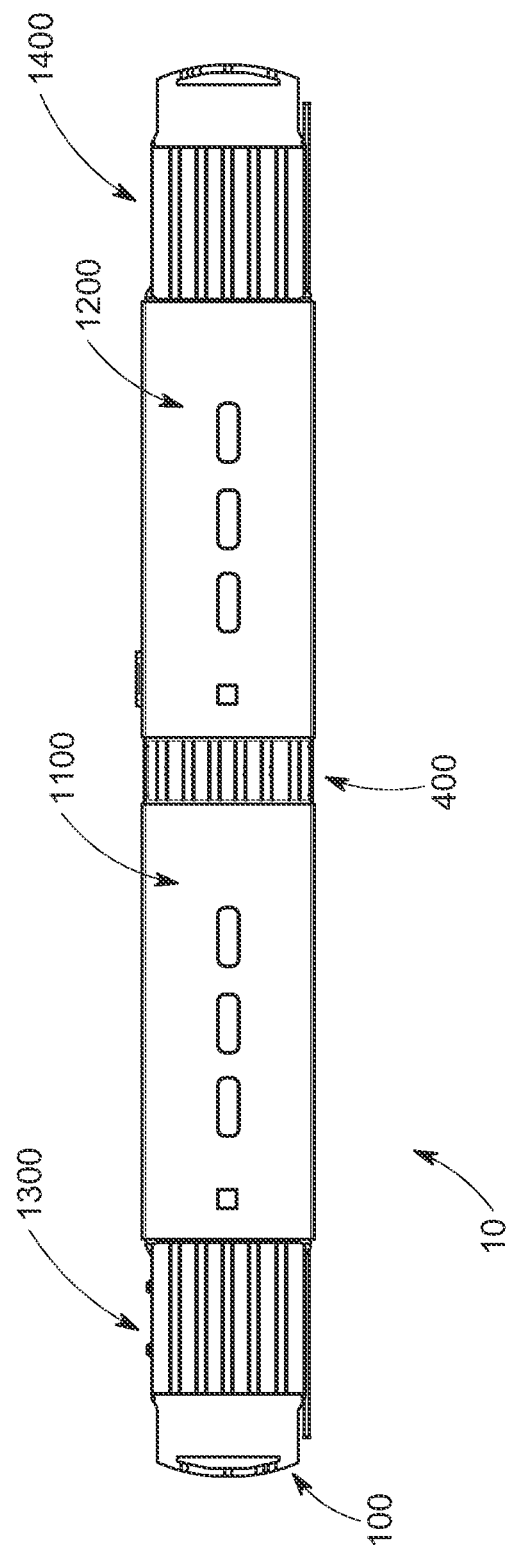
FIG. 3 is a top plan view of the railroad car of FIG. 1
Figure 4:
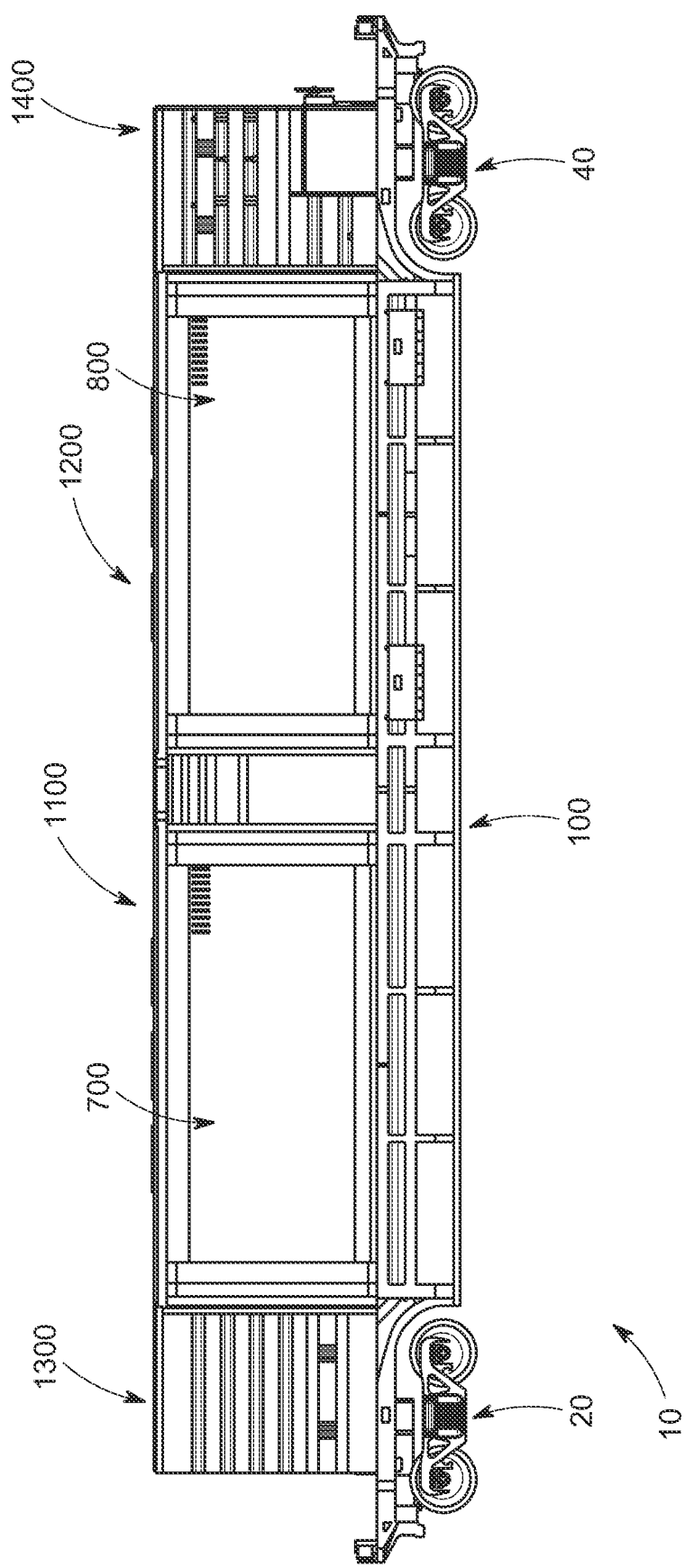
FIG. 4 is a first side view of the railroad car of FIG. 1.
Figure 5:
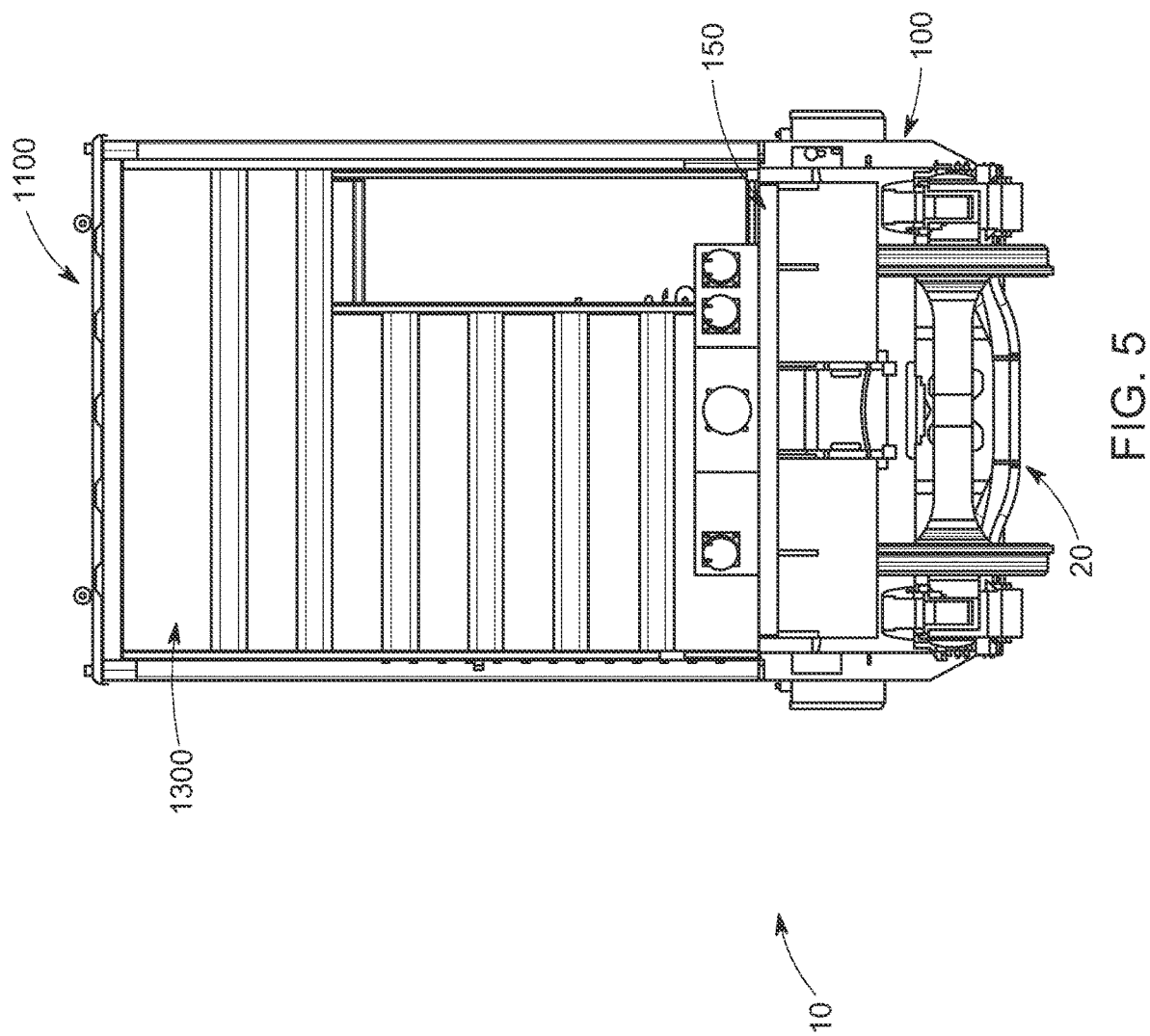
FIG. 5 is a first end view of the railroad car of FIG. 1.
Figure 6:
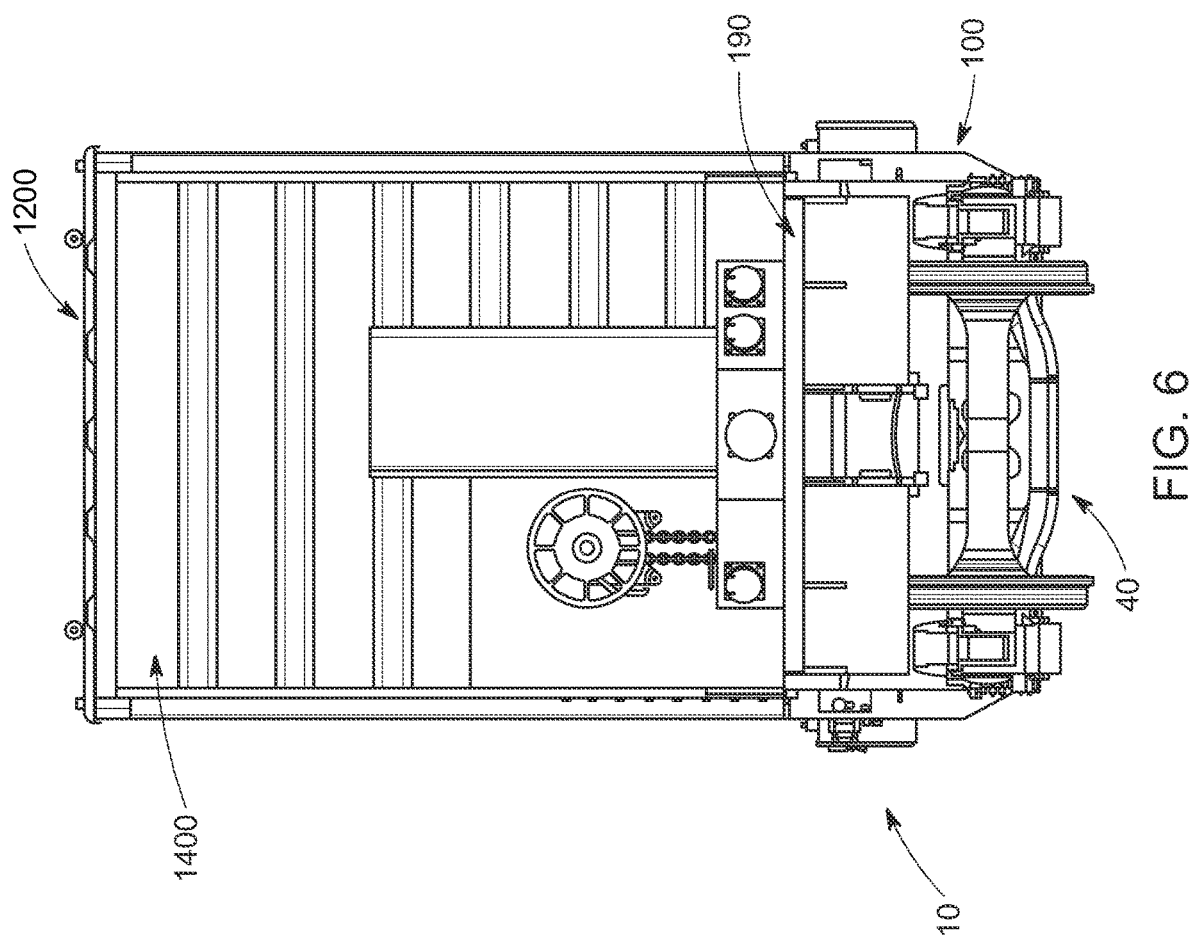
FIG. 6 is a second end view of the railroad car of FIG. 1 (which is opposite the first end view of FIG. 5).
Figure 7:
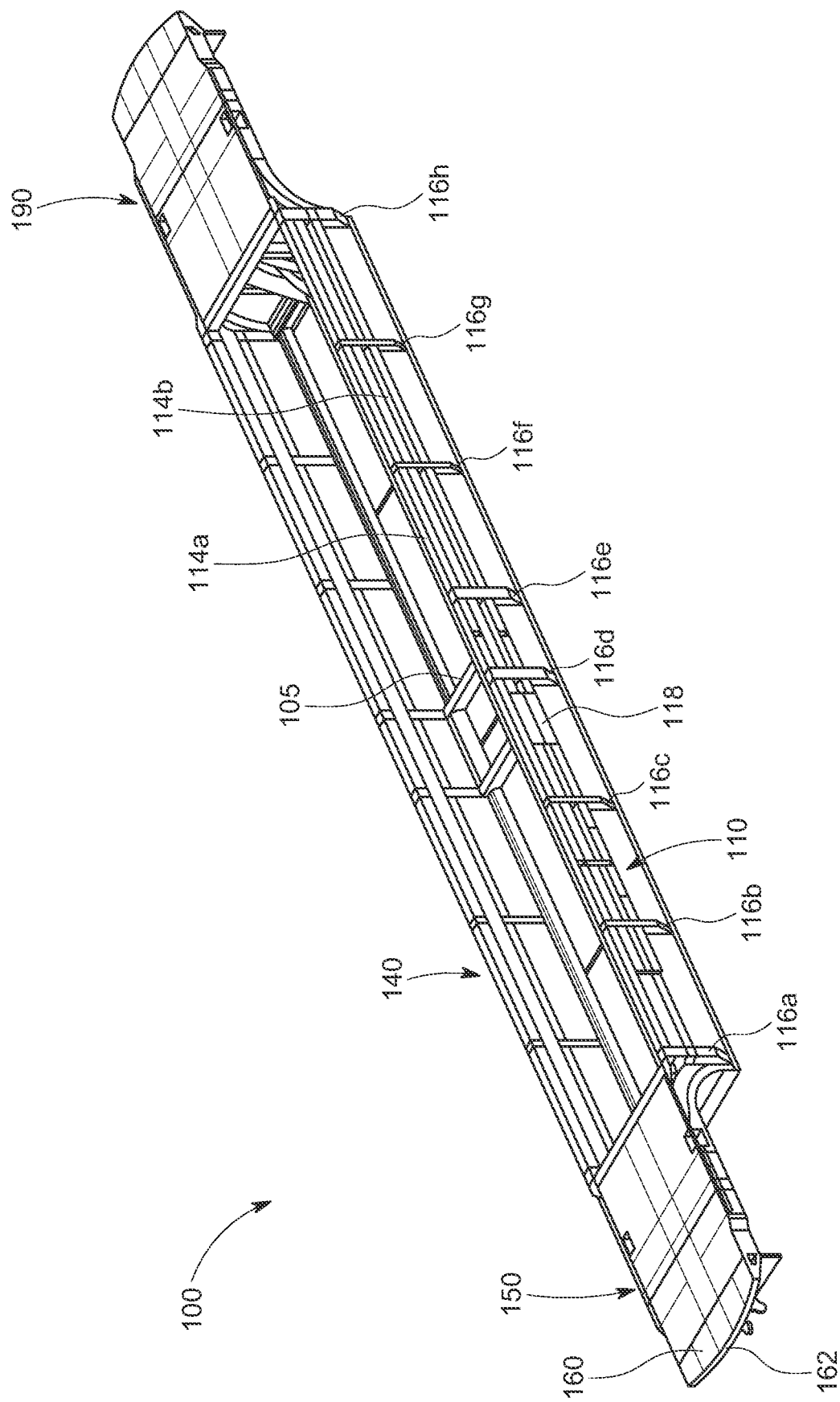
FIG. 7 is the top perspective view of the underframe of the railroad car of FIG. 1.
Figure 8:
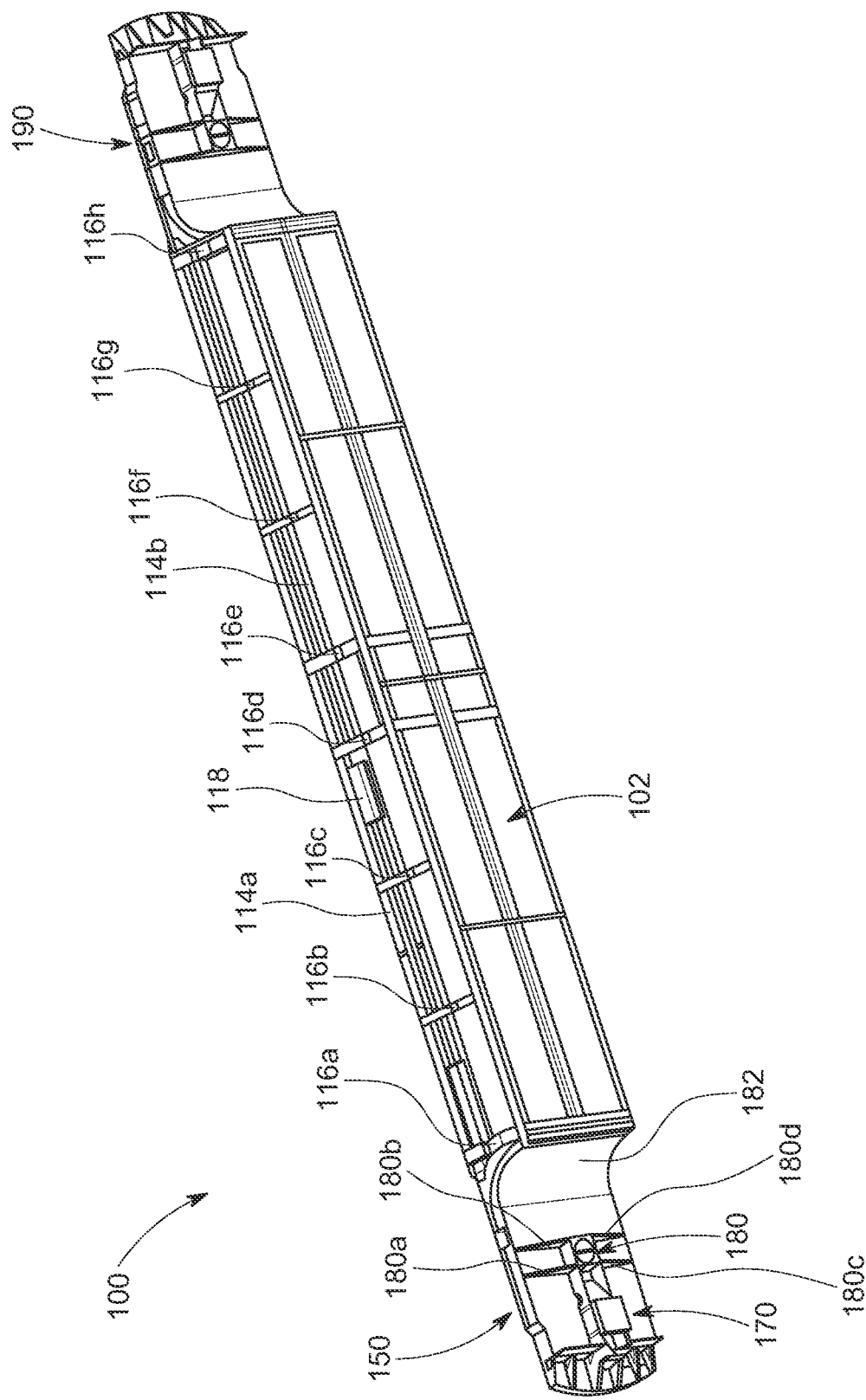
FIG. 8 is a bottom perspective view of the underframe of the railroad car of FIG. 1.
Figure 9:
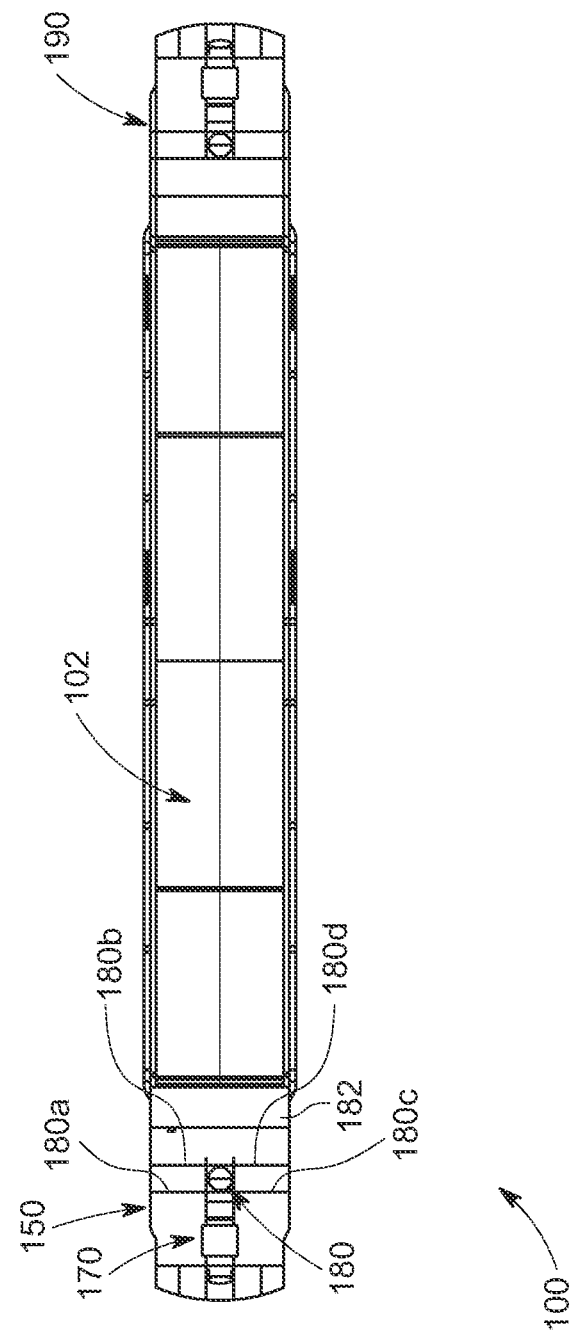
FIG. 9 is a bottom view of the underframe of the railroad car of FIG. 1.
Figure 10:
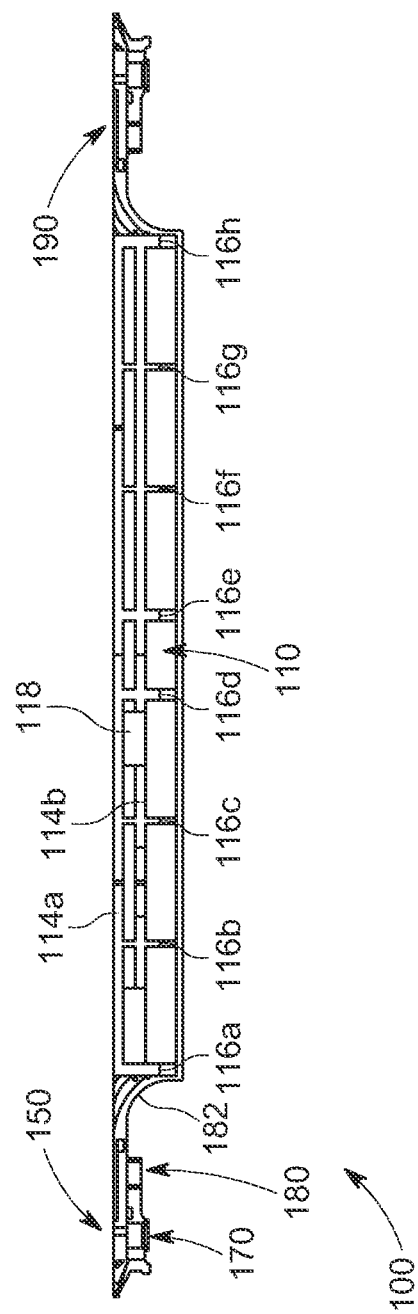
FIG. 10 is a first side view of the underframe of the railroad car of FIG. 1.
Figure 11:
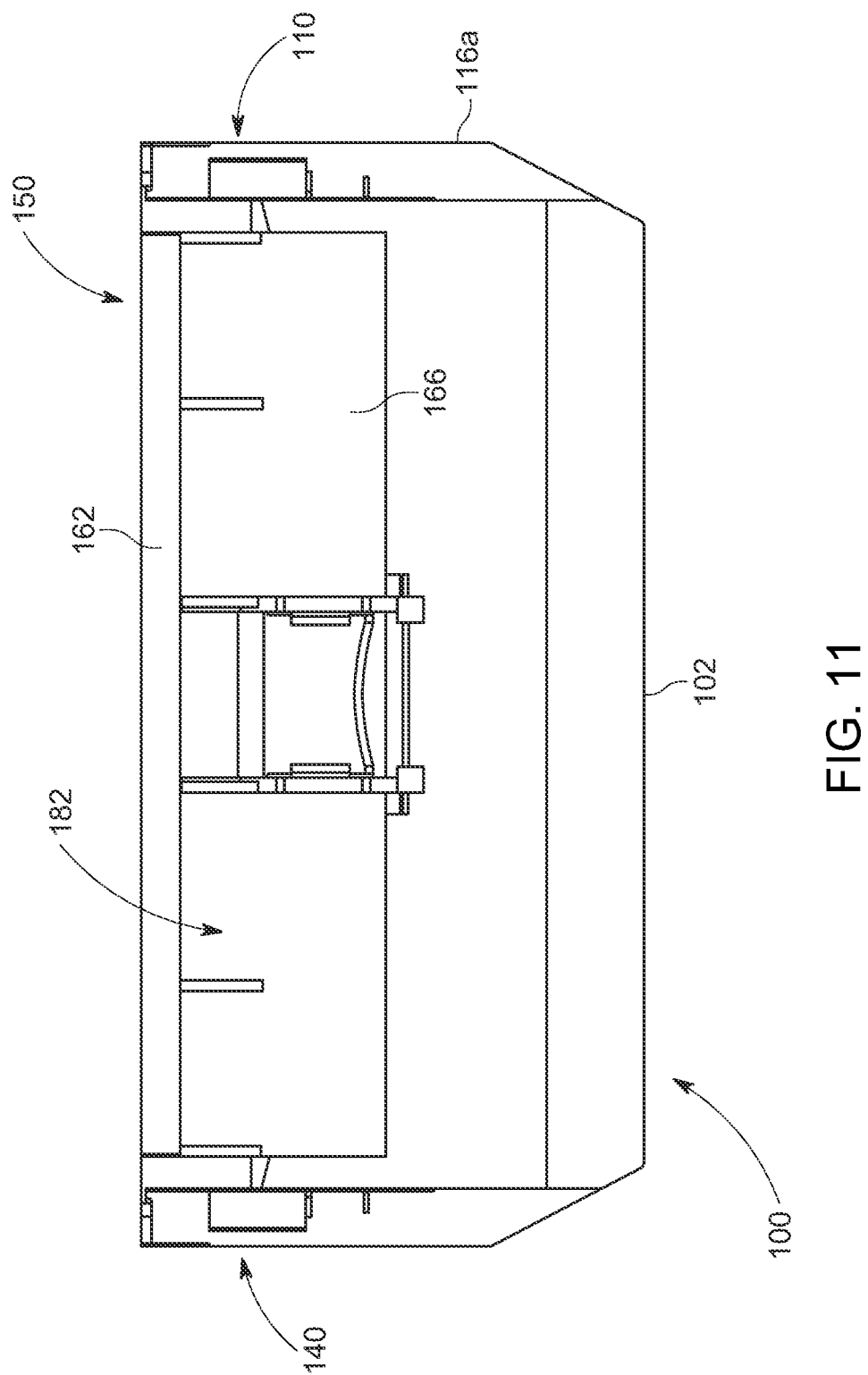
FIG. 11 is a first end view of a first end of the underframe of the railroad car of FIG. 1.
Figure 12:
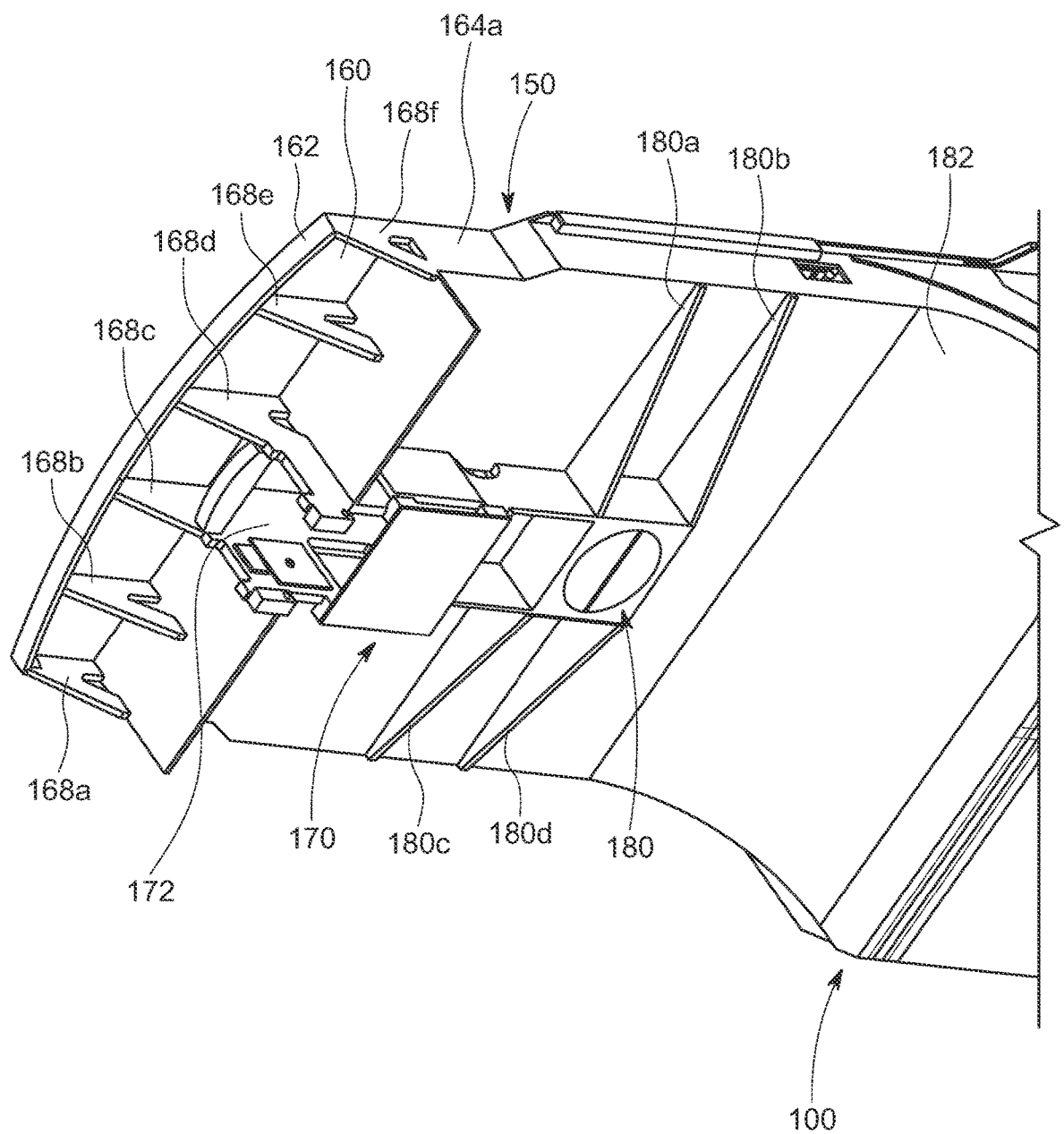
FIG. 12 is a bottom fragmentary perspective view of the first end of the underframe of the railroad car of FIG. 1.
Figure 13:
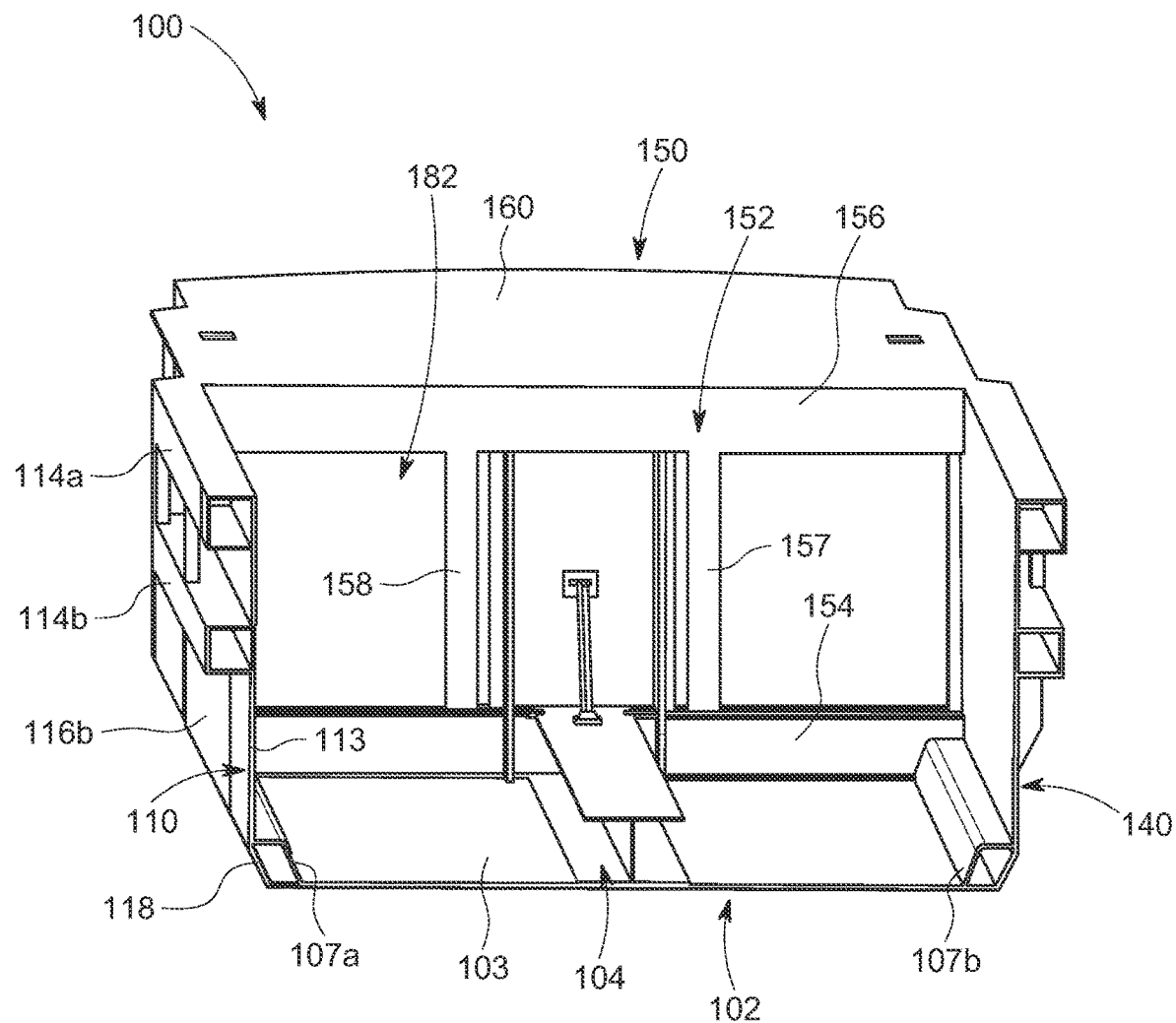
FIG. 13 is a first vertical partially cross-sectional perspective view of the underframe of the railroad car of FIG. 1.
Figure 14:
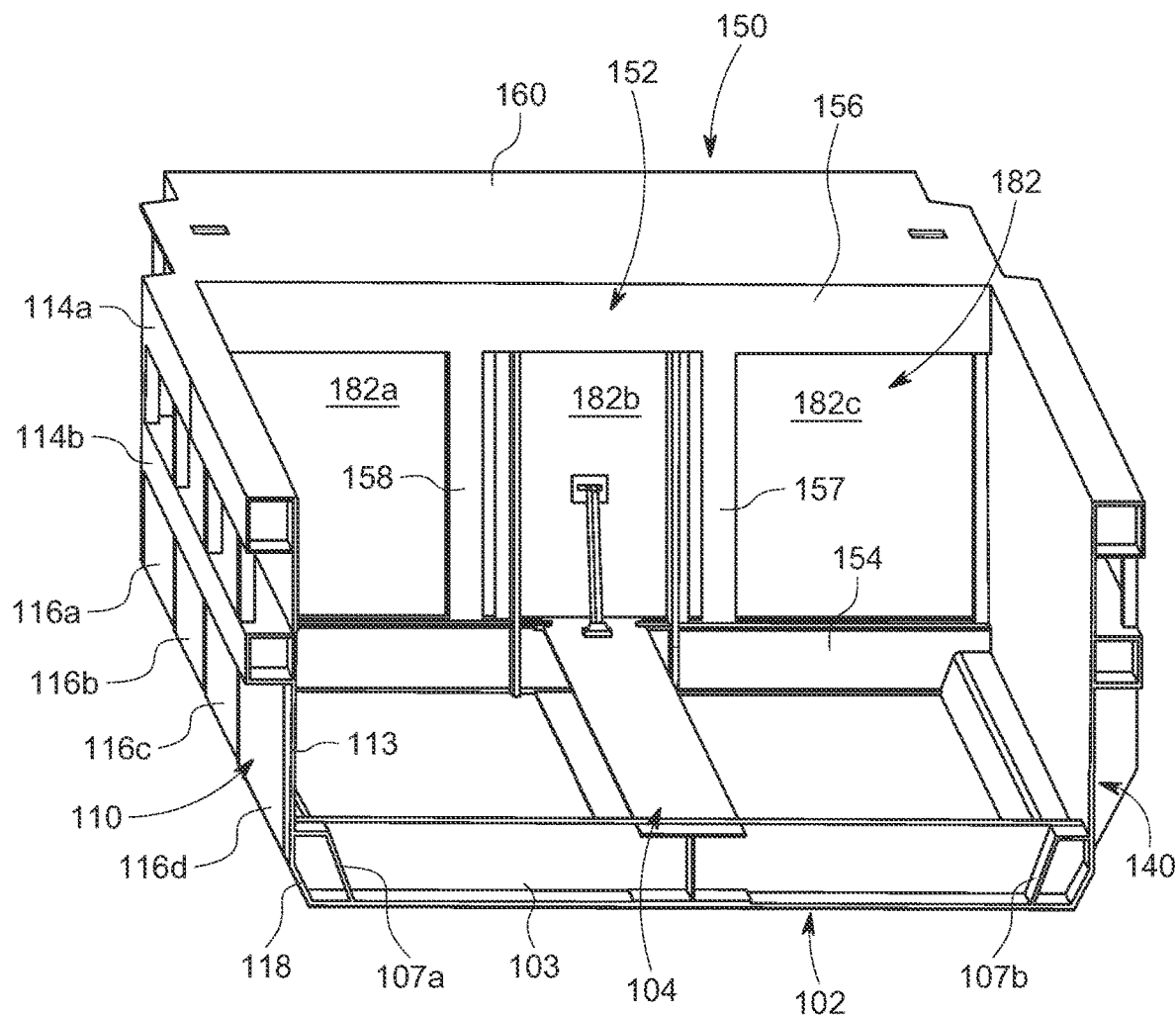
FIG. 14 is a second vertical partially cross-sectional perspective view of the underframe of the railroad car of FIG. 1.
Figure 15:
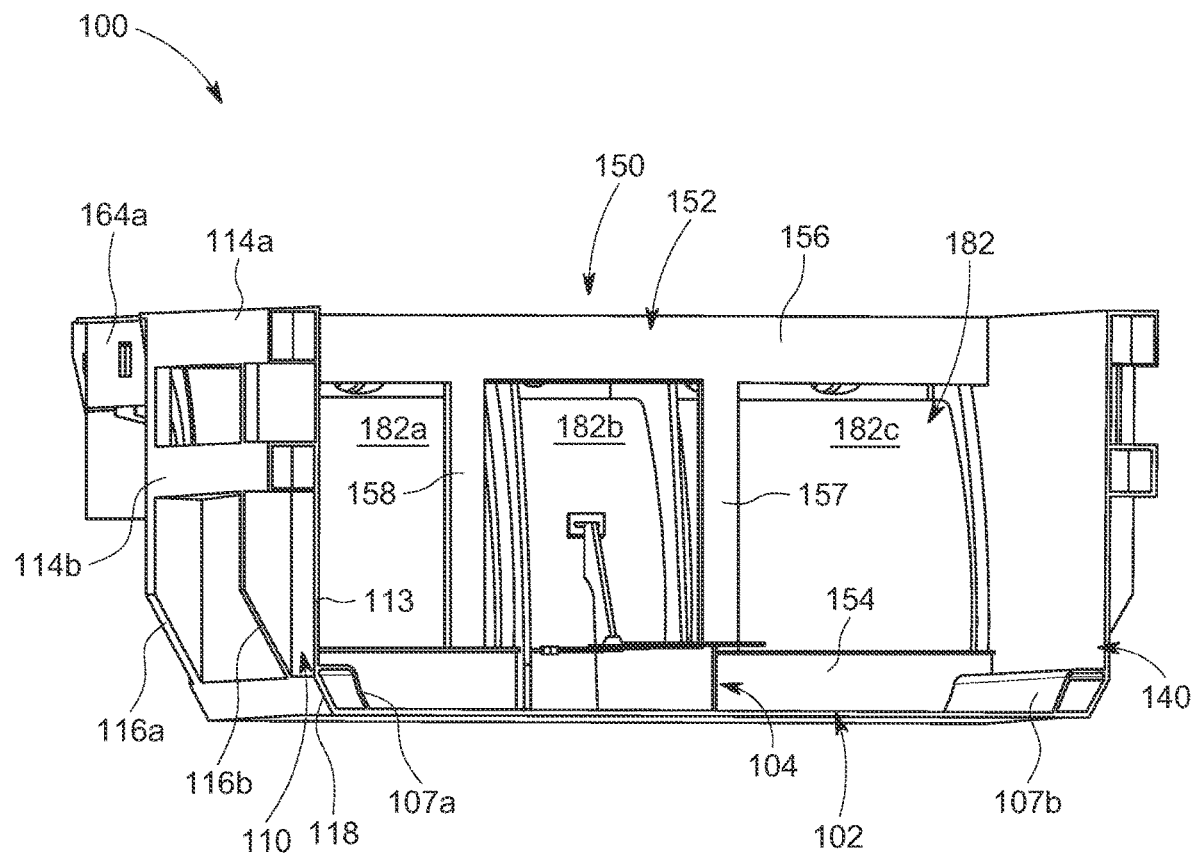
FIG. 15 is a third vertical partially cross-sectional perspective view of the underframe of the railroad car of FIG. 1.
Figure 16:
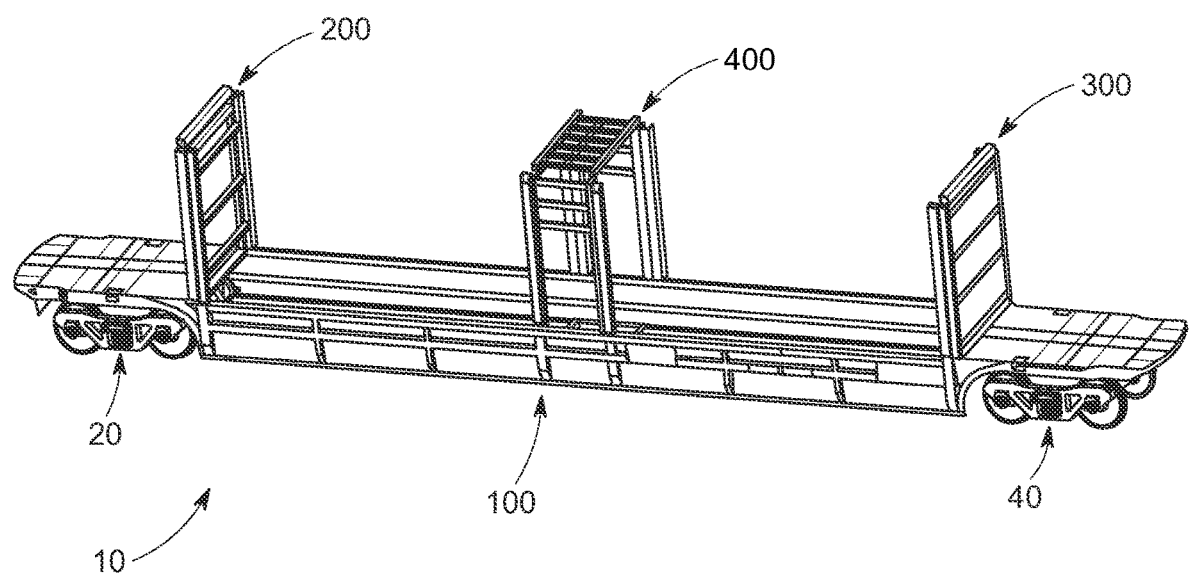
FIG. 16 is a top perspective view of the underframe, the first end bulkhead, the second end bulkhead, and the center bulkhead of the railroad car of FIG. 1.
Figure 17:
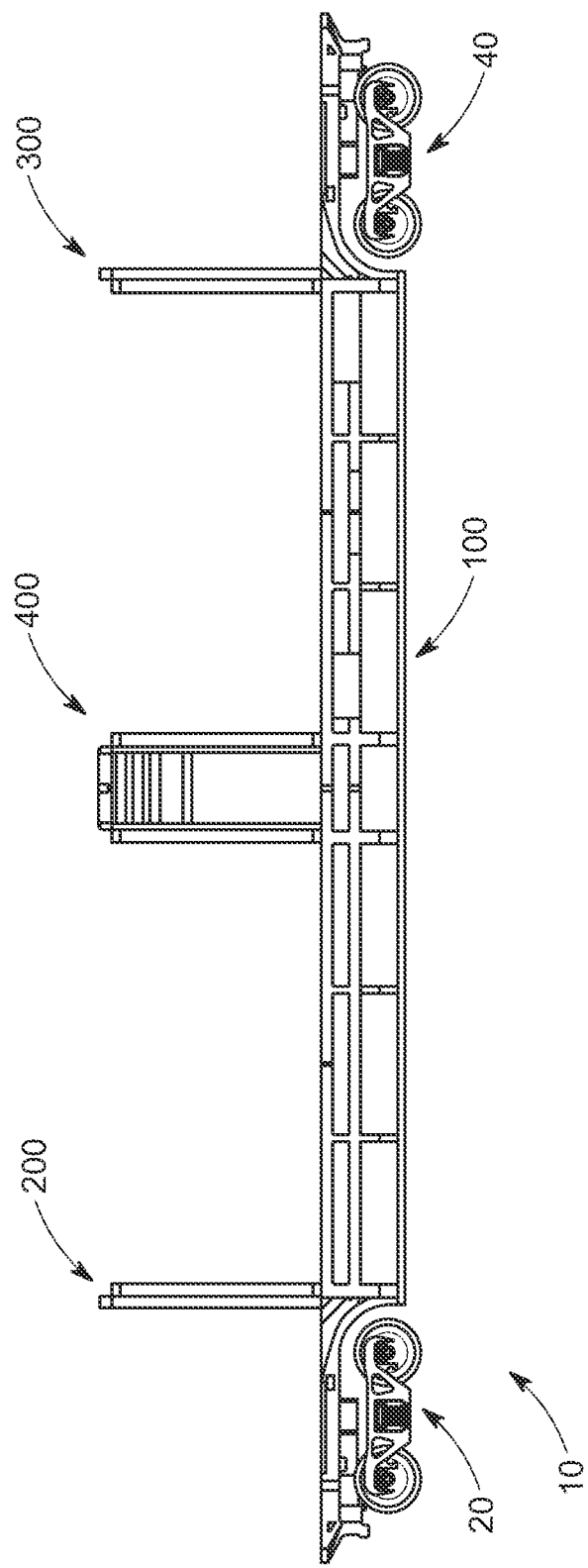
FIG. 17 is a first side view of the underframe, the first end bulkhead, the second end bulkhead, and the center bulkhead of the railroad car of FIG. 1.
Figure 18:
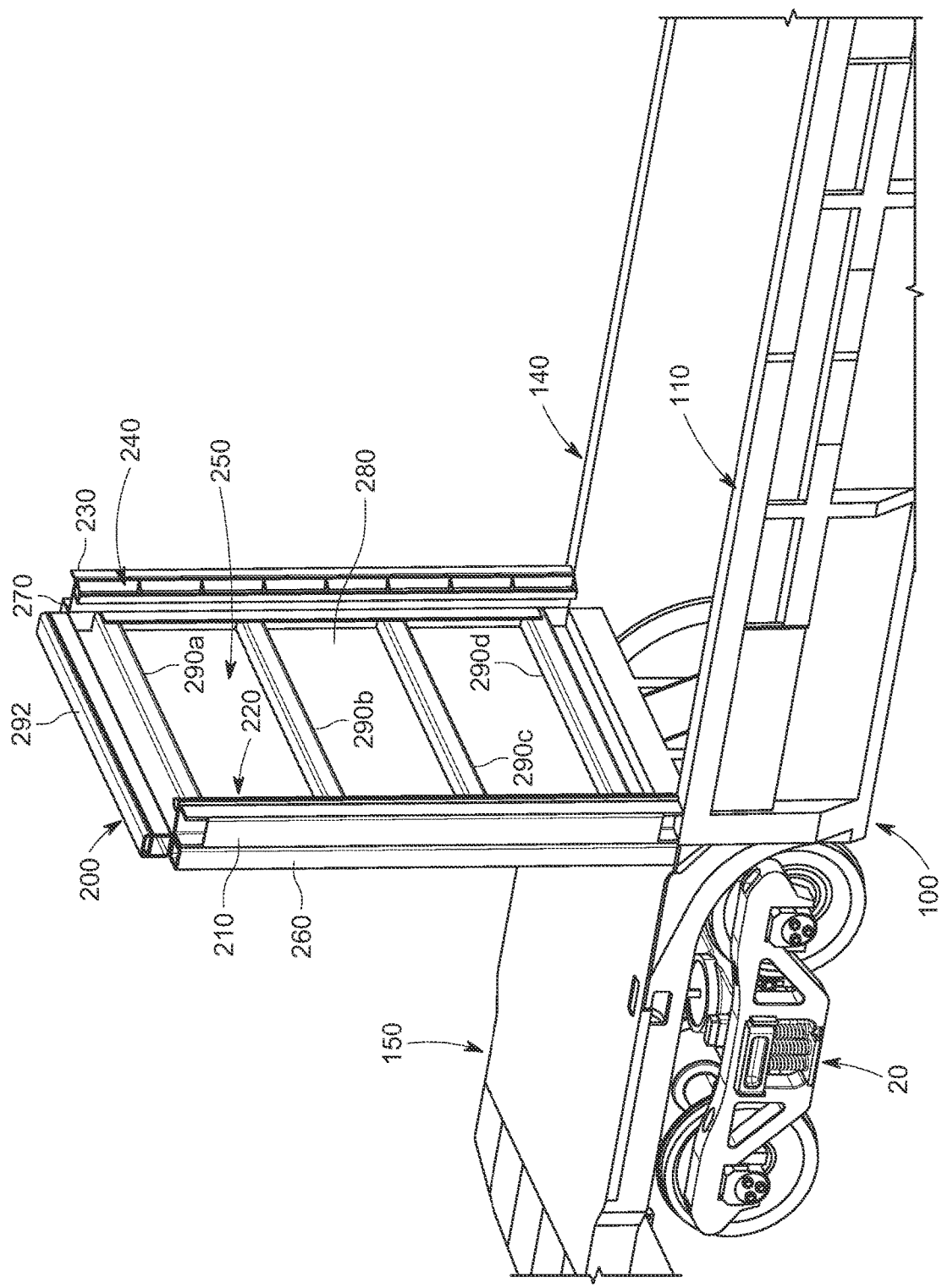
FIG. 18 is an enlarged first perspective view of the first end bulkhead of the railroad car of FIG. 1, attached to the underframe (shown in fragmentary).
Figure 19:
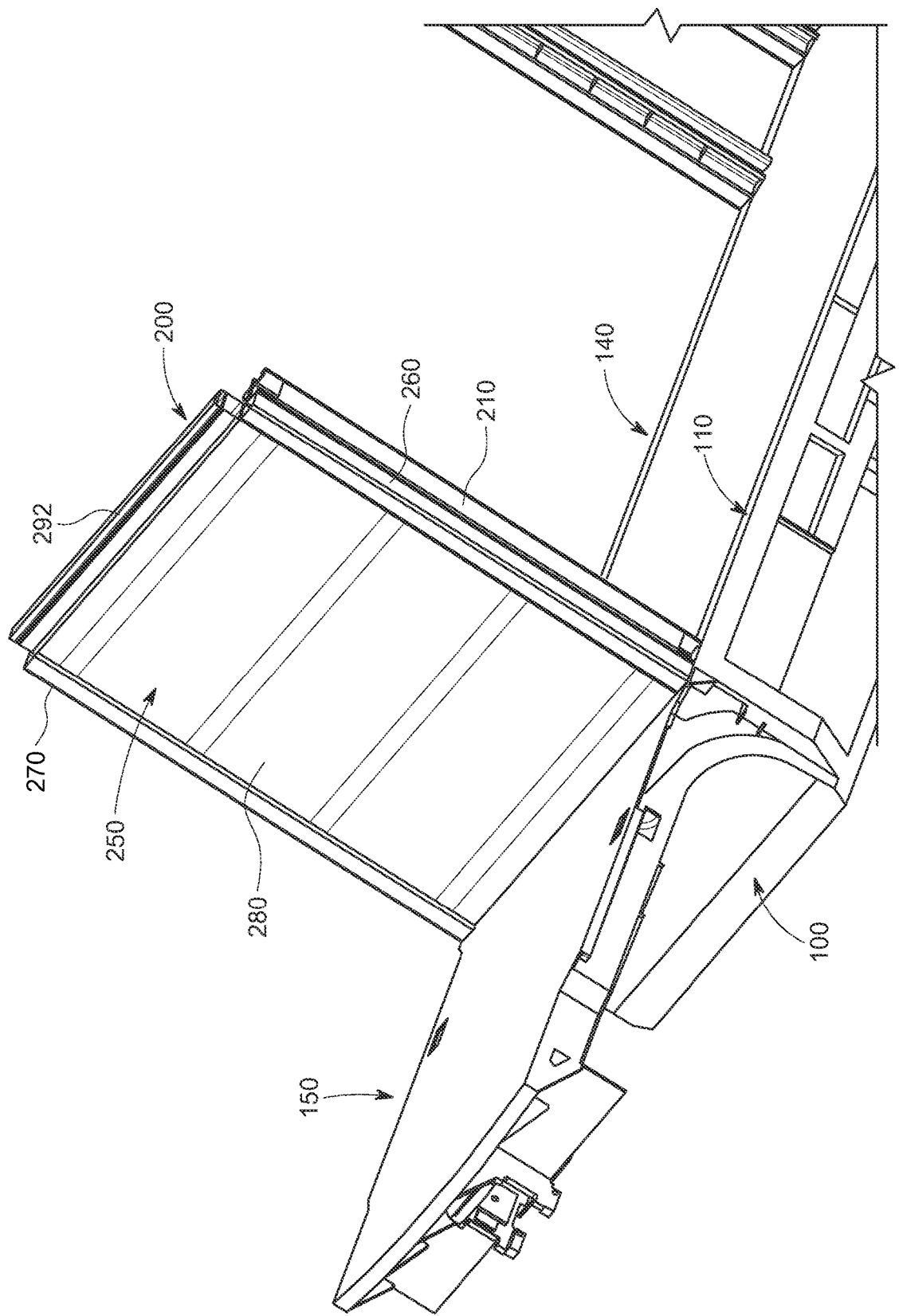
FIG. 19 is an enlarged second perspective view of the first bulkhead of the railroad car of FIG. 1 attached to the underframe (shown in fragmentary).
Figure 20:
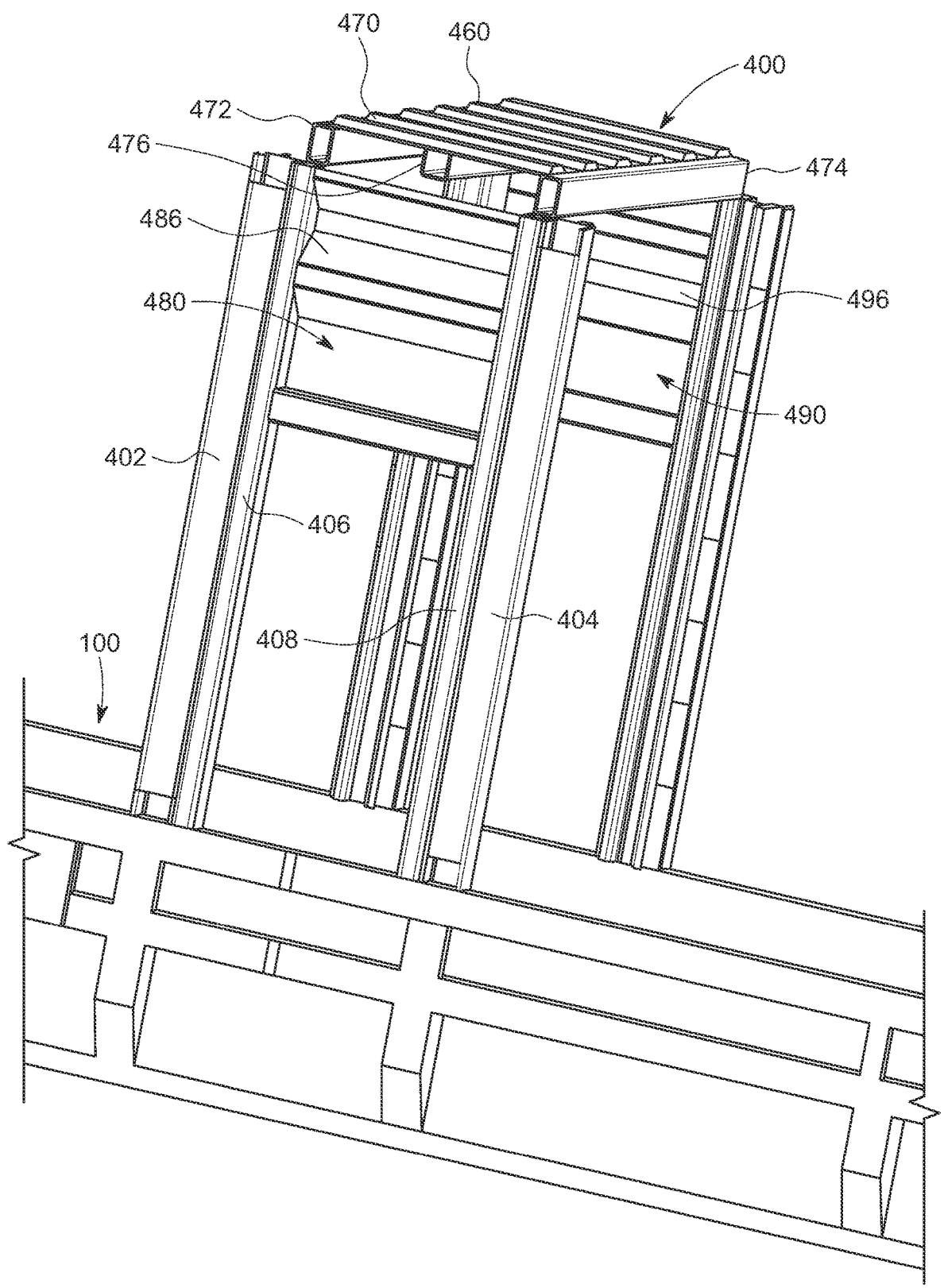
FIG. 20 is an enlarged perspective view of the center bulkhead of the railroad car of FIG. 1 attached to the underframe (shown in fragmentary).
Figure 21:
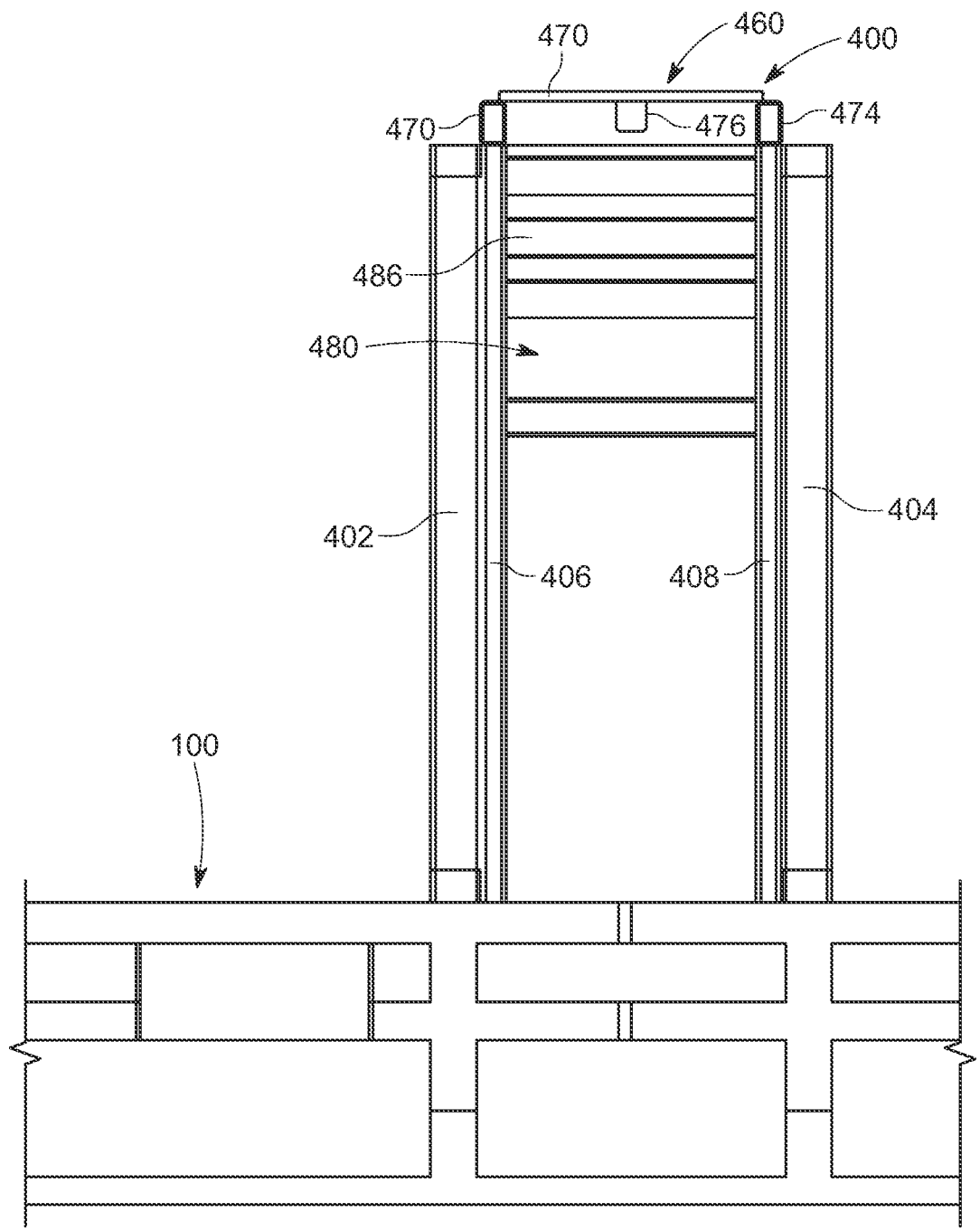
FIG. 21 is an enlarged side view of the center bulkhead of the railroad car of FIG. 1 attached to the underframe (shown in fragmentary).
Figure 22:
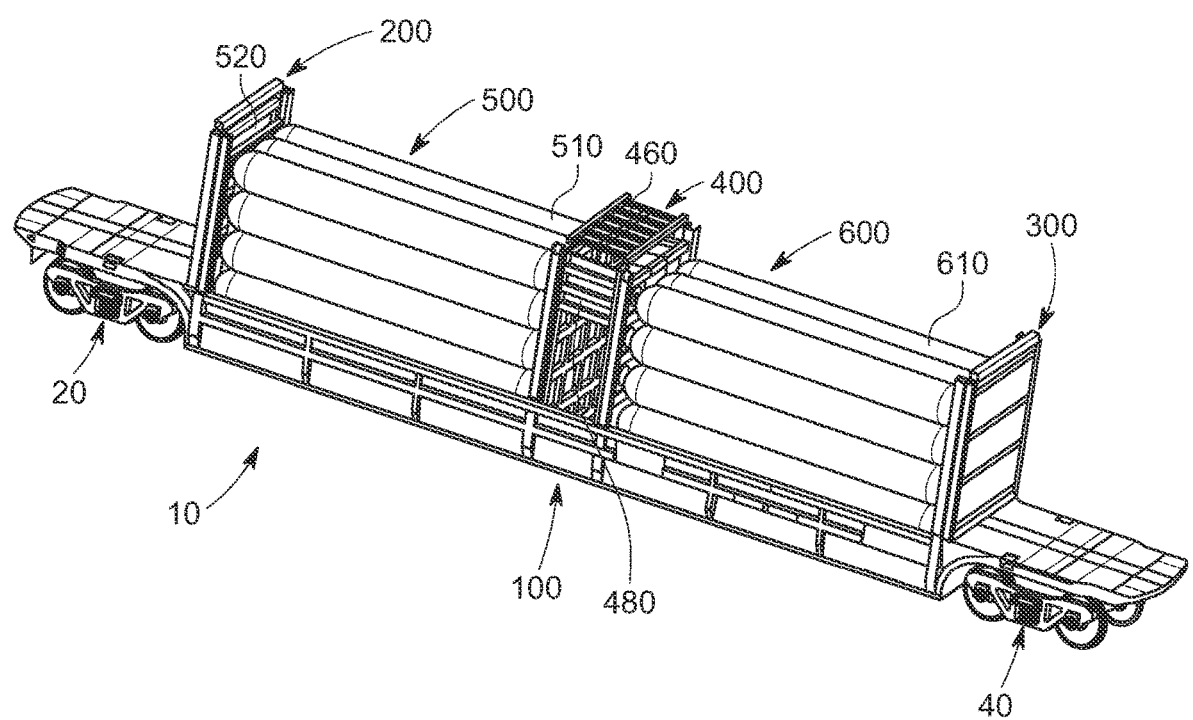
FIG. 22 is a top view of the trucks, the underframe, the first end bulkhead, the second end bulkhead, the center bulkhead, the first cylinder assembly, and the second cylinder assembly of the railroad car of FIG. 1.
Figure 23:
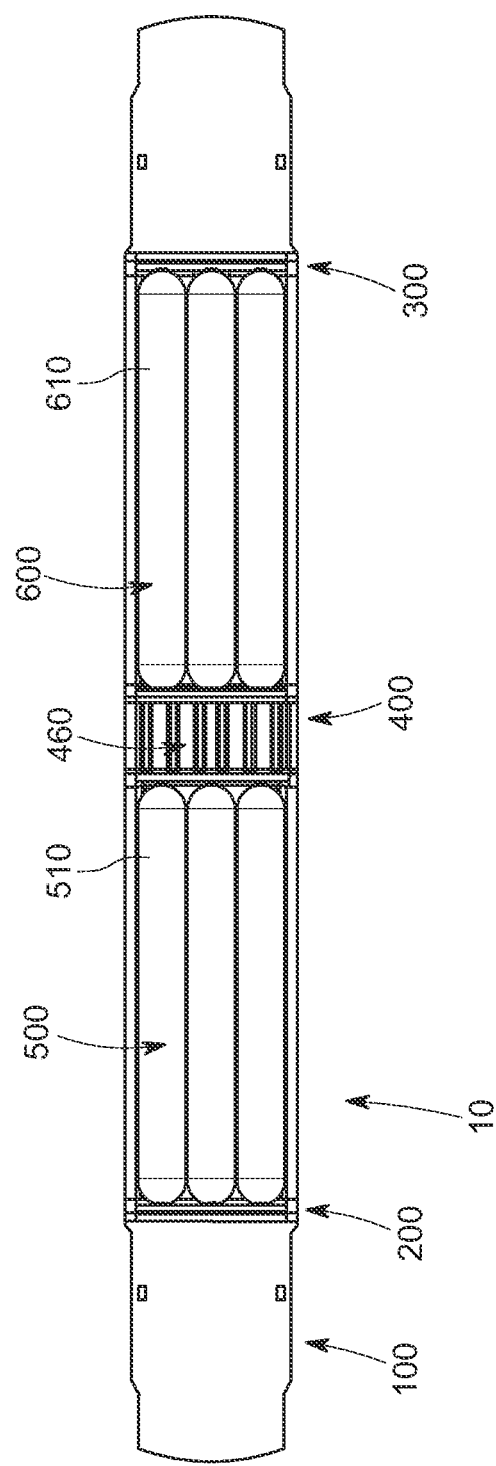
FIG. 23 is a top view of the underframe, the first end bulkhead, the second end bulkhead, the center bulkhead, the first cylinder assembly, and the second cylinder assembly of the railroad car of FIG. 1.
Figure 24:
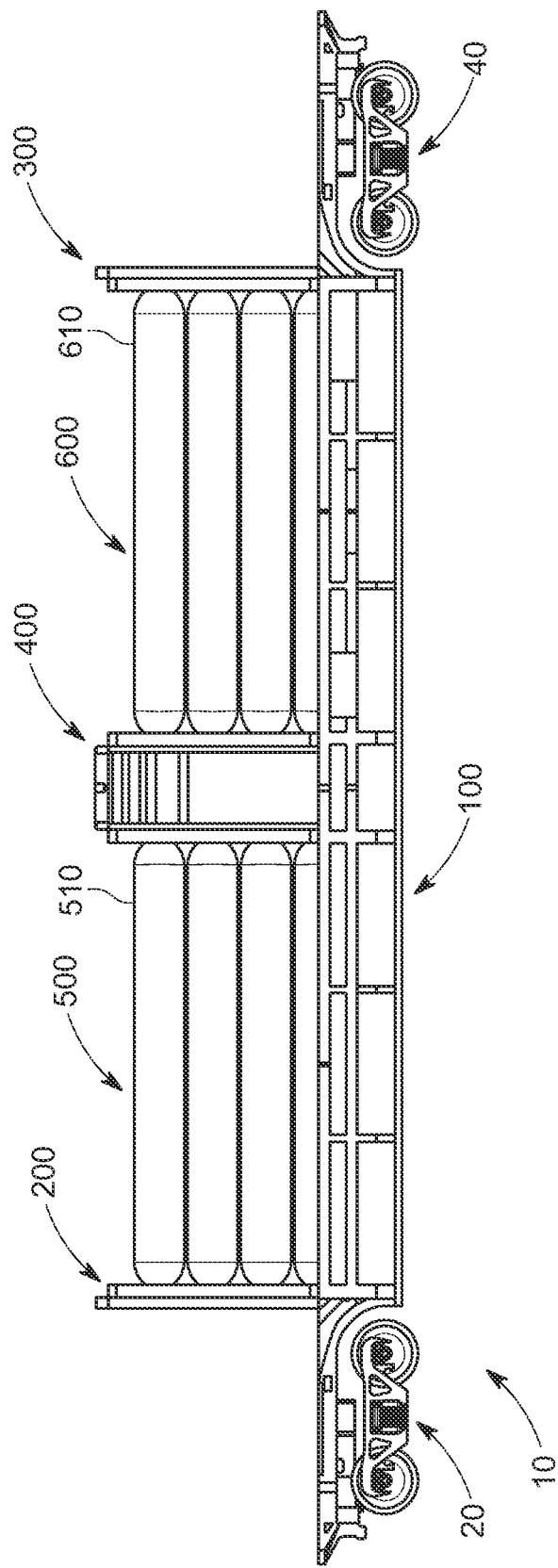
FIG. 24 is a side view of the trucks, the underframe, the first end bulkhead, the second end bulkhead, the center bulkhead, the first cylinder assembly, and the second cylinder assembly of the railroad car of FIG. 1.
Figure 25:
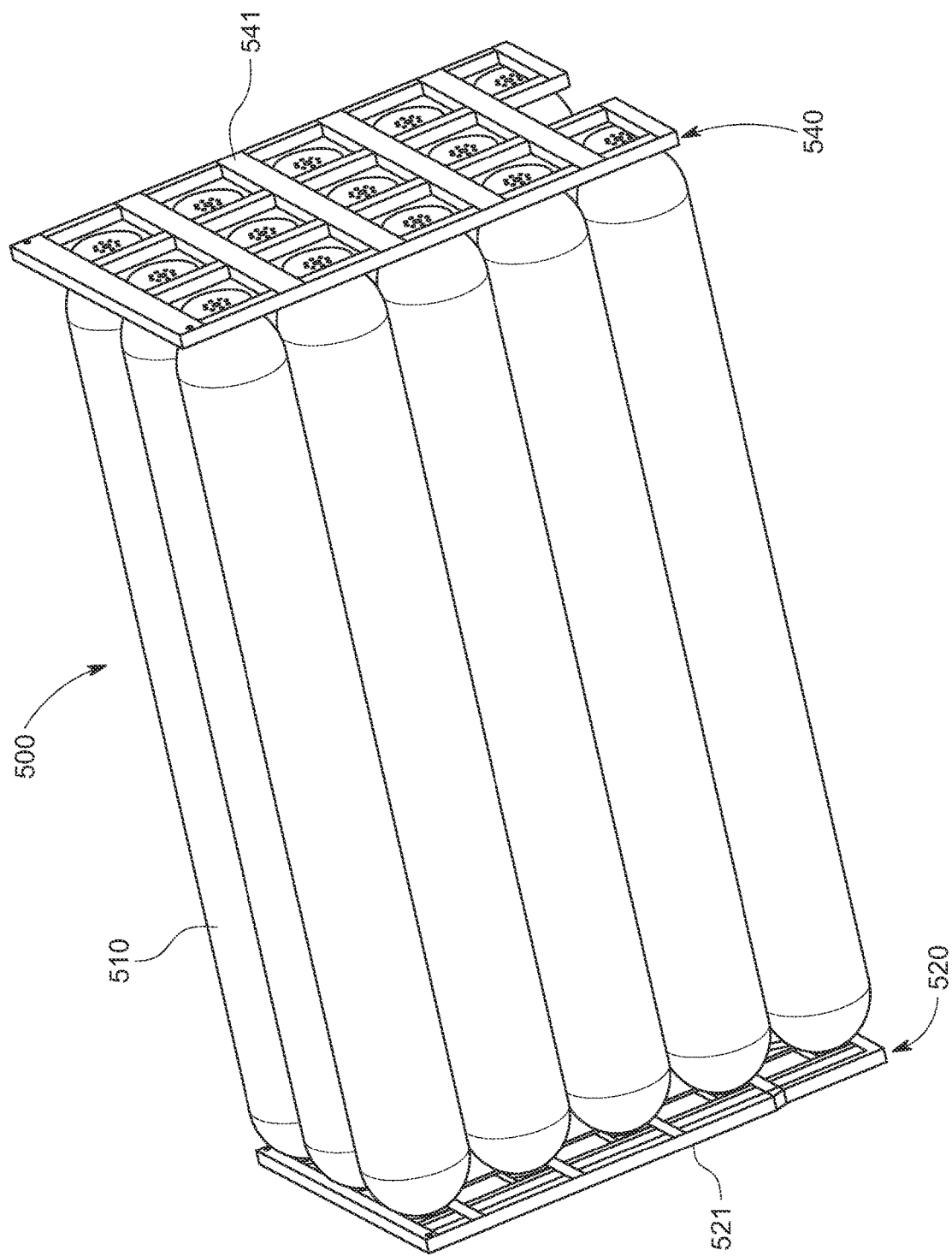
FIG. 25 is a top perspective view of the first cylinder assembly of the railroad car of FIG. 1.

In this illustrated example embodiment, the bottom wall 102; the first side wall 110, the second side wall 140, the first end section 150, and the second end section 190 provide a protected equipment receiving belly or pocket (not labeled) as best shown in FIGS. 2, 7, and 14. This belly or pocket is configured to receive and protect the bottom cylinders of the cylinder assemblies 500 and 600, various pipes that communicate the gas from the cylinders, and various safety critical valves, regulators, and other equipment connected to such cylinders and pipes positioned in the belly or pocket.

More specifically, the bottom wall 102 includes: (1) an elongated horizontally extending base panel 103; (2) two elongated central longitudinally extending support beams 104*a* (and 104*b* not shown or labeled) integrally connected to the top of the base panel 103; (3) a central bulkhead support structure 105 integrally connected to the top of the base panel 103; and (4) a first, second, third, and fourth elongated longitudinally extending interior side support brackets 107*a* and 107*b* integrally connected to the top of the base panel 103. In various other embodiments, the bottom wall 102 can include one or more longitudinally and transversely extending support braces integrally connected to the bottom or top of the base panel 103. In this illustrated example embodiment, these components are all steel and are suitably welded to form such integral connections.

It should be appreciated that in various embodiments, the pipes can be positioned along or in the channels formed by the I-beams 104*a* and 104*b* to provide additional protection for such pipes.

These components of the bottom wall 102 individually and in combination function: (1) to absorb bottom impact and other forces that engage the underframe 100; (2) to support the entire railroad car 10 if the railroad car 10 loses one or more of its car trucks and rests on part or all of the bottom wall 102; and (3) as penetration resistant and otherwise protective structures to protect the cylinders of the cylinder assemblies 500 and 600, the pipes that communicate the gas from the cylinders, and the safety critical valves, regulators, and other equipment connected to such cylinders and pipes from bottom impacts or other forces that engage the bottom of the underframe 100.

For example, these penetration resistant and otherwise protective structures protect against accidents that include bottom impacts from other moving railroad cars or locomotives, broken rails, or other objects or obstructions. In another example, these penetration resistant and otherwise protective structures are also configured to withstand forces from accidents where underframe is dislodged from one or more of the trucks and the bottom wall 102 of the underframe 100 slides along one or more of the rails (and thus function as skid pads).

The present disclosure provides that: (1) the size, shape, and configuration of the bottom wall may vary; (2) the material(s) that the bottom wall is made from may vary; and/or (3) the attachment mechanisms used to connect the components of the bottom wall may vary.

The first side wall 110 includes: (1) an elongated upright panel 113; (2) two spaced-apart longitudinally extending elongated bumpers 114*a* and 114*b* integrally connected to the outer surface of the panel 113; (3) a plurality of vertical stiffeners 116*a*, 116*b*, 116*c*, 116*d*, 116*e*, 116*f*, 116*g*, and 116*h* integrally connected to the outer surface of the panel 113; and (4) a longitudinally extending elongated lower angled panel 118 integrally connected at its lower end to the base panel 103 and at its upper end to the elongated upright panel 113. It should be appreciated that the elongated upright panel 113 and the elongated lower angled panel 118 can be formed from the same panel or from separate connected panels. The elongated upright panel 113 is also integrally connected to the first and second elongated interior side support bracket 107*a*. In this illustrated example embodiment, these components are all steel and are suitably welded to form such integral connections.

In this illustrated example embodiment, the bumper 114*a* includes a top wall (not labeled) integrally connected to the outer surface of the panel 113, a bottom wall (not labeled) integrally connected to the outer surface of the panel 113 and spaced-apart from the top wall, and an outer wall (not labeled) integrally connected to the top wall and the bottom wall and spaced-apart from the outer surface of the panel 113. Likewise, in this illustrated example embodiment, the bumper 114*b* includes a top wall (not labeled) integrally connected to the outer surface of the panel 113, a bottom wall (not labeled) integrally connected to the outer surface of the panel 113 and spaced-apart from the top wall, and an outer wall (not labeled) integrally connected to the top wall and the bottom wall and spaced apart from the outer surface of the panel 113. In this illustrated example embodiment, these components are all steel and are suitably welded to form such integral connections. It should be appreciate that the quantity, positions, sizes, and configurations of the bumpers may vary in accordance with the present disclosure.

In this illustrated example embodiment, certain of the plurality of vertical stiffeners 116*a*, 116*b*, 116*c*, 116*d*, 116*e*, 116*f*, 116*g*, and 116*h* partially extend between the spaced-apart bumpers 114*a* and 114*b* and certain of the plurality of vertical stiffeners 116*a*, 116*b*, 116*c*, 116*d*, 116*e*, 116*f*, 116*g* extend below the bumper 114*b*. In this illustrated example embodiment, these components are all steel and are suitably welded to form such integral connections. It should be appreciate that the quantity, positions, sizes, and configurations of the vertical stiffeners may vary in accordance with the present disclosure.

In this illustrated example embodiment, the bumpers 114*a* and 114*b*, and the plurality of vertical stiffeners 116*a*, 116*b*, 116*c*, 116*d*, 116*e*, 116*f*, 116*g*, and 116*h* have co-planer outer surfaces. It should be appreciated that these co-planer bumpers and stiffeners co-act in the case of a roll-over type accident where the railroad car 10 slides on the rails (and thus to a certain extent can function as skid pads). It should be appreciated that the bumpers and the plurality of vertical stiffeners of the underframe can have outer surfaces in different planes in accordance with the present disclosure.

The components of the first side wall 110 (including these bumpers and stiffeners) individually and in combination function: (1) to absorb side impact and other forces that engage the underframe 100; (2) to support the entire railroad car 10 if the railroad car 10 rolls over onto the first side wall 110; and (3) as penetration resistant structures to protect the cylinders of the cylinder assemblies 500 and 600, the pipes that communicate the gas from the cylinders, and the safety critical valves, regulators, and other equipment connected to such cylinders and pipes from side impacts.

In this illustrated example embodiment, the components of the first side wall 110 further define a quick connect/disconnect pad or panel 118 configured to receive or couple with a fill housing (not shown). For example, the fill housing can include a box (not shown) that houses one or more quick disconnect fittings used for filling the cylinders. In various embodiments, the box provides protection from various debris and impacts. In this illustrated example embodiment, the pad or panel 118 assists in maintaining the structural integrity of the bumper arrangement in the first side wall 110

(in spite of the bumpers being reduced in size in this area). In various embodiments, the valve arrangement (not shown) protected in and by the underframe is configured to ensure that no gas is received under pressure at the fill housing unless the railroad car is stopped at a fuel station and actually filling the cylinders of the railroad car.

For example, these penetration resistant and otherwise protective structures protect against accidents that include side impacts from other moving railroad cars, locomotives, vehicles, broken rails, or other objects or obstructions. In another example, these penetration resistant and otherwise protective structures are also configured to withstand forces from accidents where first side wall 110 of the underframe 100 slides along one or more of the rails, either longitudinally or transversely.

The present disclosure provides that: (1) the size, shape, and configuration of the first side wall of the underframe may vary; (2) the material(s) that the first side wall of the underframe is made from may vary; and/or (3) the attachment mechanisms used to connect the first side wall of the underframe to the bottom wall of the underframe may vary.

The second side wall 140 is identical or substantially identical to the first side wall 110 (except oppositely positioned) and is thus not described herein for brevity. It should be appreciated that the components of the second side wall 140 (including the bumpers and stiffeners thereof) individually and in combination also function: (1) to absorb side impact and other forces that engage the underframe 100; (2) to support the entire railroad car 10 if the railroad car 10 rolls over onto the second side wall 140; and (3) as penetration resistant structures to protect the cylinders of the cylinder assemblies 500 and 600, the pipes that communicate the gas from the cylinders, and the safety critical valves, regulators, and other equipment connected to such cylinders and pipes from side impacts and damaging forces.

For example, these penetration resistant and otherwise protective structures protect against accidents that include side impacts from other moving railroad cars, locomotives, vehicles, broken rails, or other objects or obstructions. In another example, these penetration resistant and otherwise protective structures are also configured to withstand forces from accidents where second side wall 140 of the underframe 100 slides along one or more of the rails, either longitudinally or transversely.

It should further be appreciated that the second side wall 140 does not need to be identical or substantially identical to the first side wall 110 in accordance with the present disclosure.

The present disclosure provides that: (1) the size, shape, and configuration of the second side wall of the underframe may vary; (2) the material(s) that the second side wall of the underframe is made from may vary; and/or (3) the attachment mechanisms used to connect the second side wall of the underframe to the bottom wall of the underframe may vary.

The first end section 150 includes an upright end wall 152 integrally connected to the bottom wall 102, the first side wall 110, and the second side wall 140. More specifically, the end upright wall 152 includes: (1) a transversely horizontally extending bottom member 154; (2) a transversely horizontally extending top member 156 spaced-apart from the top member; and (3) two spaced-apart upright members 157 and 158 integrally connected to and extending between the bottom member 154 and the top member 156. In this illustrated example embodiment, these components are all steel and are suitably welded to form such integral connections.

The first end section 150 further includes: (1) a horizontally extending top wall 160 integrally connected to and extending from the end wall 152; (2) a curved outer upright wall 162 integrally connected to and extending downwardly from the outer end of the top wall 160; (3) spaced-apart upright side walls 164*a* (and 164*b* not shown or labeled) integrally connected to and extending downwardly from the opposite sides of the top wall 160; (4) a transversely extending upright end plate 166 integrally connected to and extending downwardly from the top wall 160; (5) a plurality of first vertically extending braces 168*a*, 168*b*, 168*c*, 168*d*, 168*e*, and 168*f* integrally connected to and extending downwardly from the bottom surface of the top wall 160 and integrally connected to the rear surface of the curved outer wall 162; (6) a coupler receiving structure 170 integrally connected to and extending downwardly from the top wall 160 and defining a coupler pocket 172 configured to receive a coupler and draft gear assembly (not shown); (7) a body bolster 180 including a cylindrical center plate (not shown) configured to be received in a bowl (bowl) of a bolster (not shown) of the truck 20 and a plurality of first vertically extending braces 180*a*, 180*b*, 180*c*, and 180*d*, integrally connected to and extending downwardly from the bottom surface of the top wall 160; and (8) a deflecting and transition wall 182 includes a plurality of curved protective member sections 182*a*, 182*b*, and 182*c* integrally connected to and extending upwardly and outwardly from the end upright wall 152. In this illustrated example embodiment, these components are all steel and are suitably welded to form such integral connections.

It should be appreciated that the various components of the first end section 150 (including part of the top wall 160, the curved outer wall 162, the upright end plate 166, and the vertically extending braces 168*a*, 168*b*, 168*c*, 168*d*, 168*e*, and 168*f*) function as an adjacent car coupler anti-climber. More specifically, in an accident, these components of the first end section 150 are configured to prevent or substantially reduce the risk that a coupler of an adjacent railroad car (not shown) will move upwardly above (i.e., override) the first end section 150 into a position where it can pierce the first end bulkhead 200 and engage the first cylinder assembly 500 or any of the cylinders 510 thereof. In such an accident, these components of the first end section 150 act as an anti-climber that prevents or limits the upward movement of such a coupler of an adjacent railroad car.

It should be appreciated that the various components of the first end section 150 (including the deflecting wall 182) function as a debris and obstruction deflector for the railroad car 10. More specifically, in an accident where the railroad car 10 and specifically the end section 150 encounters debris or obstructions along the rails (or otherwise) the deflector including the deflecting wall 182 is configured to protect the cylinders of the cylinder assemblies 500 and 600, the pipes that communicate the gas from the cylinders, and the safety critical valves, regulators, and other equipment connected to such cylinders and pipes from impacts and damaging forces. In certain such accidents, the end section 150 and specifically the deflector including the deflecting wall 182 will divert such object or obstructions away from the railroad car 10.

The components of the first end section 150 also individually and in combination function: (1) to absorb front impact forces that engage the underframe 100 from the first end; (2) to support the entire railroad car 10 if the railroad car 10 rolls over onto the first end section 150; and (3) as penetration resistant structures to protect the cylinders of the cylinder assemblies 500 and 600, the pipes that communicate the gas from the cylinders, and the safety critical valves, regulators, and other equipment connected to such cylinders and pipes from front impacts and damaging forces.

For example, these penetration resistant and otherwise protective structures protect against accidents that include first end impacts from other moving railroad cars, locomotives, vehicles, broken rails, or other objects or obstructions. In another example, these penetration resistant and otherwise protective structures are also configured to withstand forces from accidents where first end section 150 of the underframe 100 slides along one or more of the rails.

The present disclosure provides that: (1) the size, shape, and configuration of the first end section may vary; (2) the material(s) that the first end section is made from may vary; and/or (3) the attachment mechanisms used to connect the first end section to the bottom wall, first side wall, and second side wall of the underframe may vary.

The second end section 190 is identical or substantially identical to the first end section 150 (except oppositely positioned) and is thus not described herein for brevity. Various components of the second end section 190 (including the top wall (not labeled), the curved outer wall (not labeled, the upright end plate (not labeled), and the vertically extending braces (not labeled) also function as an adjacent car coupler anti-climber. More specifically, in an accident, the second end section 190 is configured to prevent or substantially reduce the risk that a coupler of an adjacent railroad car (not shown) will move upwardly above the second end section 190 into a position where it can pierce the second end bulkhead 300 and engage the second cylinder assembly 600 or any of the cylinders 610 thereof. It should thus be appreciated that the components of the second end section 190 individually and in combination function: (1) to absorb rear impact forces that engage the underframe 100 at the second end; (2) to support the entire railroad car 10 if the railroad car 10 rolls over onto the second end section 190; and (3) as penetration resistant structures to protect the cylinders of the cylinder assemblies 500 and 600, the pipes that communicate the gas from the cylinders, and the safety critical valves, regulators, and other equipment connected to such cylinders and pipes from second end impacts and damaging forces.

For example, these penetration resistant and otherwise protective structures protect against accidents that include second end impacts from other moving railroad cars, locomotives, vehicles, broken rails, or other objects or obstructions. In another example, these penetration resistant and otherwise protective structures are also configured to withstand forces from accidents where second end section 190 of the underframe 100 slides along one or more of the rails.

It should further be appreciated that the second end section 190 does not need to be identical or substantially identical to the first end section 150 in accordance with the present disclosure.

The present disclosure provides that: (1) the size, shape, and configuration of the second end section may vary; (2) the material(s) that the second end section is made from may vary; and/or (3) the attachment mechanisms used to connect the second end section to the bottom wall, first side wall, and second side wall of the underframe may vary.

It should further thus be appreciated that the components of the underframe 10 (including the bottom wall 102, the first side wall 110, the second side wall 140, the first end section 150, and the second end section 190) individually and in combination also function: (1) to absorb side, bottom, and end impact forces that engage the underframe 100; (2) to support the entire railroad car 10 if the railroad car 10 rolls over; and (3) as penetration resistant structures to protect the cylinders of the cylinder assemblies 500 and 600, the pipes that communicate the gas from the cylinders, and the safety critical valves, regulators, and other equipment connected to such cylinders and pipes from impacts and damaging forces.

It should further thus be appreciated that the components of the underframe 10 (including the bottom wall 102, the first side wall 110, the second side wall 140, the first end section 150, and the second end section 190) are arranged to protect natural gas communication pipe, safety critical valves, and other related equipment positioned in the underframe 100 and specifically in the protected belly or pockets of the underframe 100 from side, bottom, and end impact and other damaging forces that engage the underframe 100.

The present disclosure provides that: (1) the size, shape, and configuration of the underframe may vary; and (2) the material(s) that the underframe is made from may vary.

First End, Second End, and Center Bulkheads

Turning now to FIGS. 16 to 29, the penetration resistant and protective first end bulkhead 200 includes: (1) an upright first side column 210 integrally connected to the underframe 100; (2) an upright first cylinder rack receiver 220 integrally connected to the upright first side column 210 and integrally connected to the underframe 100; (3) an upright second side column 230 integrally connected to the underframe 100 and spaced apart from first side column 210; (4) an upright second cylinder rack receiver 240 integrally connected to the upright second side column 230 and integrally connected to the underframe 100; and (5) an upright wall 250 integrally connected to the underframe 100, integrally connected to the first side column 210, and integrally connected to the second side column 230. In this illustrated example embodiment, these components are all steel and are suitably welded to form such integral connections.

More specifically, the upright first side column 210 includes an elongated tubular member having a bottom end integrally connected to the top portion of the first side wall 110 of the underframe 100. Likewise, the upright second side column 220 includes an elongated tubular member having a bottom end integrally connected to the top portion the second side wall 140 of the underframe 100. In this illustrated example embodiment, these components are all steel and are suitably welded to form such integral connections.

Figure 28A:
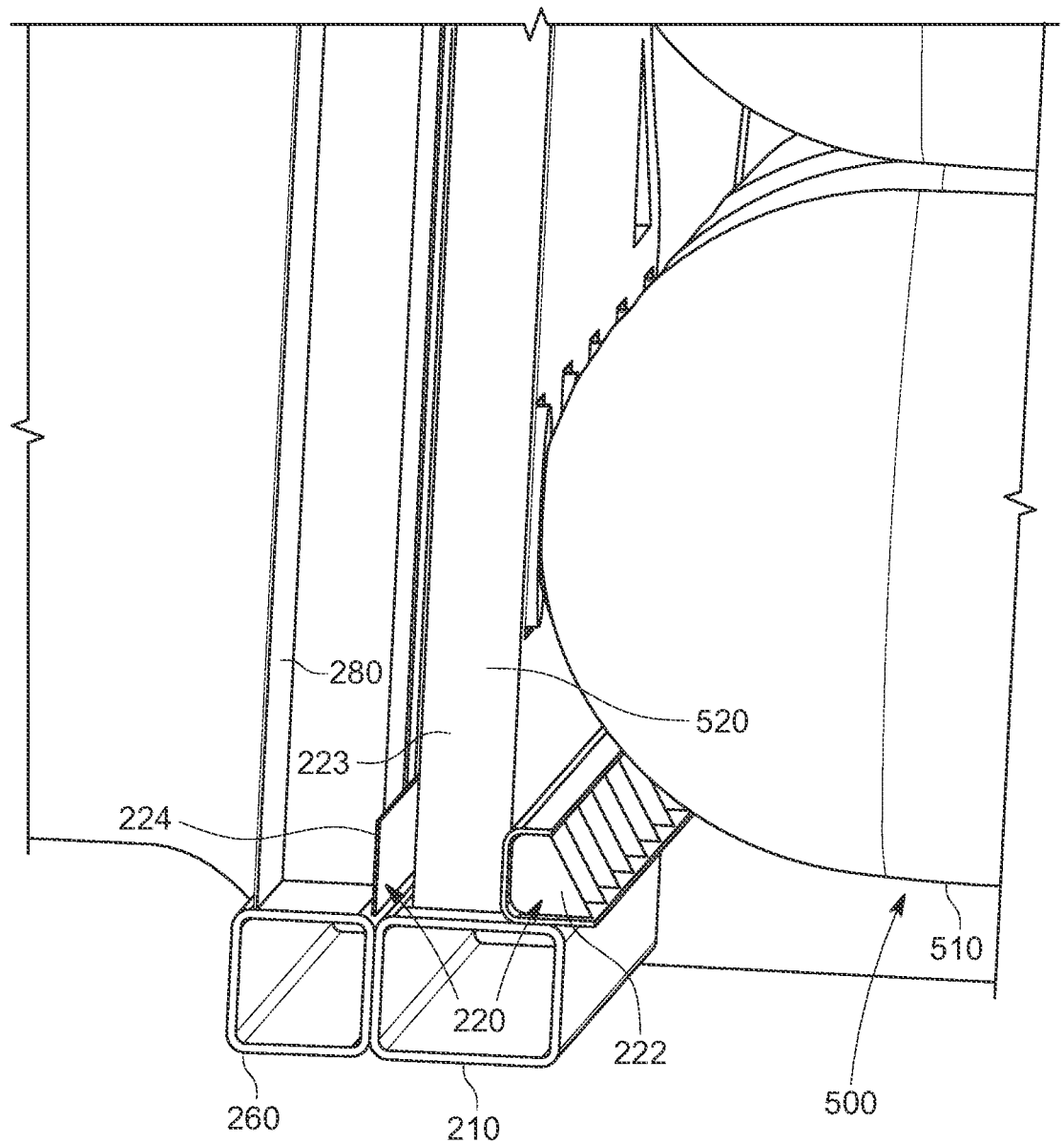
FIG. 28A is an even further enlarged fragmentary top perspective view of the underframe, the first cylinder assembly, and the first end bulkhead of the railroad car of FIG. 1.
Figure 30:
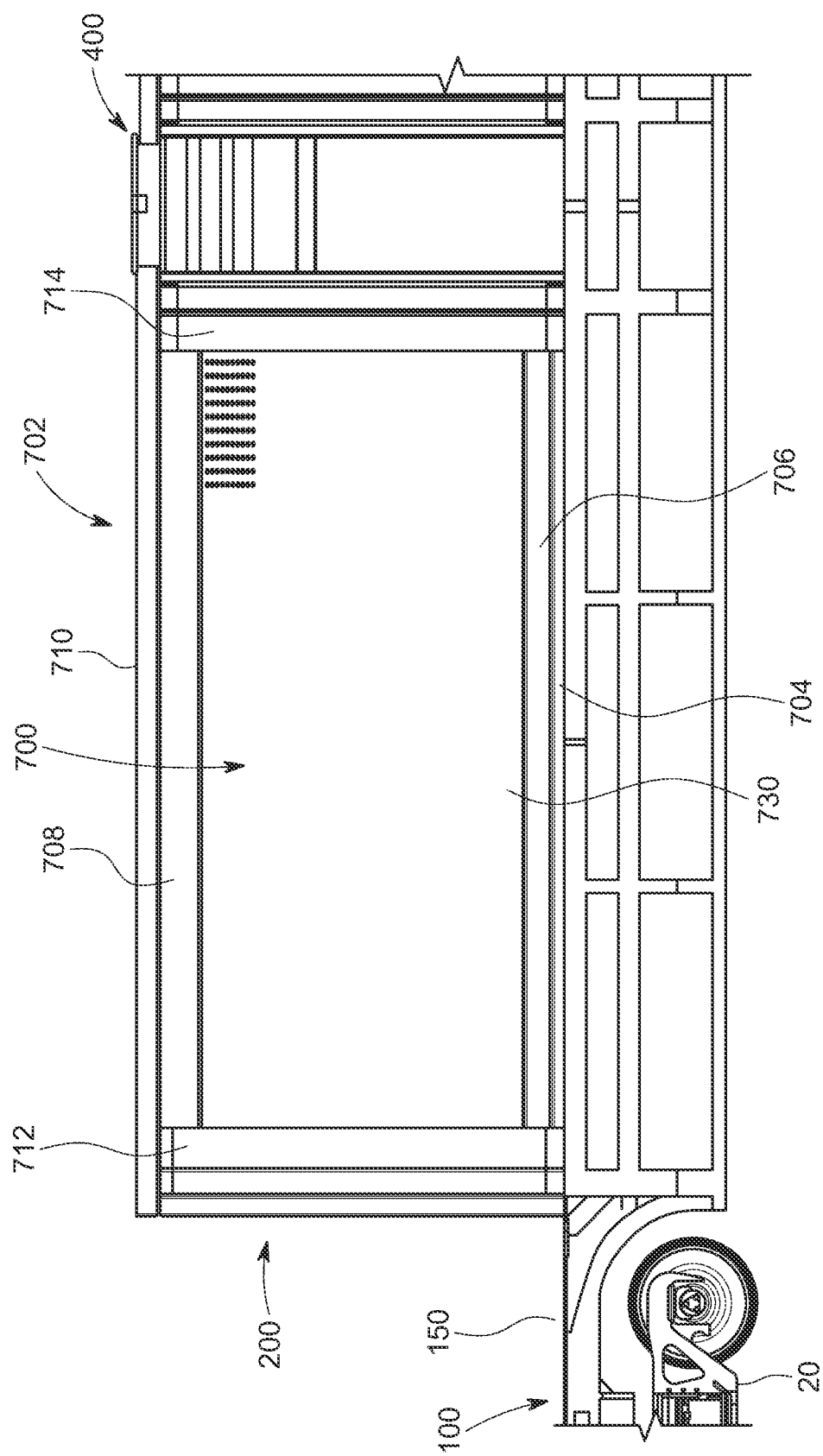
FIG. 30 is a fragmentary first side view of the underframe, the first truck, the first end bulkhead, the center bulkhead, and the first side wall of the railroad car of FIG. 1.
Figure 31:
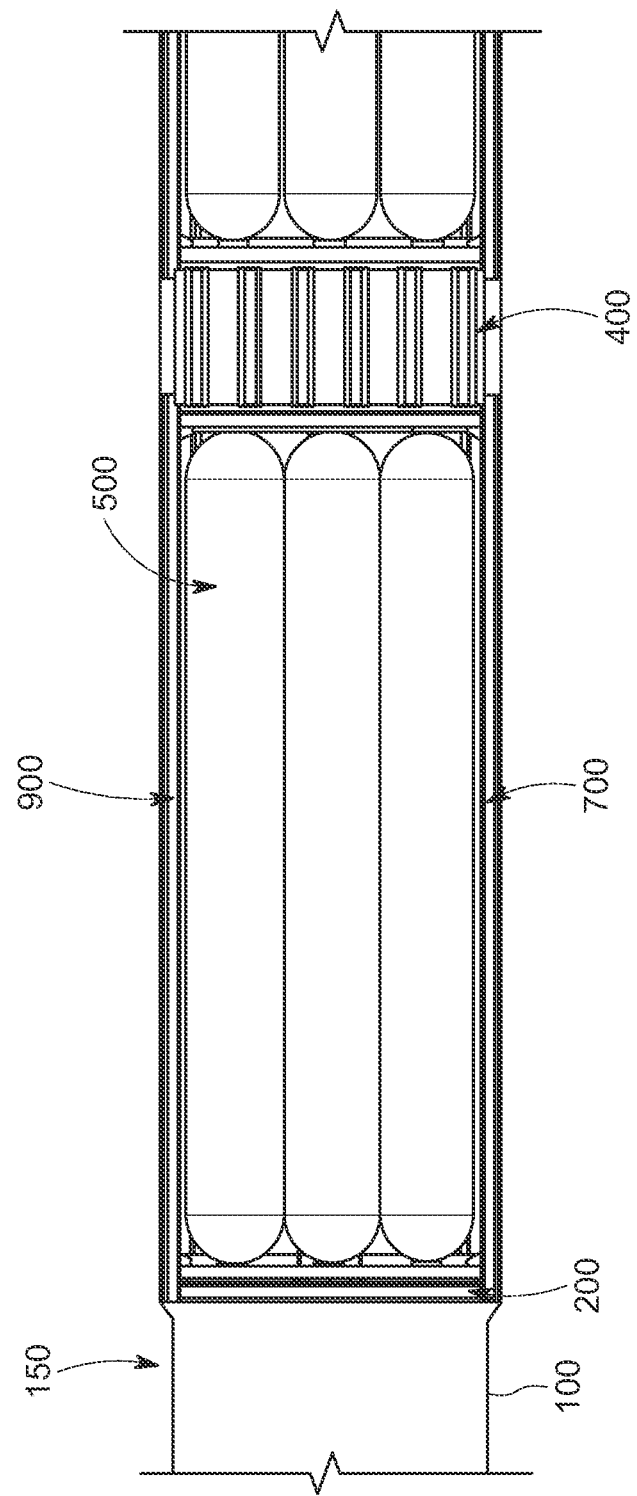
FIG. 31 is a fragmentary top view of the underframe, the first end bulkhead, the center bulkhead, the first cylinder assembly, and the first side wall of the railroad car of FIG. 1.
Figure 32:
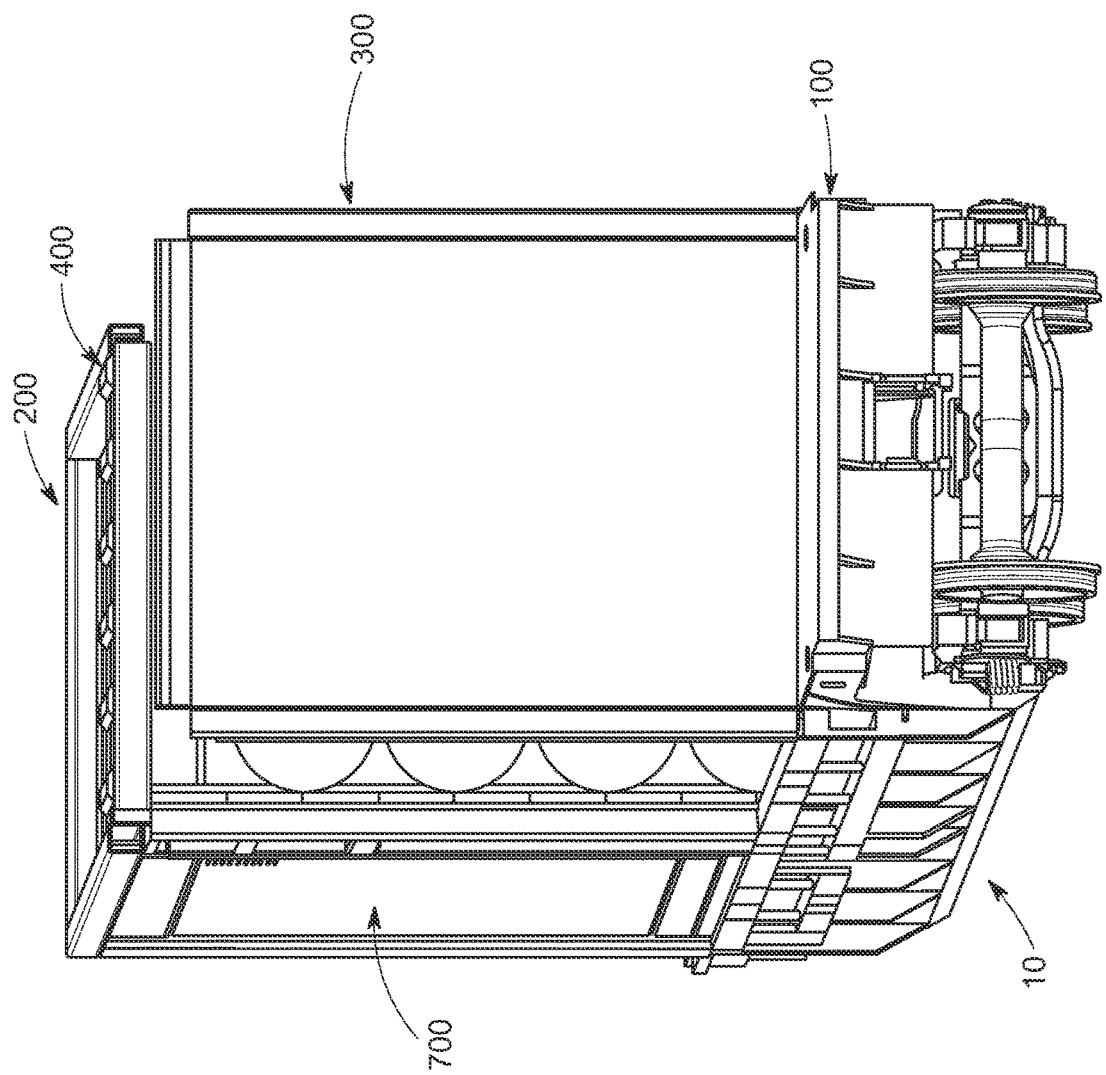
FIG. 32 is an enlarged fragmentary cross-sectional perspective view of the second end bulkhead, the center bulkhead, and the first side wall of the railroad car of FIG. 1.
Figure 33A:
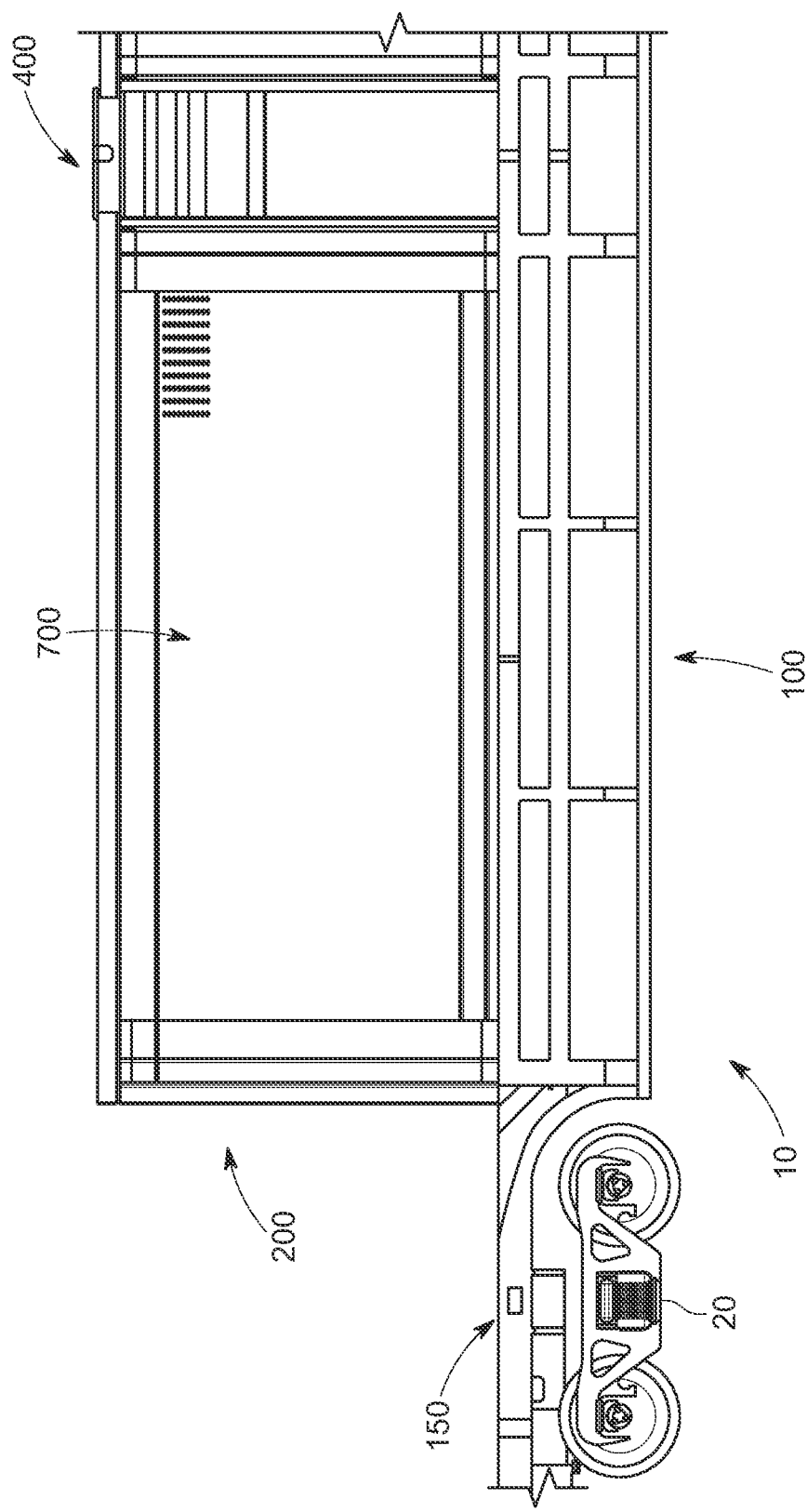
FIG. 33A is an enlarged fragmentary side view of the railroad car of FIG. 1, and showing the first side wall.
Figure 33B:
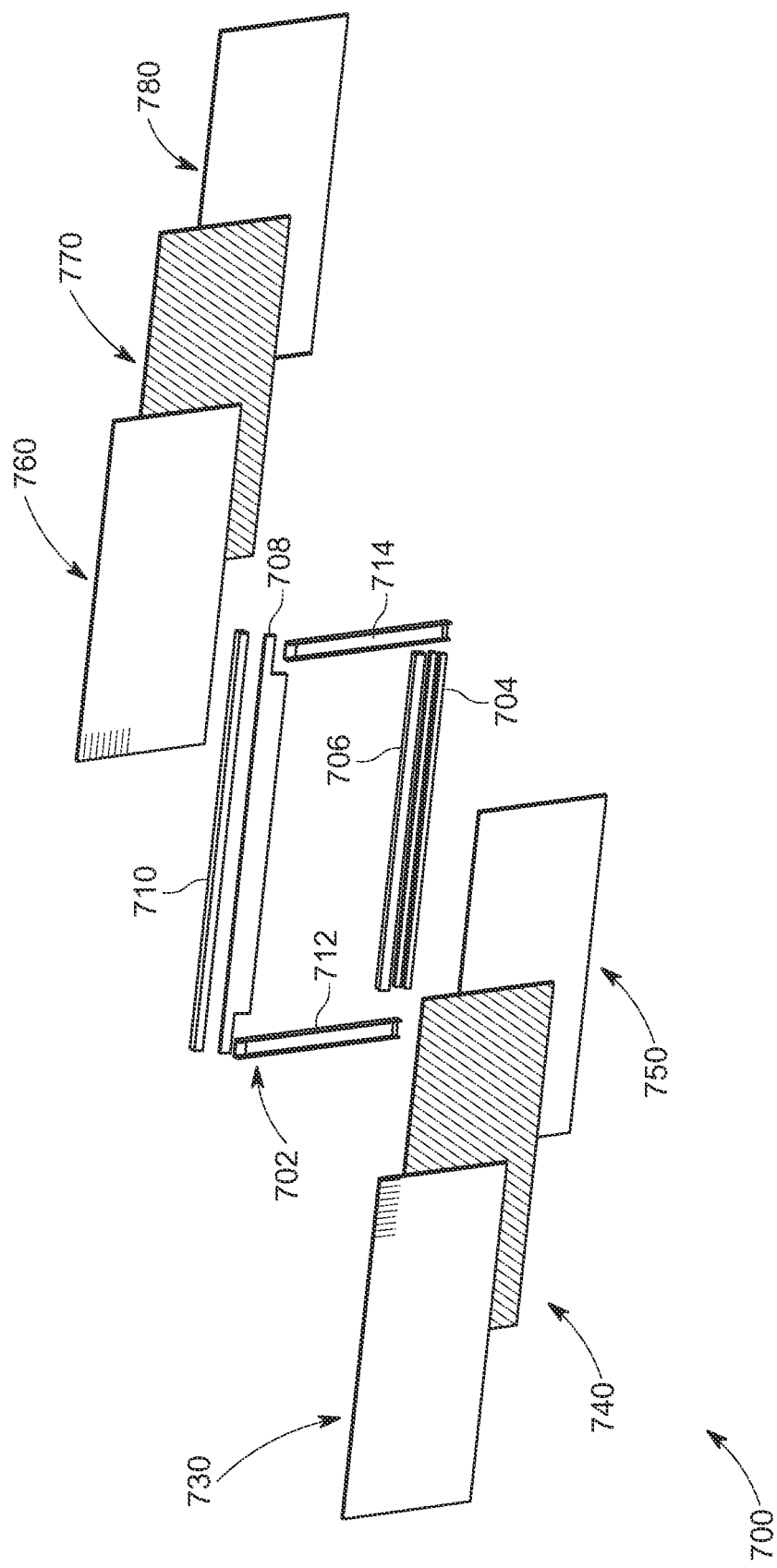
FIG. 33B is an exploded perspective view of the first side wall of the railroad car of FIG. 1.
Figure 34:
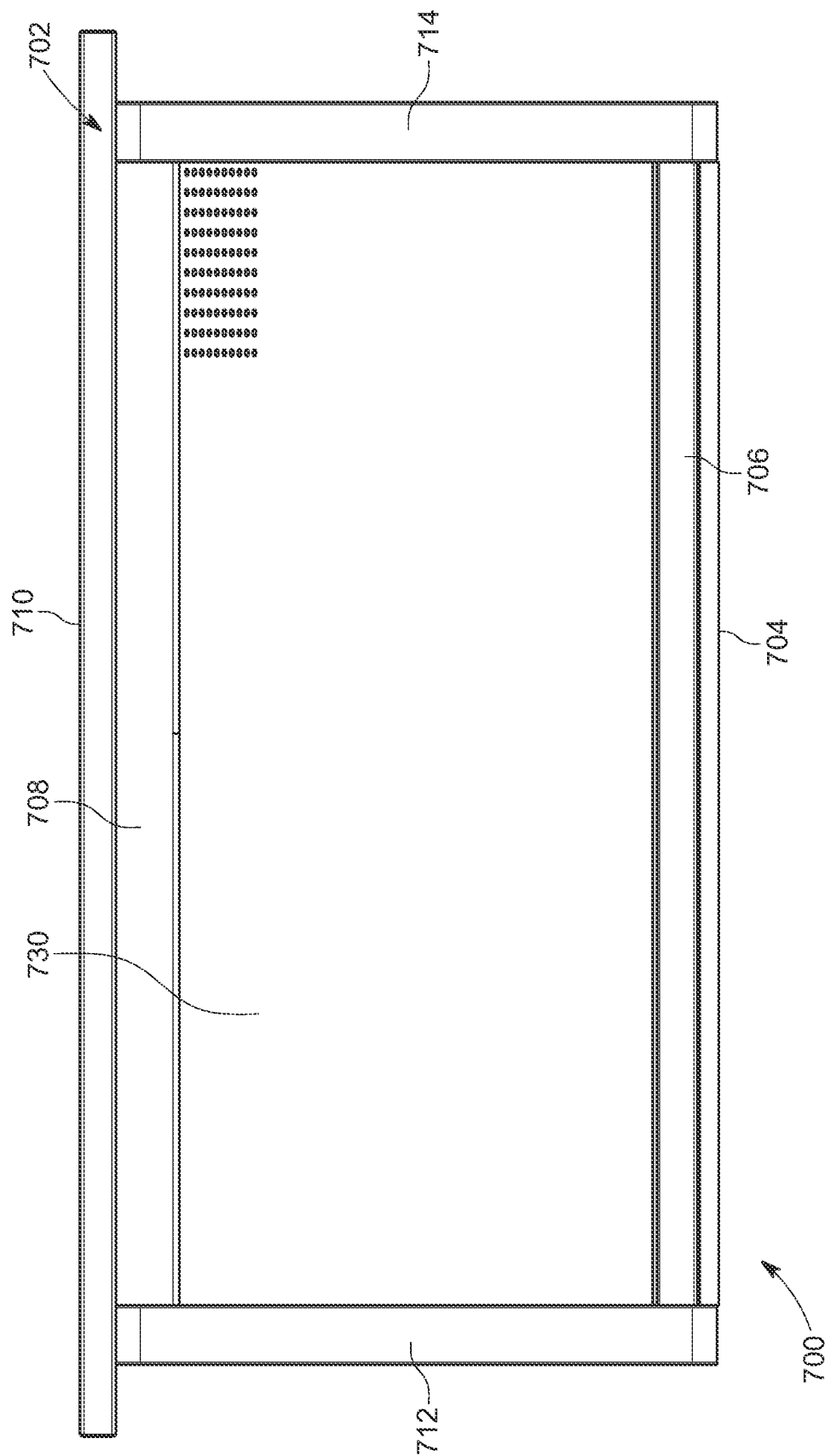
FIG. 34 is an enlarged first side view of the first side wall of the railroad car of FIG. 1.
Figure 35:
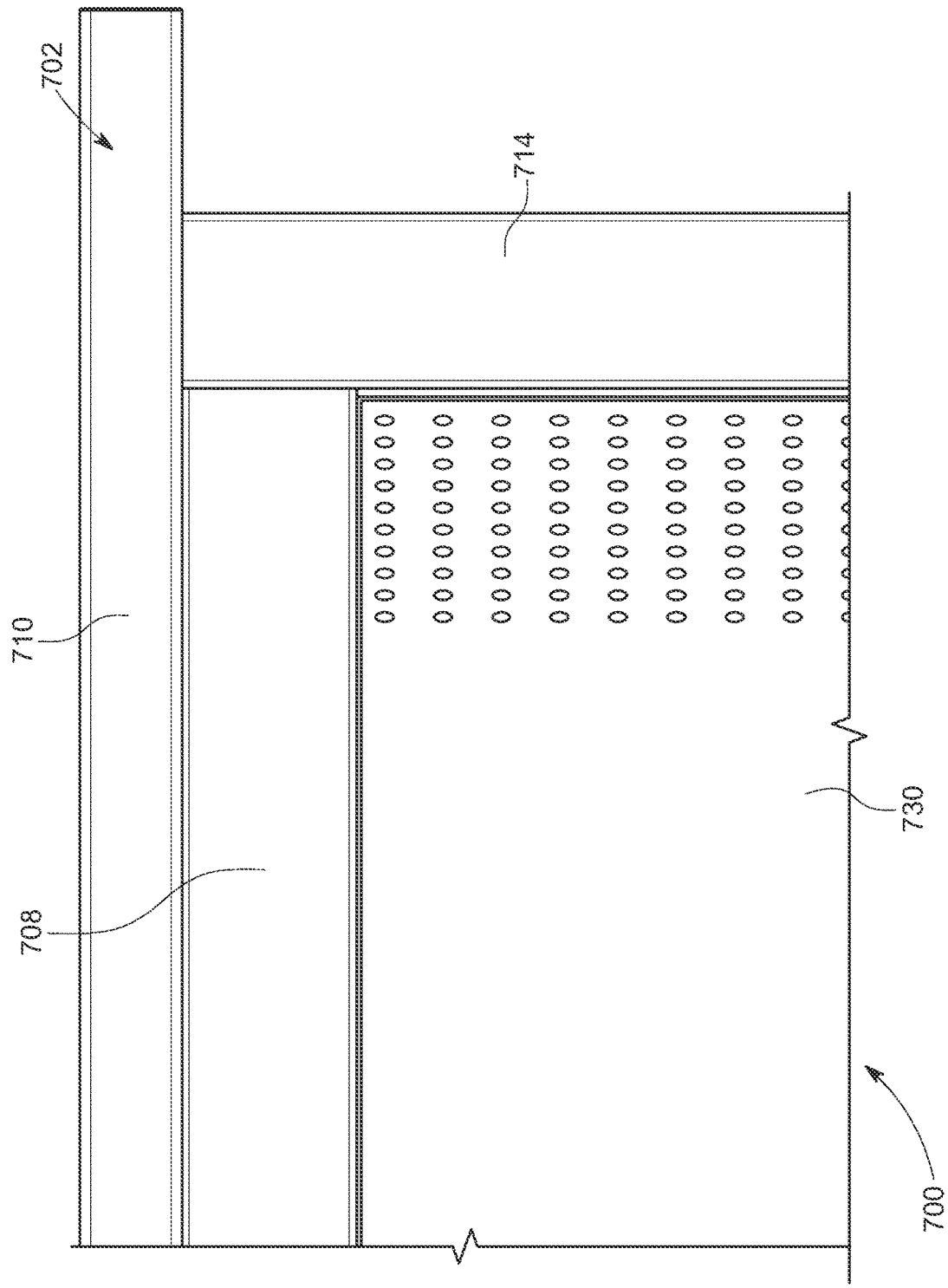
FIG. 35 is an enlarged fragmentary perspective view of the first side wall of the railroad car of FIG. 1.
Figure 36:
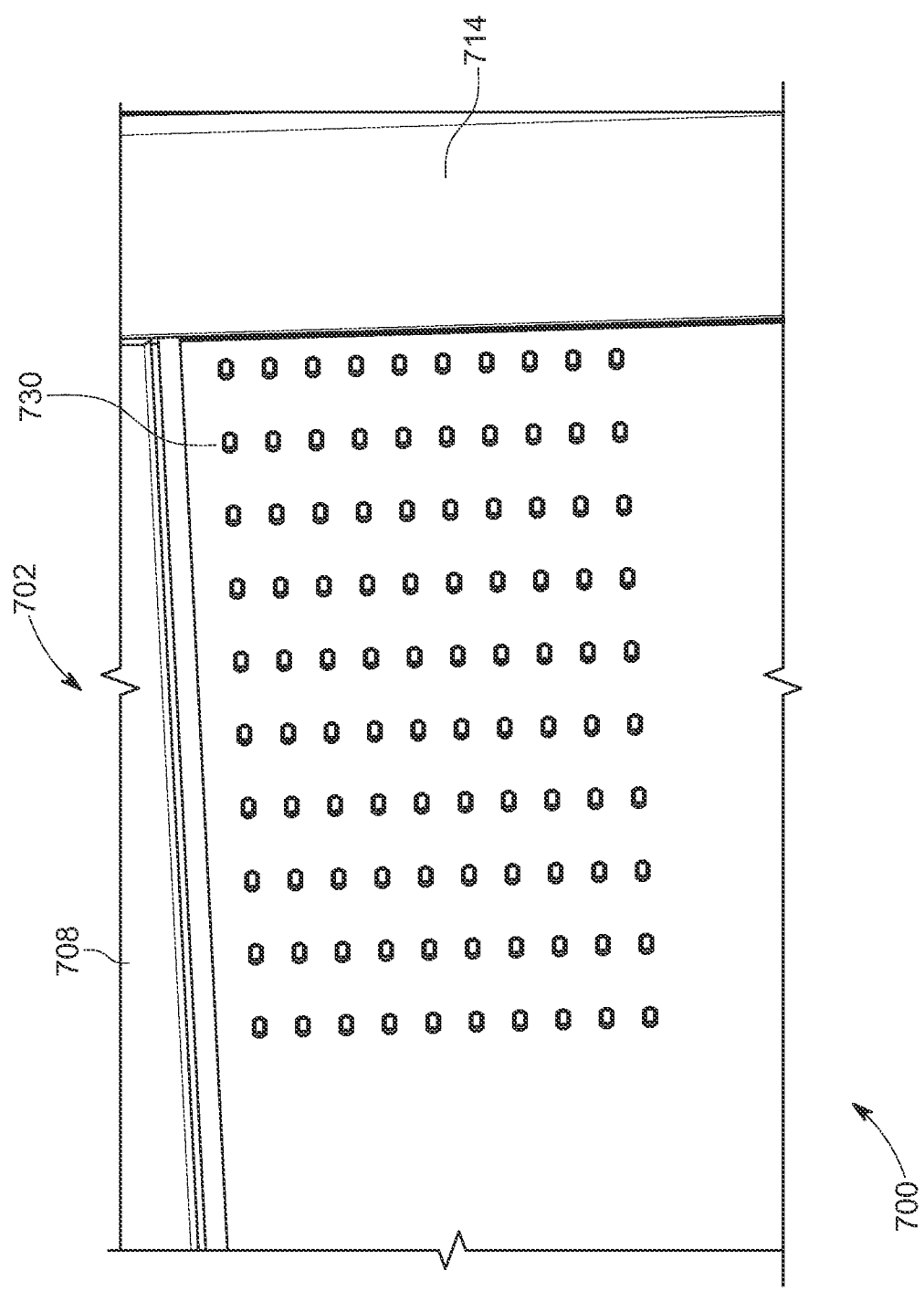
FIG. 36 is an enlarged fragmentary perspective view of the first side wall of the railroad car of FIG. 1.
Figure 37:
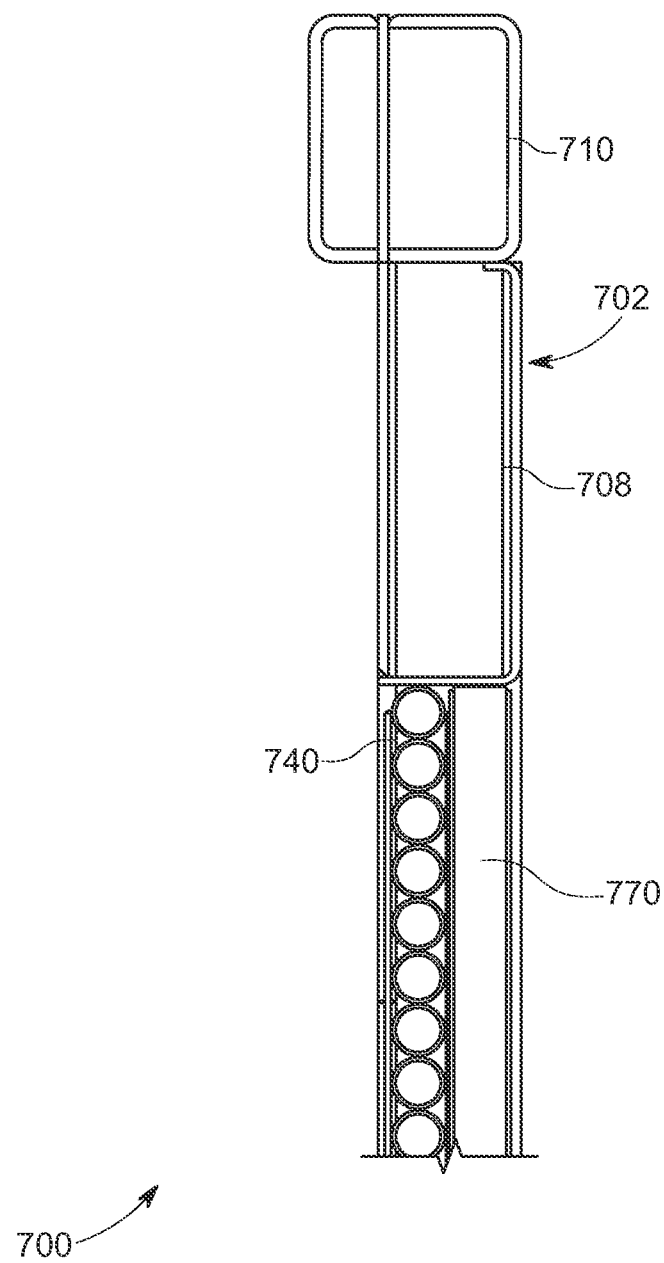
FIG. 37 is a first enlarged fragmentary vertical cross-sectional view of the first side wall of the railroad car of FIG. 1.
Figure 38:
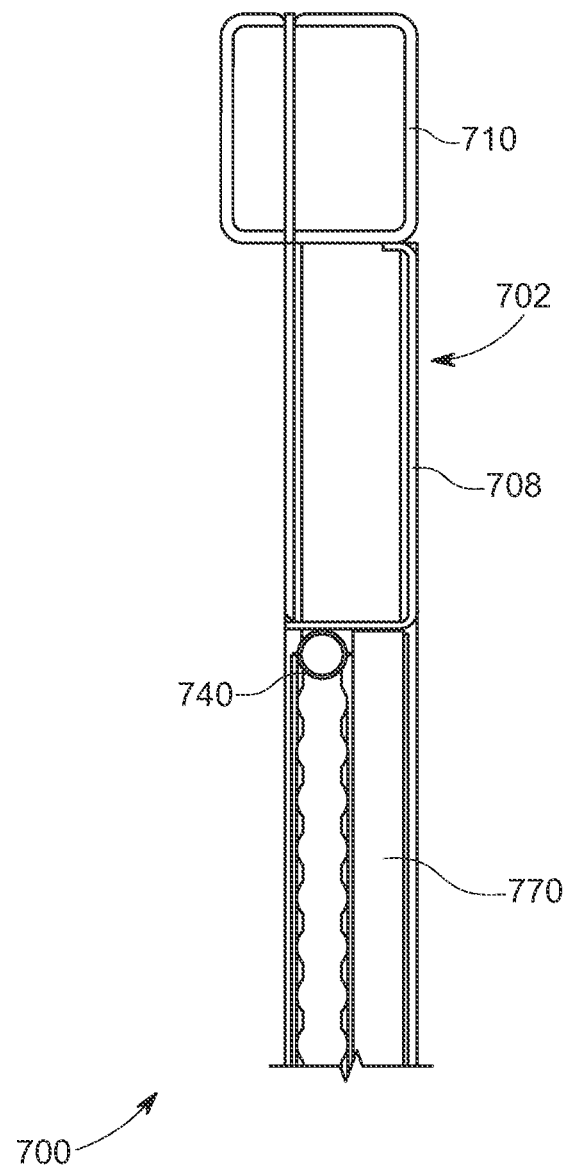
FIG. 38 is a second enlarged fragmentary vertical cross-section view of the first side wall of FIG. 1.
Figure 39:
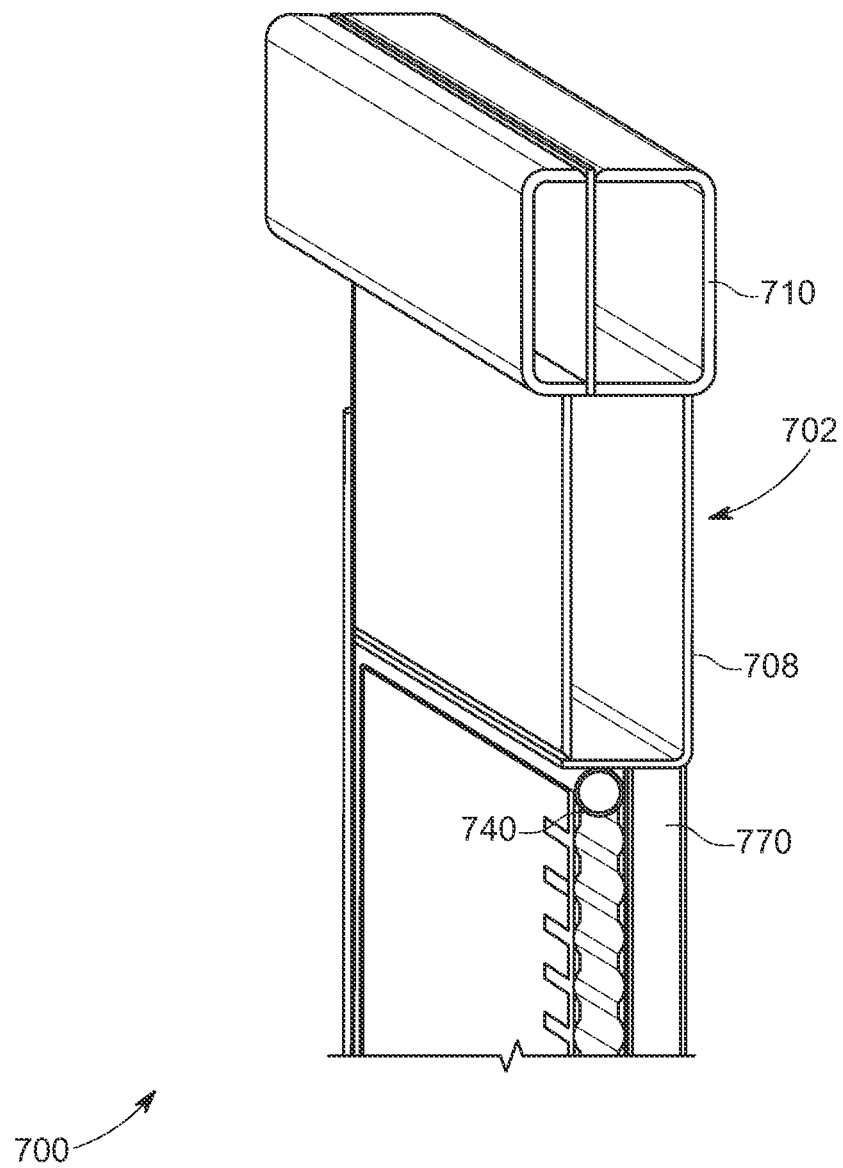
FIG. 39 is an enlarged fragmentary perspective view of the first side wall of FIG. 1.
Figure 40:
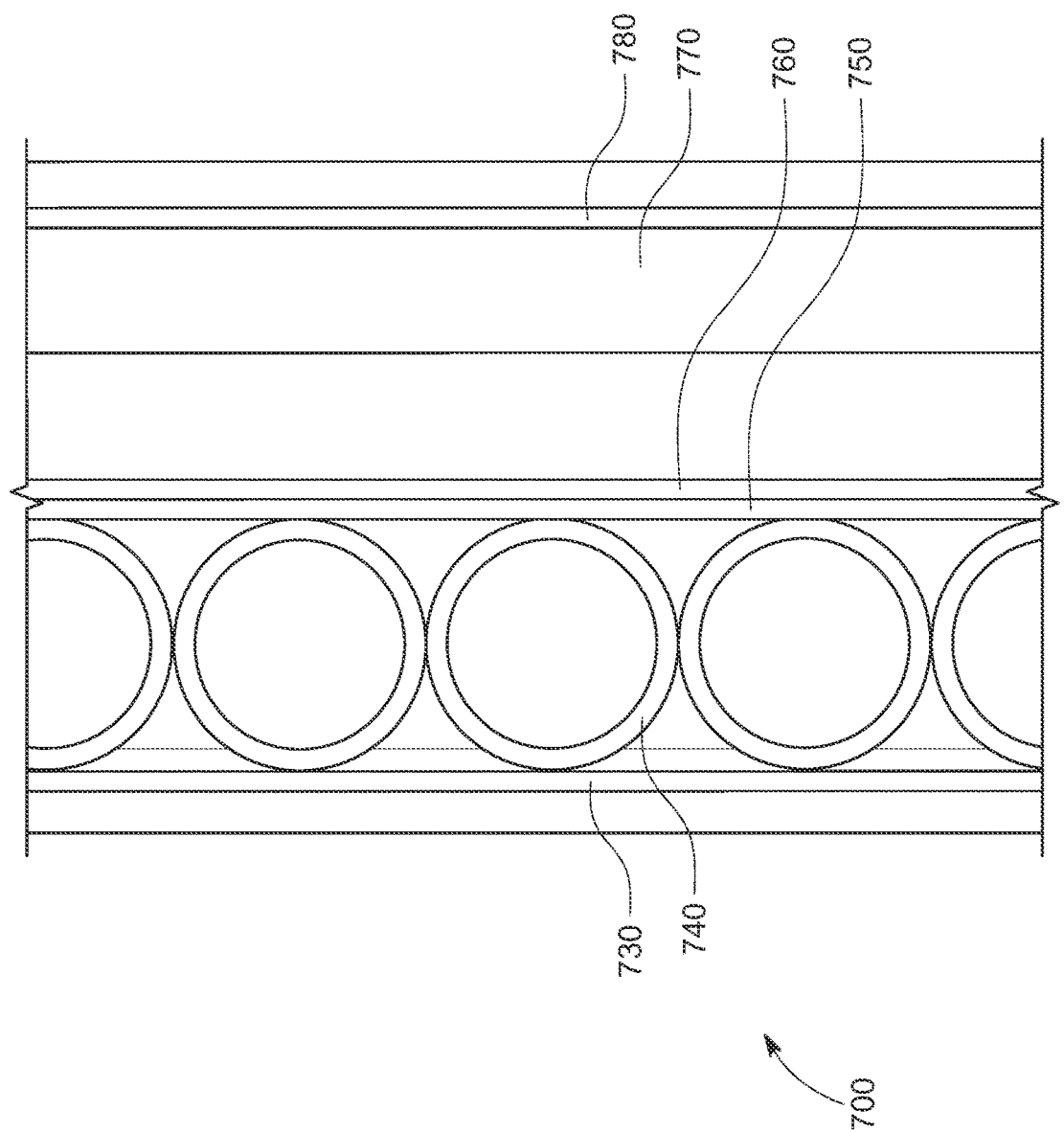
FIG. 40 is a further enlarged fragmentary vertical cross-sectional view of the side wall of the railroad car of FIG. 1.

As best shown in FIG. 28A, the upright first cylinder rack receiver 220 includes: (1) a first upright bracket 222 integrally connected to inner surface of the upright first side column 210; and (2) a second upright bracket 224 integrally connected to the upright first side column 210 and spaced apart from the first upright bracket 222. The first upright bracket 222 and the second upright bracket 224 define a first upright pocket 223 and are configured to receive and securely hold a first part of the first or outer cylinder rack 520 of the cylinder assembly 500. In this illustrated example embodiment, these components are all steel and are suitably welded to form such integral connections.

Likewise, the upright second cylinder rack receiver 240 includes: (1) a first upright bracket (not labeled) integrally connected to inner surface of the upright second side column 230; and (2) a second upright bracket (not labeled) integrally connected to the upright second side column 230 and spaced apart from the first upright bracket 242. The first upright bracket 242 and the second upright bracket 244 define a second upright pocket (not labeled) and are configured to receive and securely hold a second part of the first or outer cylinder rack 520 of the cylinder assembly 500. In this illustrated example embodiment, these components are all steel and are suitably welded to form such integral connections.

The upright wall 250 includes: (1) an upright first side column 260 integrally connected to the column 210 and integrally the top portion of the first end section 150; (2) an upright second side column 270 integrally connected to the column 230, integrally the top portion of the first end section 150, and spaced apart from first side column 260; (3) a upright transversely extending wall 280 integrally connected to the upright first side column 260 and the upright second side column 270; (4) a plurality of transversely extending spaced-apart braces 290a, 290b, 290c, and 290d extending between and integrally connected to the upright first side column 260 and the upright second side column 270, and integrally connected to the upright transversely extending wall 280; and (5) a transversely extending header 292 extending between and integrally connected to the upright first side column 260 and the upright second side column 270, and integrally connected to the upright transversely extending wall 280. In this illustrated example embodiment, these components are all steel and are suitably welded to form such integral connections.

The components of the first end bulkhead 200 individually and in combination function: (1) to absorb first end impact forces that engage the first end bulkhead 200; (2) to support the entire railroad car 10 if the railroad car 10 rolls over onto the first end bulkhead 200; (3) as penetration resistant structures to protect the cylinders of the cylinder assemblies 500 and 600, the pipes that communicate the gas from the cylinders, and the safety critical valves, regulators, and other equipment connected to such cylinders and pipes from font end impacts and damaging forces; and (4) as penetration resistant structures to protect the cylinders of the cylinder assemblies 500 and 600, the pipes that communicate the gas from the cylinders, and the safety critical valves, regulators, and other equipment connected to such cylinders and pipes from side impacts and damaging forces. The components of the first end bulkhead 200 also individually and in combination function to retain the cylinder assembly 500 in place under the acceleration and deceleration loads due to run-ins and hard coupling, as well as transverse, longitudinal, and lateral movements, all in accordance with specified in the M-1004 regulations mentioned above.

For example, these penetration resistant and otherwise protective structures protect against accidents that include side or top end impacts from other moving railroad cars, locomotives, vehicles, broken rails, or other objects or obstructions. In another example, these penetration resistant and otherwise protective structures are also configured to withstand forces from accidents where first end bulkhead 200 slides along one or more of the rails.

The present disclosure provides that: (1) the quantity of first end bulkhead(s) may vary; (2) the position(s) of the first end bulkhead(s) assemblies may vary; (3) the size, shape, and configuration of the first end bulkhead(s) may vary; (4) the material(s) that the first end bulkhead(s) is made from may vary; and/or (5) the attachment mechanisms used to connect the first end bulkhead(s) to the underframe may vary.

The penetration resistant second end bulkhead 300 is identical or substantially identical to the first end bulkhead 200 (except oppositely positioned) and is thus not described herein for brevity. It should also be appreciated that the components of the second end bulkhead 300 individually and in combination function: (1) to absorb second end impact forces that engage the second end bulkhead 300; (2) to support the entire railroad car 10 if the railroad car 10 rolls over onto the second end bulkhead 300; (3) as penetration resistant structures to protect the cylinders of the cylinder assemblies 500 and 600, the pipes that communicate the gas from the cylinders, and the safety critical valves, regulators, and other equipment connected to such cylinders and pipes from side end impacts and damaging forces; (4) as penetration resistant structures to protect the cylinders of the cylinder assemblies 500 and 600, the pipes that communicate the gas from the cylinders, and the safety critical valves, regulators, and other equipment connected to such cylinders and pipes from side impacts and damaging forces; and (5) to completely separate the gas containing cylinders from the electrical components of the railroad car 10. The components of the second end bulkhead 300 also individually and in combination function to retain the cylinder assembly 600 in place under the acceleration and deceleration loads due to run-ins and hard coupling, as well as transverse, longitudinal, and lateral movements, all in accordance with specified in the M-1004 regulations mentioned above.

For example, these penetration resistant and otherwise protective structures protect against accidents that include side or top end impacts from other moving railroad cars, locomotives, vehicles, broken rails, or other objects or obstructions. In another example, these penetration resistant and otherwise protective structures are also configured to withstand forces from accidents where second end bulkhead 300 slides along one or more of the rails.

It should further be appreciated that the second end bulkhead 300 does not need to be identical or substantially identical to the first end bulkhead 200 in accordance with the present disclosure.

The present disclosure provides that: (1) the quantity of second end bulkhead(s) may vary; (2) the position(s) of the second end bulkhead(s) assemblies may vary; (3) the size, shape, and configuration of the second end bulkhead(s) may vary; (4) the material(s) that the second end bulkhead(s) is made from may vary; and/or (5) the attachment mechanisms used to connect the second end bulkhead(s) to the underframe may vary.

As best shown in FIGS. 20, 21, 26, and 27, the penetration resistant center bulkhead 400 includes: (1) two spaced-apart upright first side outer columns 402 and 404 each integrally connected to the top portion of the first side wall 110 of the underframe 100; (2) two-spaced apart upright first side inner columns 406 and 408 each integrally connected to the top portion of the first side wall 110 of the underframe 100 and integrally connected to the respective columns 402 and 404; (3) an upright first cylinder rack receiver 410 integrally connected to the upright columns 402 and 406; (4) an upright second cylinder rack receiver 420 integrally connected to the upright columns 404 and 408; (5) two spaced-apart upright second side outer columns 432 and 434 each integrally connected to the top portion of the second side wall 140 of the underframe 100; (6) two-spaced apart upright second side inner columns 436 and 438 each integrally connected to the top portion of the second side wall 140 of the underframe 100 and integrally connected to the respective columns 432 and 434; (7) an upright first cylinder rack receiver 440 integrally connected to the upright columns 432 and 436; (8) an upright second cylinder rack receiver 450 integrally connected to the upright columns 434 and 438; (9) a top wall 460 integrally connected to the columns 406, 408, 436, and 438; (10) a first side wall 480 integrally connected to the columns 406 and 408; and (11)

a second wall 490 integrally connected to the columns 436 and 438. In this illustrated example embodiment, these components are all steel and are suitably welded to form such integral connections.

More specifically, (1) the upright first side column 402 includes an elongated tubular member having a bottom end integrally connected to the top portion of the first side wall 110 of the underframe 100; (2) the upright first side column 404 includes an elongated tubular member having a bottom end integrally connected to the top portion of the first side wall 110 of the underframe 100; (3) the upright second side column 432 includes an elongated tubular member having a bottom end integrally connected to the top portion of the second side wall 140 of the underframe 100; (4) the upright second side column 434 includes an elongated tubular member having a bottom end integrally connected to the top portion of the second side wall 140 of the underframe 100; (5) the upright first side inner column 406 includes an elongated tubular member having a bottom end integrally connected to the top portion of first side wall 110 of the underframe 100; (6) the upright first side inner column 408 includes an elongated tubular member having a bottom end integrally connected to the top portion of the first side wall 110 of the underframe 100; (7) the upright second side inner column 436 includes an elongated tubular member having a bottom end integrally connected to the top portion of the second side wall 140 of the underframe 100; and (8) the upright second side inner column 438 includes an elongated tubular member having a bottom end integrally connected to the top portion of the second side wall 140 of the underframe 100. In this illustrated example embodiment, these components are all steel and are suitably welded to form such integral connections.

The upright first cylinder rack receiver 410 includes: (1) a first upright bracket 410a integrally connected to inner surface of the upright first side column 402; and (2) a second upright bracket 410b integrally connected to inner surface of the upright first side column 406 and spaced apart from the first upright bracket 410a. The first upright bracket 410a and the second upright bracket 410b define a first upright pocket (not labeled) and are configured to receive and securely hold a first part of the second or inner cylinder rack 540 of the cylinder assembly 500. In this illustrated example embodiment, these components are all steel and are suitably welded to form such integral connections.

The upright second cylinder rack receiver 420 includes: (1) a first upright bracket 420a integrally connected to inner surface of the upright first side column 404; and (2) a second upright bracket 420b integrally connected to inner surface of the upright first side column 408 and spaced apart from the first upright bracket 420a. The first upright bracket 420a and the second upright bracket 420b define a second upright pocket (not labeled) and are configured to receive and securely hold a first part of the second or inner cylinder rack 640 of the cylinder assembly 600. In this illustrated example embodiment, these components are all steel and are suitably welded to form such integral connections.

The upright first cylinder rack receiver 440 includes: (1) a first upright bracket 440a integrally connected to inner surface of the upright first side column 432; and (2) a second upright bracket 440b integrally connected to inner surface of the upright first side column 436 and spaced apart from the first upright bracket 440a. The first upright bracket 440a and the second upright bracket 440b define a first upright pocket (not labeled) and are configured to receive and securely hold a first part of the second or inner cylinder rack 540 of the cylinder assembly 500. In this illustrated example embodiment, these components are all steel and are suitably welded to form such integral connections.

The upright second cylinder rack receiver 450 includes: (1) a first upright bracket 450a integrally connected to inner surface of the upright first side column 434; and (2) a second upright bracket 450b integrally connected to inner surface of the upright first side column 438 and spaced apart from the first upright bracket 450a. The first upright bracket 450a and the second upright bracket 450b define a second upright pocket (not labeled) and are configured to receive and securely hold a first part of the second or inner cylinder rack 640 of the cylinder assembly 600. In this illustrated example embodiment, these components are all steel and are suitably welded to form such integral connections.

The top wall 460 includes a transversely extending corrugated roof panel 470 integrally connected to the top portions of two spaced apart transversely extending roof panel supports 472 and 474, which are in turn respectively integrally connected to the top portions of the upright first side inner column 406, the upright first side inner column 408, the upright second side inner column 436, and the upright second side inner column 438. The top wall 460 further includes a transversely extending roof panel stiffener 476 integrally connected to the bottom of the transversely extending corrugated roof panel 470. In this illustrated example embodiment, these components are all steel and are suitably welded to form such integral connections.

The first side wall 480 includes an upright extending corrugated wall 486 extending between and integrally connected to the upright first side inner column 406 and the upright first side inner column 408. In this illustrated example embodiment, this component is steel and is suitably welded to form such integral connections.

Likewise, the first side wall 490 includes an upright extending corrugated wall 496 extending between and integrally connected to the upright first side inner column 436 and the upright first side inner column 438. In this illustrated example embodiment, this component is steel and is suitably welded to form such integral connections.

Figure 26:
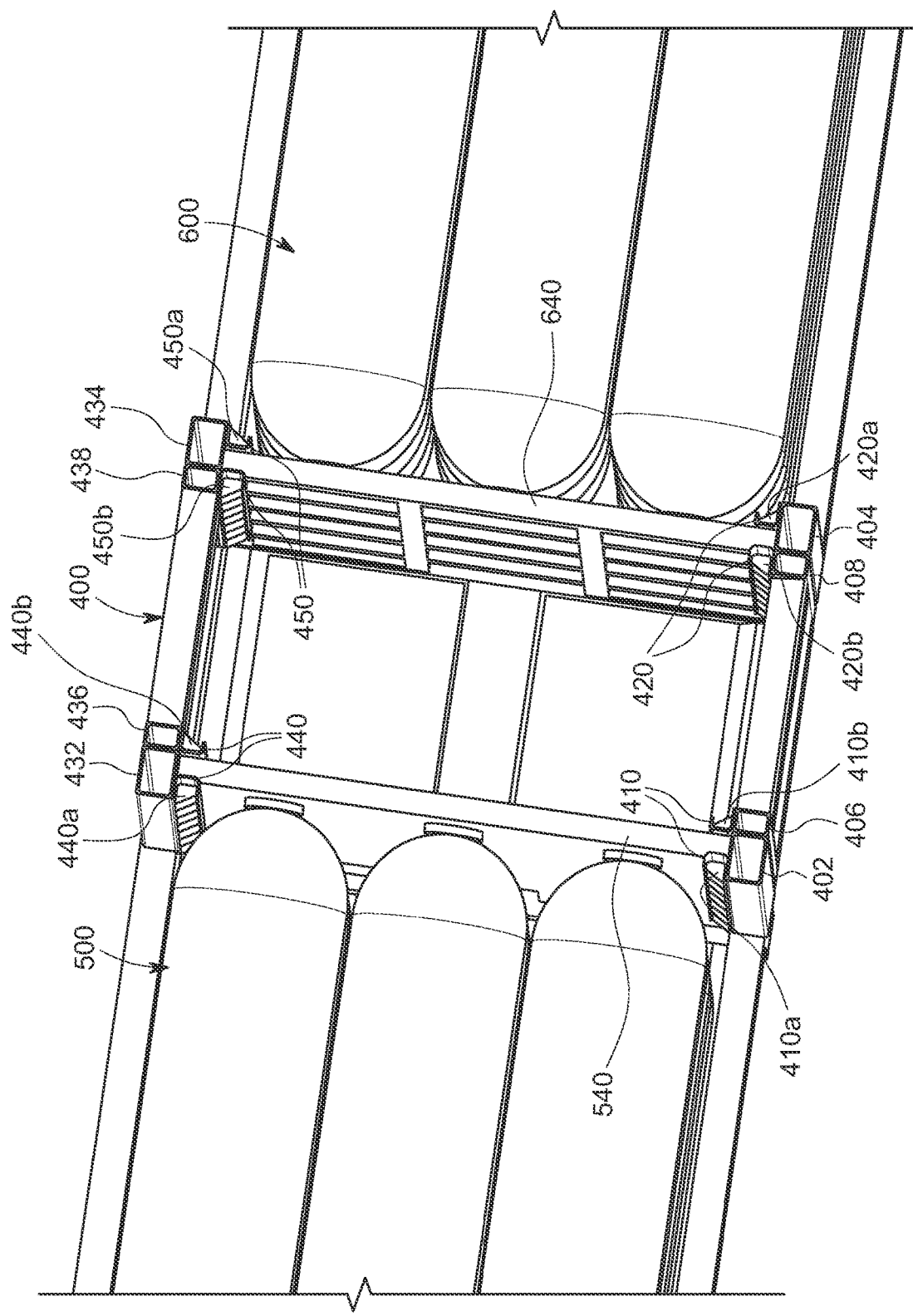
FIG. 26 is a fragmentary top perspective view of the underframe, the center bulkhead assembly, and the first cylinder assembly, and the second cylinder assembly of the railroad car of FIG. 1.
Figure 27:
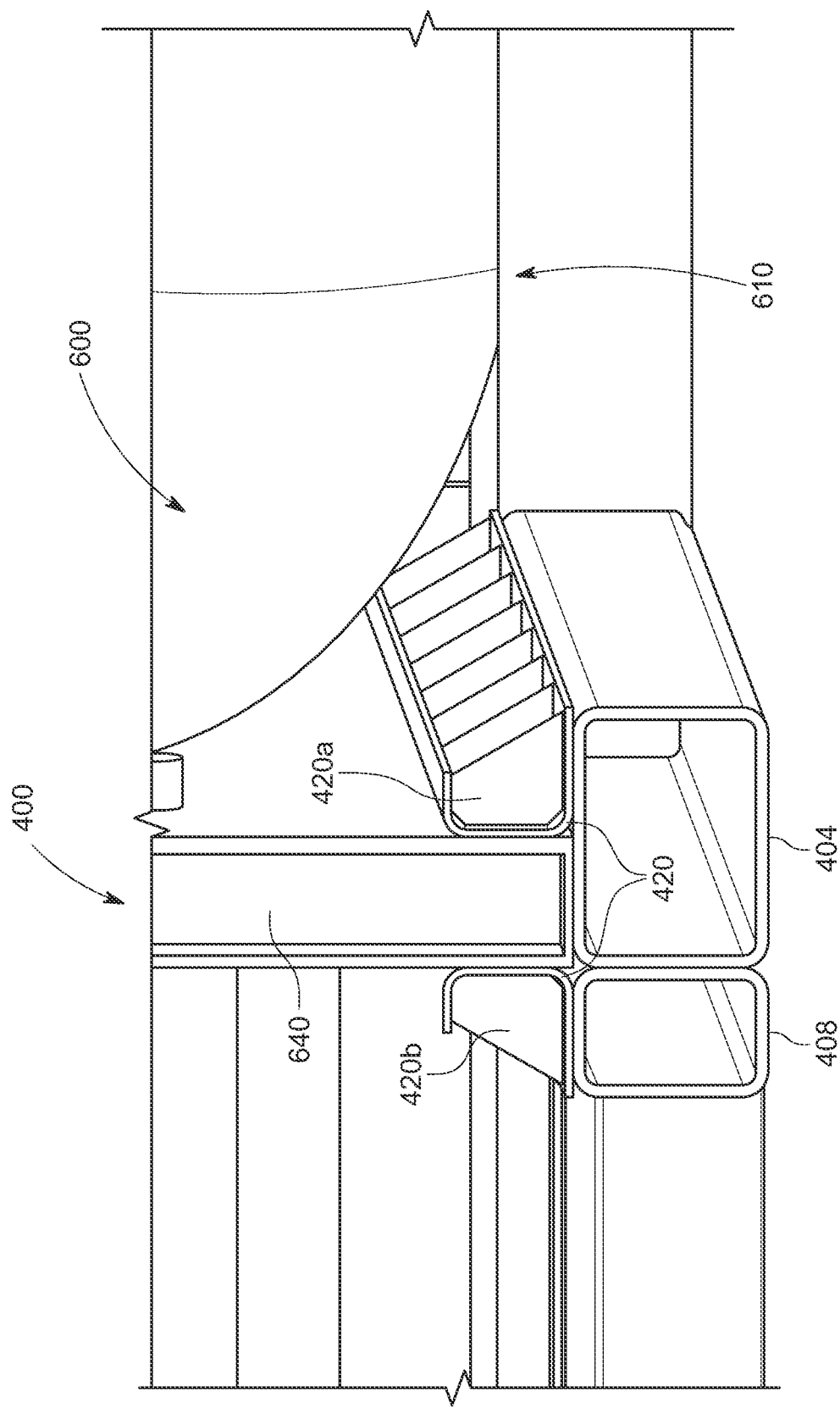
FIG. 27 is a further enlarged fragmentary top perspective view of the center bulkhead and the second cylinder assembly of the railroad car of FIG. 1.

In various example embodiments of the present disclosure, the center bulkhead 400 also includes a door (not shown) on each side and a walkway (not shown) between the cylinder racks 540 and 640 (as shown in FIG. 26). The center bulkhead 400 protects such the cylinder racks 540 and 640, the ends of the cylinder assemblies 500 and 600 adjacent to the center bulkhead 400, the gas pipes (not shown), and the various safety critical valves (not shown), regulators (not shown), and other equipment (not shown) in the central area of the railroad car. In an accident that includes certain types of side penetrations of the doors (that are primarily configured to keep out people and debris), the penetrating object may be able to pass between the cylinder racks 540 and 660, and thus minimize damage of any critical component in this central area. In other words, the safety critical piping, valves, regulators, and other equipment are protected by (and somewhat hidden behind) the columns 402, 404, 406, 408, 432, 434, 436, and 438 of the center bulkhead 400.

The components of the center bulkhead 400 individually and in combination function: (1) to absorb first end impact forces that engage the center bulkhead 400; (2) with the first end bulkhead 200 and the second end bulkhead 300 to support the entire railroad car 10 if the railroad car 10 rolls or over onto the first end bulkhead 200, the second end bulkhead 300, and the center bulkhead 400; (3) as penetration resistant structures to protect the cylinders of the cylinder assemblies 500 and 600, the pipes that communicate the gas from the cylinders, and the safety critical valves, regulators, and other equipment connected to such cylinders and pipes from tope end impacts and damaging forces; and (4) as penetration resistant structures to protect the cylinders of the cylinder assemblies 500 and 600, the pipes that communicate the gas from the cylinders, and the safety critical valves, regulators, and other equipment connected to such cylinders and pipes from side impacts and damaging forces. The components of the center bulkhead 400 also individually and in combination function to retain the cylinder assemblies 500 and 600 in place under the acceleration and deceleration loads due to run-ins and hard coupling, as well as transverse, longitudinal, and lateral movements, all in accordance with specified in the M-1004 regulations mentioned above.

It should be appreciated that in various embodiments of the present disclosure, the safety critical piping, valves, regulators, and other equipment can be protected by the center bulkhead 400 is a central area of the railroad car 10 that is spaced an adequate distance from potential electrical ignition sources in the compartment 1400 or at the locomotive in the event of a gas leak from one of those components in the central area. In other words, the cylinders are arranged in this example embodiment, such that they (unless otherwise ruptured) only release gas through valves in this central protected area.

For example, these penetration resistant and otherwise protective structures protect against accidents that include side or top end impacts from other moving railroad cars, locomotives, vehicles, broken rails, or other objects or obstructions. In another example, these penetration resistant and otherwise protective structures are also configured to withstand forces from accidents where center bulkhead 400 slides along one or more of the rails.

It should also be appreciated that the center bulkhead 400 is configured to protect various components positioned within the space defined by the center bulkhead 400. In various embodiments, these components include: (1) the gas release ends of the cylinders 510 and 610 of the respective cylinder assemblies 500 and 600; (2) the valves connected to those the gas release ends of the cylinders 510 and 610; (3) gas communication piper connected to the valves; and (4) sensors connected to the valves and gas communication pipes.

The present disclosure provides that: (1) the quantity of center bulkhead(s) may vary; (2) the position(s) of the center bulkhead(s) assemblies may vary; (3) the size, shape, and configuration of the center bulkhead(s) may vary; (4) the material(s) that the center bulkhead(s) is made from may vary; and/or (5) the attachment mechanisms used to connect the center bulkhead(s) to the underframe may vary.

Cylinder Assemblies

As best shown in FIGS. 2, 22, and 23 to 29, the first cylinder assembly 500 includes: (1) a plurality of separate elongated cylinders 510 (not individually labeled); (2) a first or outer cylinder holder rack 520; (3) a plurality of first cylinder and rack connectors (not shown); (4) a second or inner cylinder holder rack 540; (5) a plurality of second end cylinder rack connectors (not shown); and (6) a plurality of force spreaders (not shown in FIGS. 1 to 45 but shown in FIGS. 46 to 50 and described below).

The cylinders 510 are arranged such that the ends of the cylinders at or toward the center of the railroad car 10 are configured with suitable valves (not shown) to enable discharge of the compressed natural gas held in the cylinders through these valves.

The first or outer cylinder holder rack 520 generally includes a wall 521 that defines a plurality of openings (not shown or labeled) that are configured to respectively slidably receive the plurality of first cylinder and rack connectors that are in turn connected to the ends of the respective cylinders. This arrangement enables the expansion and contraction of the cylinders 510, and thus the relative movement of the cylinders and the first or outer cylinder holder rack 520. The second or inner cylinder holder rack 540 includes a wall 541 that defines a plurality of section (not labeled) that are configured to be respectively support the plurality of valves connected to the ends of the respective cylinders. This arrangement allows for the controlled release of the natural gas through the valve at the center portion of the railroad car. It should be appreciated that the penetration resistant structures described above also protect against damage to these valves.

As mentioned above, the first or outer cylinder holder rack 520 is configured to be positioned in the upright pockets 223 and 243 respectively defined by the upright first cylinder rack receiver 220 of the first end bulkhead 200 and the upright second cylinder rack receiver 240 of the first end bulkhead 200, and integrally connected to the upright first cylinder rack receiver 220 and the upright second cylinder rack receiver 240.

Likewise, as also mentioned above, the second or inner cylinder holder rack 540 is configured to be positioned in the upright pockets defined by the upright first cylinder rack receiver 410 of the central bulkhead 400 and upright second cylinder rack receiver 420 of the central bulkhead 400, and integrally connected to the upright first cylinder rack receiver 220 and the upright second cylinder rack receiver 240.

In various embodiments, first cylinder assembly 500 is configured to allow the cylinders to detach from one or both of the holder racks 520 and 540 to enable the cylinders 510 to bunch up to absorb certain forces and thus prevent rupturing of the cylinders 510. In certain such embodiments, the cylinders 510 are attached by suitable fasteners such as bolts (not show) to the holder racks 520 and 540 that are configured to break when certain force are applied to such fasteners. Thus, such fasteners are sacrificial to a certain extent.

The second cylinder assembly 600 is identical or substantially identical to the first cylinder assembly 500 (except oppositely positioned) and is thus not described herein for brevity. It should further be appreciated that the second cylinder assembly 600 does not need to be identical or substantially identical to the first cylinder assembly 500 in accordance with the present disclosure.

The present disclosure provides that: (1) the quantity of cylinder assemblies may vary; (2) the positions of the cylinder assemblies may vary; (3) the sizes, shape, and configuration of the cylinder assemblies may vary; (4) the material(s) that the cylinder assemblies are made from may vary; and/or (5) the attachment mechanisms used to connect the cylinder assemblies to the underframe and bulkheads may vary.

The present disclosure provides that: (1) the quantity of cylinders of each cylinder assembly may vary; (2) the positions of the cylinders in the cylinder assemblies may vary; (3) the sizes, shape, and configuration of the cylinders of the cylinder assemblies may vary; (4) the material(s) that the cylinders are made from may vary; and/or (5) the attachment mechanisms used to connect the cylinders to the racks of the cylinder assemblies may vary.

The present disclosure provides that: (1) the quantity of racks of each cylinder assembly may vary; (2) the positions of the racks of the cylinder assemblies may vary; (3) the sizes, shape, and configuration of the racks of the cylinder assemblies may vary; (4) the material(s) that the racks are made from may vary; and/or (5) the attachment mechanisms used to connect the racks to the underframe and bulkhead may vary.

First, Second, Third, and Fourth Side Walls

Turning now to FIGS. 1, 2, and 30 to 40, in this illustrated example embodiment, the penetration resistant first side wall 700 includes: (1) an outer frame 702; (2) a first (outer) panel 730; (3) a layer of a plurality of longitudinally horizontally extending first (outer) crushable tubes 740; (4) a second (interior) panel 750; (5) a third (interior) panel 760; (6) a layer of a plurality of upright vertically extending second (interior) crushable tubes 770; and (7) a fourth (inner) panel 780. In this illustrated example embodiment, these components are all steel and are suitably welded to form such integral connections.

More specifically, the outer frame 702 includes: (1) a first bottom member 704; (2) a second bottom member 706; (3) a first top member 708; (4) a second top member or rail 710; (5) a first upright member 712; and (6) a second upright member 714. The first bottom member 704 and the second bottom member 706 are integrally connected to the first upright member 712 and the second upright member 714. The first top member 708 and the second top member or rail 710 are integrally connected to the first upright member 712 and the second upright member 714. The outer frame 702 supports and is integrally connected to each of the first (outer) panel 730, the layer first (outer) tubes 740, the second (interior) panel 750, the third (interior) panel 760, the layer of second tubes 770, and the fourth (interior) panel 780. In this example illustrated embodiment, these components are all steel and are suitably welded to form such integral connections.

It should also be appreciated that the second top member or rail 710 is integrally connected to and integrally connects the first end bulkhead 200 and the center bulkhead 400 in this example embodiment.

In this illustrated example embodiment, the first (outer) panel 730 is substantially rectangular and includes a plurality of openings (not labeled) that facilitate welding (such as plug welding) of the first (outer) panel 730 to the plurality of longitudinally horizontally extending first (outer) tubes 740. It should be appreciated that only certain of these opening are shown in the figures.

Likewise, the second (interior) panel 750 is substantially rectangular and includes a plurality of openings (not shown or labeled) that facilitate welding (such as plug welding) of the second (interior) panel 750 to the plurality of longitudinally horizontally extending first (outer) tubes 740.

Likewise, the third (interior) panel 760 is substantially rectangular and includes a plurality of openings (not shown or labeled) that facilitate welding (such as plug welding) of the third (interior) panel 760 to the plurality of upright vertically extending second (inner) tubes 770.

Likewise, the fourth (interior) panel 780 is substantially rectangular and includes a plurality of openings (not shown or labeled) that facilitate welding (such as plug welding) of the fourth (interior) panel 780 to the plurality of upright vertically extending second (inner) tubes 770.

In this illustrated example embodiment, these components are all steel and are suitably welded (such as by stitch and plug welding) to form such integral connections. It should be appreciated that the opening and welds that are employed to securely attach the tubes 740 and 770 can be arranged in any suitable manner. In certain embodiments, the welds are staggered from one tube to the next tube.

The layer of longitudinally horizontally extending first (outer) tubes 740 includes a plurality of elongated cylindrical tubes (not individually labeled) positioned in a side by side manner. Each of these tubes 740 is integrally connected (by welding) between tubes and to the first (outer) panel 730 and the second (interior) panel 750.

Likewise, the layer of upright vertically extending second tubes 770 includes a plurality of elongated cylindrical tubes (not individually labeled) positioned in a side by side manner.

Each of these tubes 770 is integrally connected (by welding) between tubes and to the third (interior) panel 760 and the fourth (interior) panel 780. In this illustrated example embodiment, these components are all steel and are suitably welded to form such integral connections.

In various example embodiments of the present disclosure, each of the horizontally extending and vertically extending tubes is of a same length, same outer dimension, and same material. It should be appreciated that one or more of the tubes can be of different lengths, different out dimensions, and different materials in accordance with the present disclosure. In various example embodiments, each of the tubes: (1) has about a 1.5 inch outside diameter; (2) is structural steel tubing; and (3) has about an 11 gauge wall thickness. In various other example embodiments, the tubes can have an outside diameter ranging from ½ inch to 3 inches, can be made from other materials, and can have other wall thicknesses.

In various example embodiments of the present disclosure, the adjacent tubes of each set of tubes are welded together with a skip weld on both sides (including about 1.5 inches of weld about every 6 inches along the adjacent tubes). In various embodiments, these welds control the manner in which the tube walls or tube set buckle if they are squeezed in an accident. It should be appreciated that relatively smaller diameter tubes provide higher forces, shorter crush distances, and lower energy absorbed from the impact.

In various example embodiments of the present disclosure, one or more of the tubes can include one or more suitable fillers that can increase the forces absorbed, that can shorten the crush length, and that may absorb certain additional amounts of energy.

In various example embodiments of the present disclosure, the outer panels are high strength steel sheets having about an 11 gauge wall thickness and slotted for the plug welding to the respective tubes. The plug welding keeps the tubes from moving around as they are crushed. The high strength steel reduces the chances that an object will slice through the panel. In various other example embodiments, the outer panels can have an a thickness ranging from about ¼ inch to about 1 inch.

This configuration of the first side wall 700 and particularly the first (outer) panel 730, the layer of longitudinally horizontally extending first (outer) tubes 740, the second (interior) panel 750, the third (interior) panel 760, the layer of a plurality of upright vertically extending second tubes 770, and the fourth (inner) panel 780 provides a penetration resistant structure wherein, when an object strikes the outer first (outer) panel 730, the force of that strike is transmitted respectively to each of the layers or panels to spread out the force. Specifically, the force is first transmitted to the layer of longitudinally horizontally extending first (outer) tubes 740 that is configured to be crushed and spread out the force horizontally, then transmitted to the second (interior) panel 750, then transmitted to the third (interior) panel 760, then transmitted to the layer of upright vertically extending second tubes 770 that is configured to be crushed and spread out the force vertically, and then transmitted to the fourth (inner) panel 780. Thus, the multiple layers function together to spread out the forces in multiple different directions before reaching the cylinder assemblies 500 and 600.

The components of the side wall 700 individually and in combination function: (1) to absorb and spread out side end impact forces that engage the side wall 700; and (2) as penetration resistant structures to protect the cylinders from side impacts.

For example, these penetration resistant and otherwise protective structures protect against accidents that include side end impacts from other moving railroad cars, locomotives, vehicles, broken rails, or other objects or obstructions. In another example, these penetration resistant and otherwise protective structures are also configured to withstand forces from accidents where side wall 700 slides along one or more of the rails.

The penetration resistant and protective second, third, and fourth side walls 800, 900, and 1000 are identical or substantially identical to the first side wall 700 (except oppositely positioned) and is thus not described herein for brevity. It should be appreciated that the components of each of the side walls 800, 900, and 1000 likewise individually and in combination function: (1) to absorb and spread out side end impact forces that engage that side wall; and (2) as penetration resistant structures to protect the cylinders of the cylinder assemblies 500 and 600, the pipes that communicate the gas from the cylinders, and the safety critical valves, regulators, and other equipment connected to such cylinders and pipes from side impacts and damaging forces. It should further be appreciated that the second, third, and fourth side walls 800, 900, and 1000 do not need to be identical or substantially identical to the first side wall 700 in accordance with the present disclosure.

The present disclosure provides that: (1) the quantity of side wall may vary; (2) the positions of the side walls may vary; (3) the size, shape, and configuration of the side walls may vary; (4) the material(s) that the side walls are made from may vary; and/or (5) the attachment mechanisms used to attach the side walls to the underframe and the bulkheads may vary.

Roof Hatches

Turning now to FIGS. 1, 2, 3, and 41 to 45, the first roof hatch 1100 is configured to be suitably connected to the first section of the railroad car 10 above the first cylinder assembly 500. The first roof hatch 1100 includes: (1) an elongated generally rectangular panel 1102; (2) a first side elongated downwardly extending lip 1104 integrally connected to a first side of the elongated panel 1102; (3) a second side elongated downwardly extending lip 1106 integrally connected to a second side of the elongated panel 1102; and (4) a plurality of supporting braces such as transversely extending supporting braces integrally connected to a bottom surface of the elongated panel 1102. The elongated panel can in certain embodiments have a curved or convex outer surface in a transverse direction for facilitating drainage of water off of the first roof hatch 1100.

Figure 41:
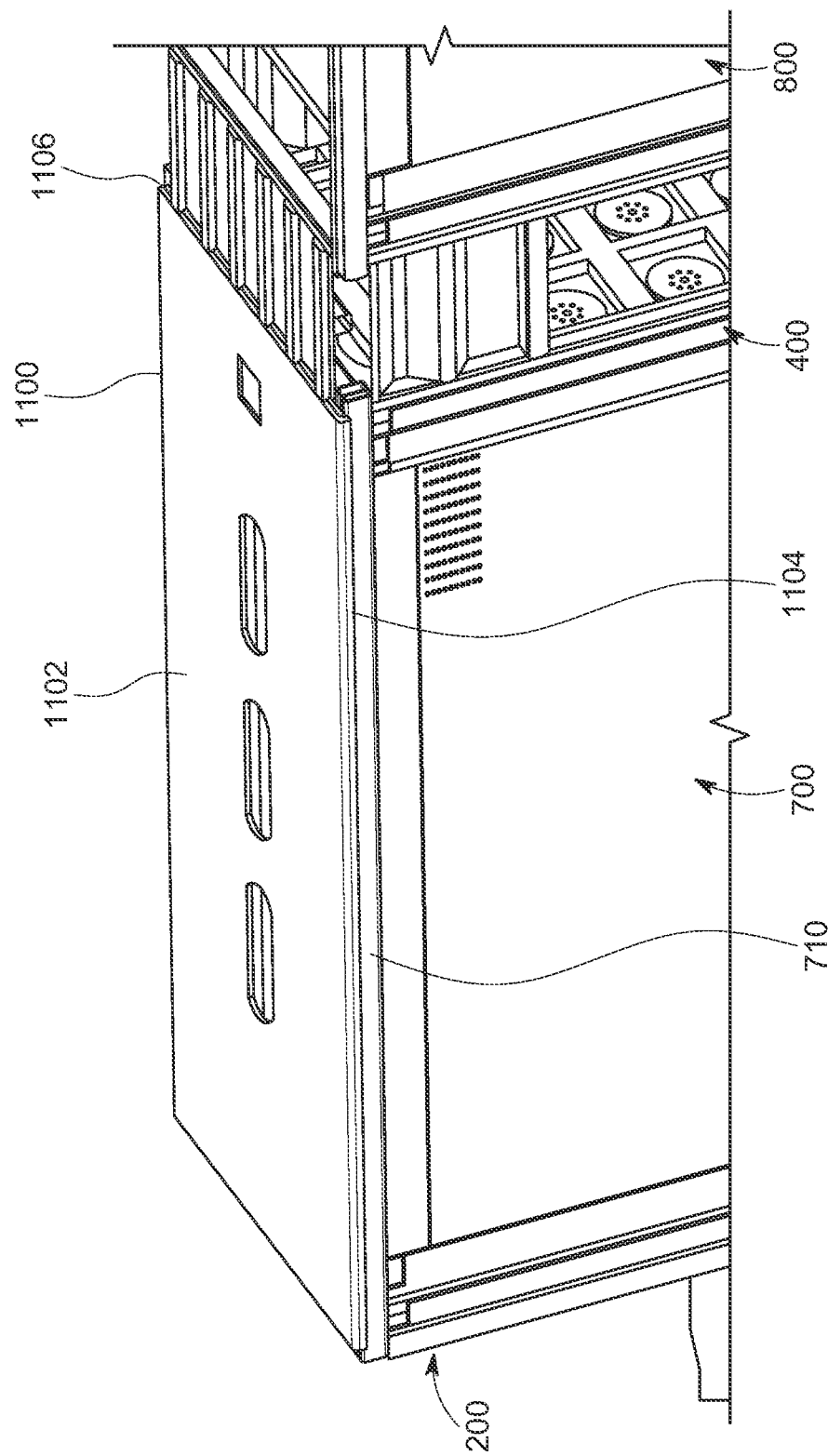
FIG. 41 is an enlarged fragmentary top perspective view of the first end bulkhead, the center bulkhead, the first side wall, the second side wall, and the first roof hatch of the railroad car of FIG. 1.
Figure 42:
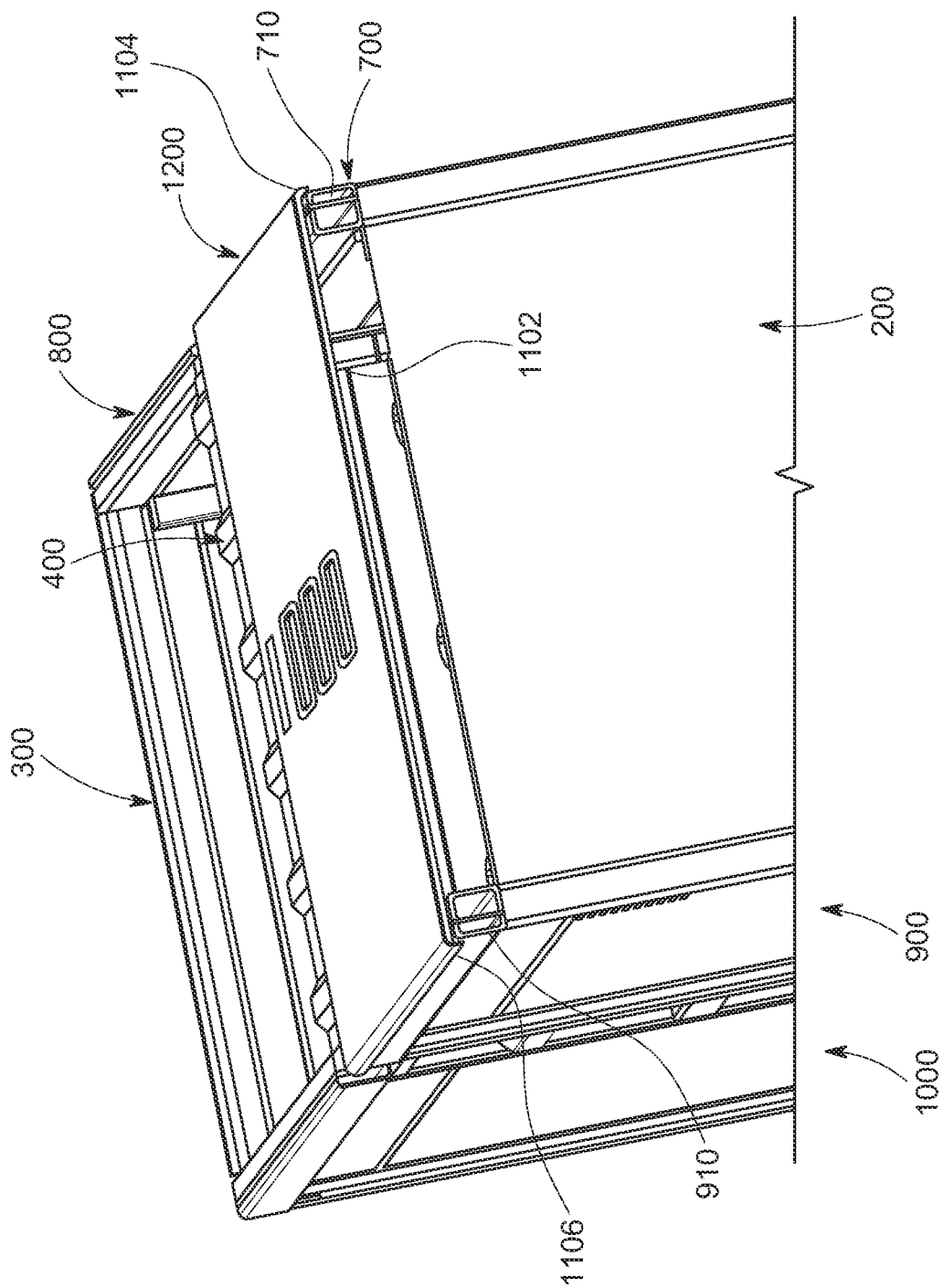
FIG. 42 is an enlarged fragmentary end perspective view of the first end bulkhead, the second end bulkhead, the first, second, third, and fourth side walls, and the first hatch of the railroad car of FIG. 1.
Figure 43:
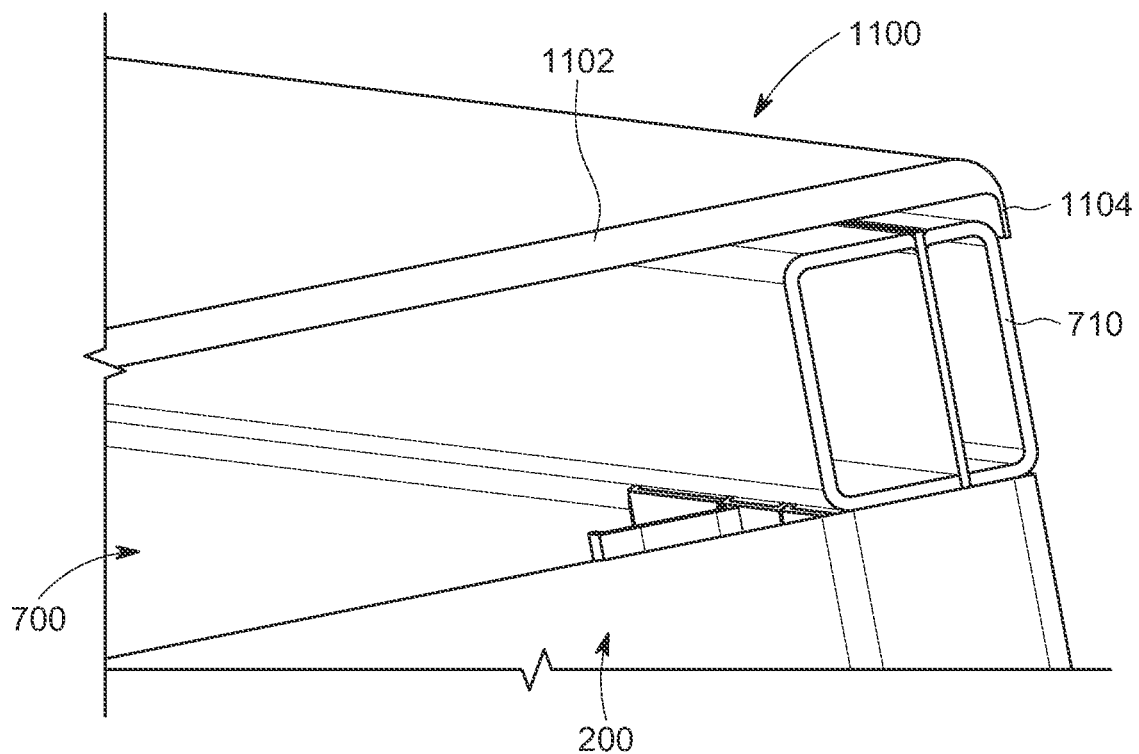
FIG. 43 is a further enlarged fragmentary perspective view of the first end bulkhead, the first side wall, and the first roof hatch of the railroad car of FIG. 1.
Figure 44:
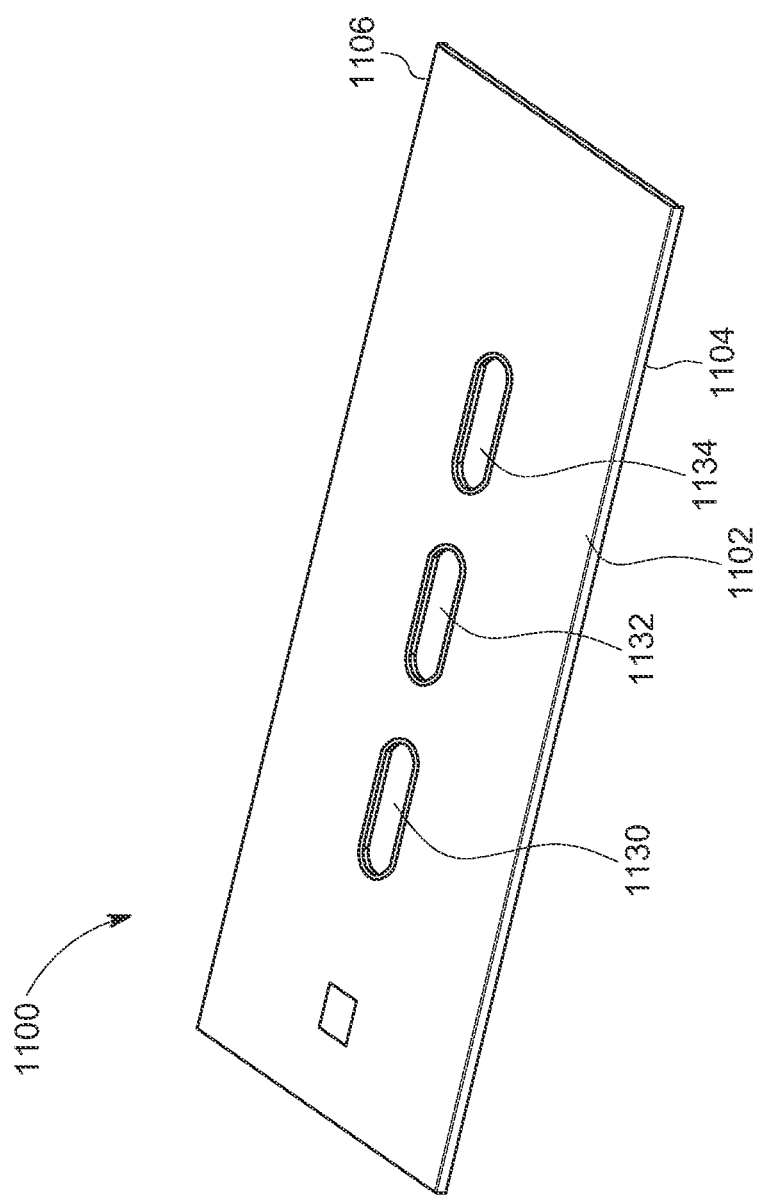
FIG. 44 is an enlarged top perspective view of the first roof hatch of the railroad car of FIG. 1.
Figure 45:
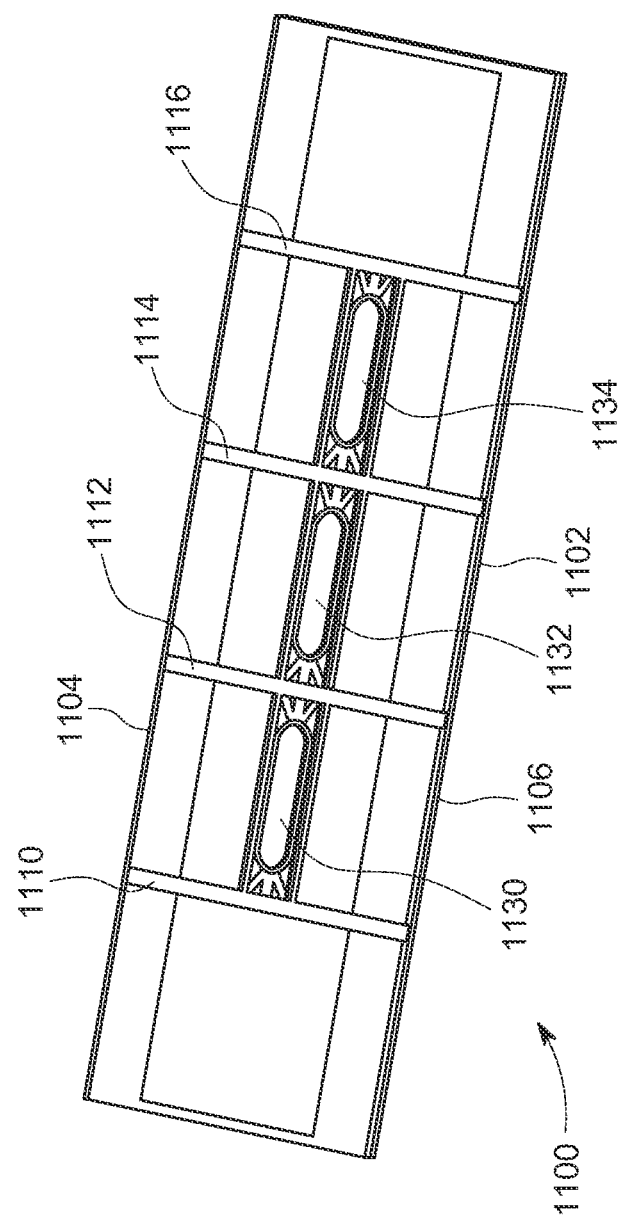
FIG. 45 is an enlarged bottom perspective view of the first roof hatch of the railroad car of FIG. 1.
Figure 46:
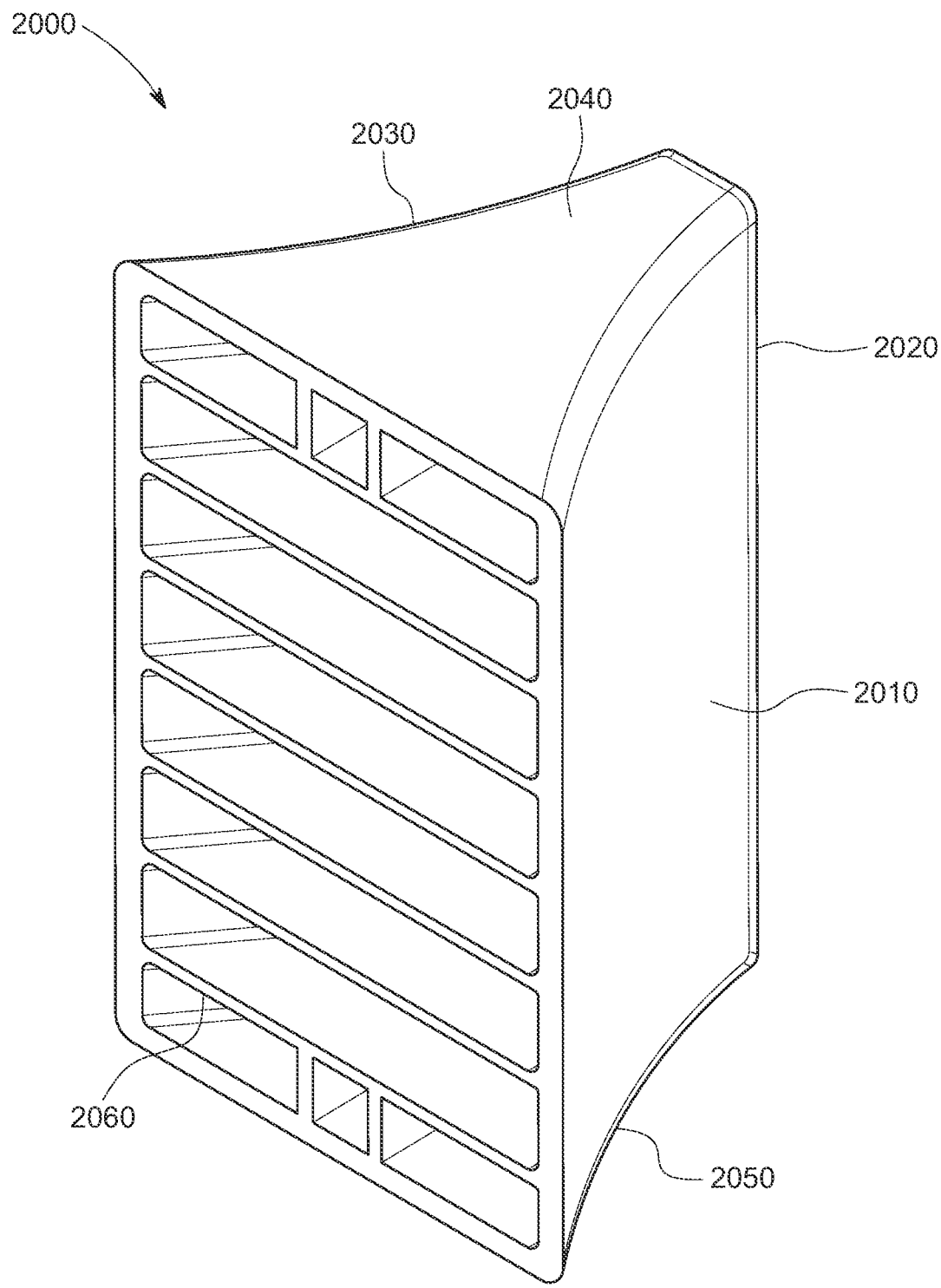
FIG. 46 is a rear perspective view of one example cylinder force spreader of the present disclosure configured to be employed in the railroad car of FIG. 1.
Figure 47:
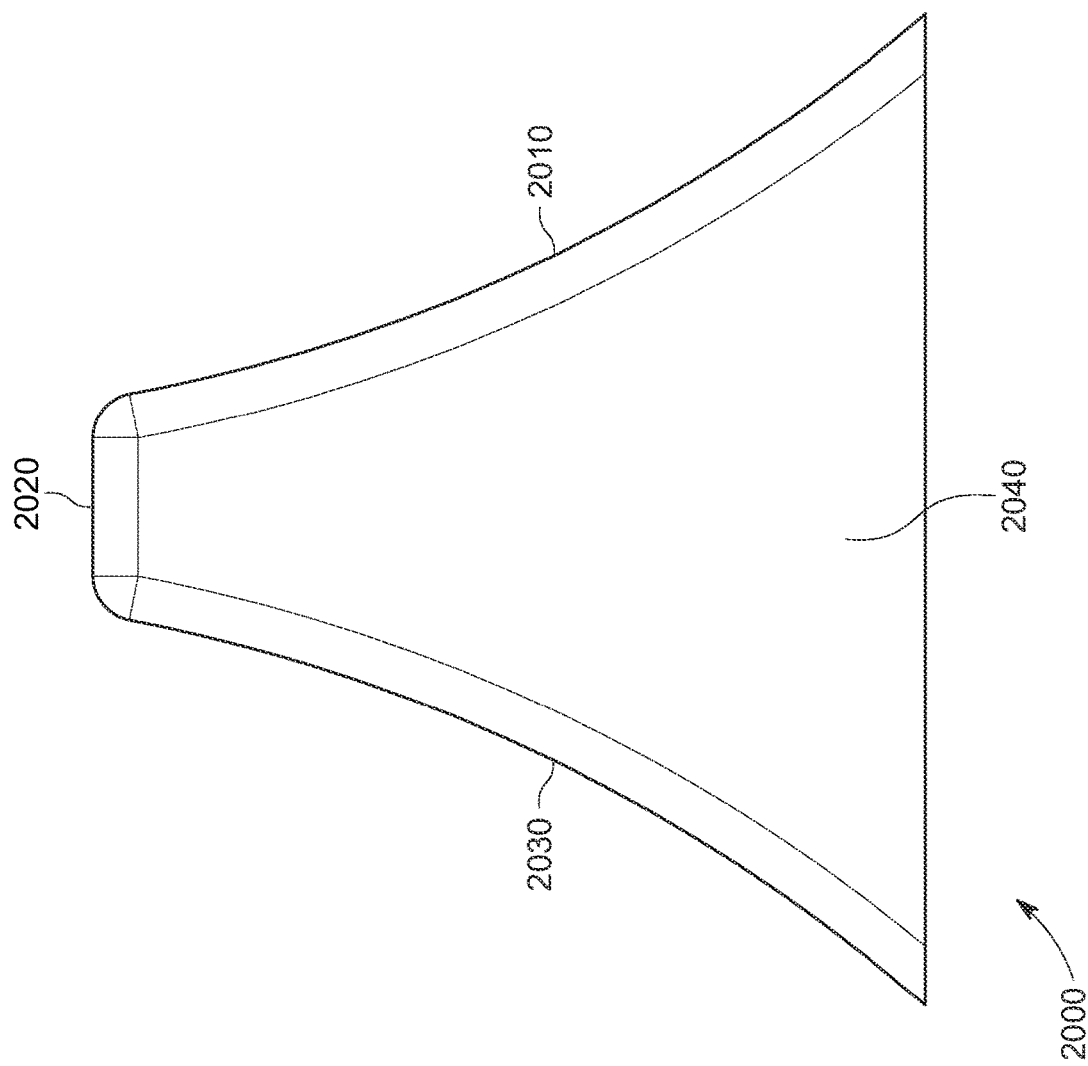
FIG. 47 is a top view of the cylinder force spreader of FIG. 46.
Figure 48:
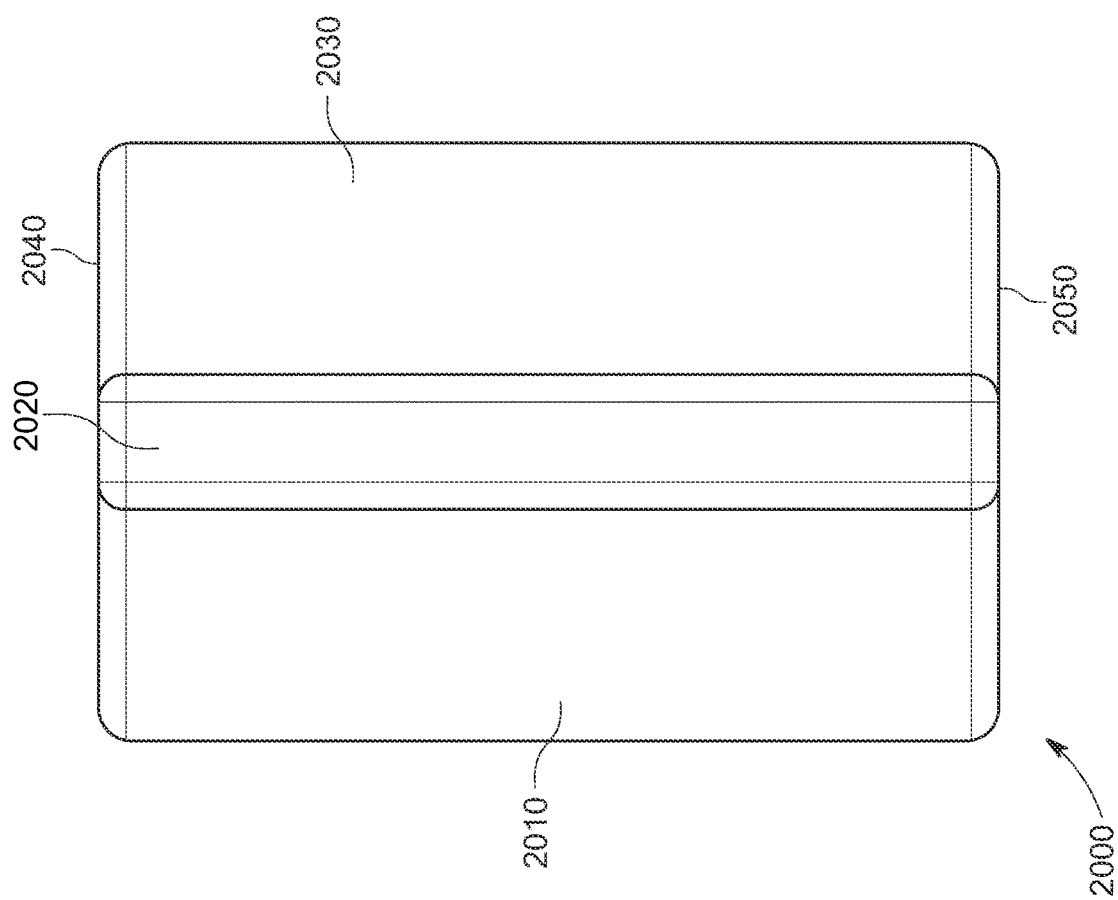
FIG. 48 is a front view of the cylinder force spreader of FIG. 46.
Figure 49:
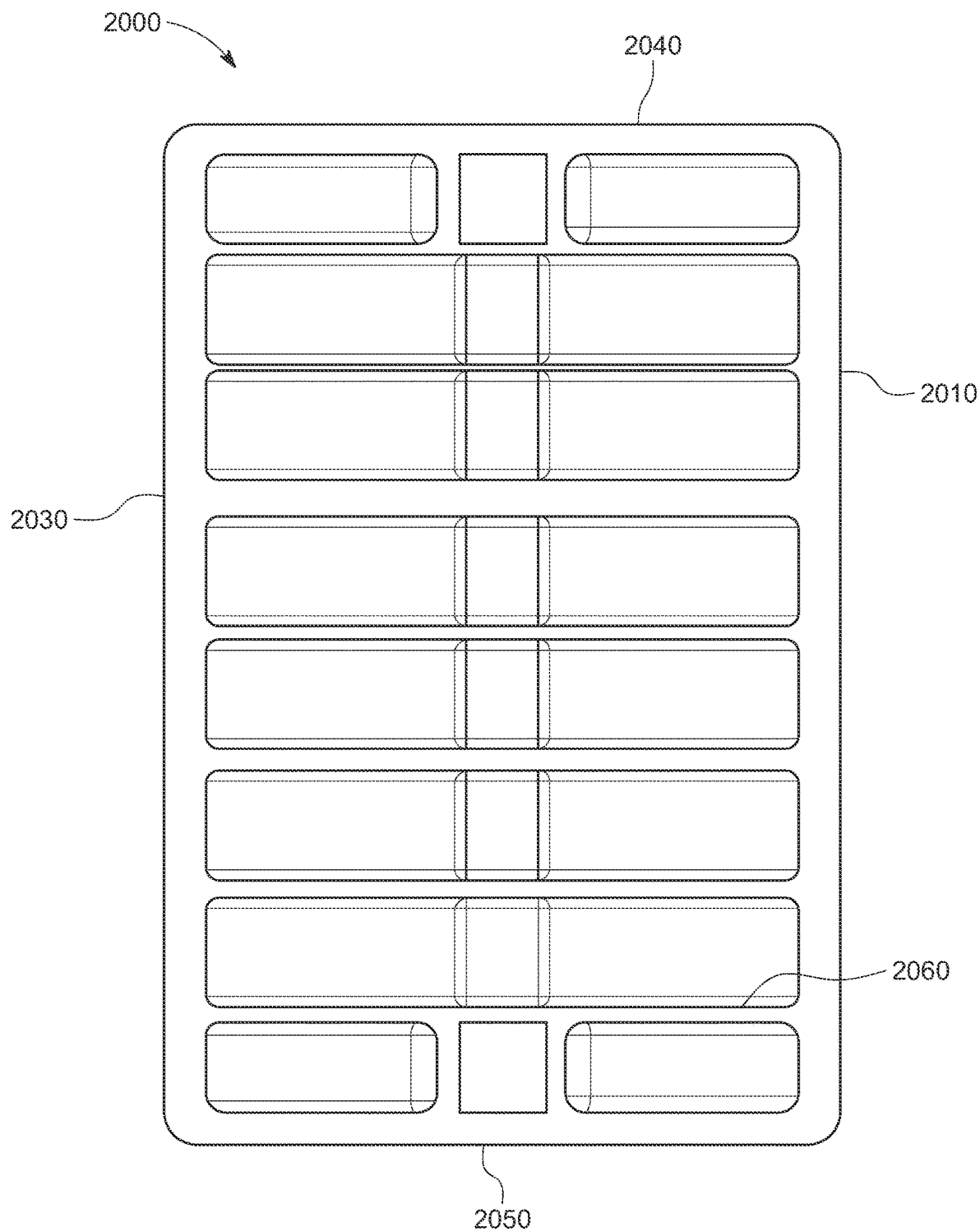
FIG. 49 is a rear view of the cylinder force spreader of FIG. 46.

The first roof hatch 1100 is integrally connected to the side wall panels 700 and 900, and particularly to the respective outer frames of the side wall panels 700 and 900, and even more particularly to the second top members 710 and 910 as generally shown in FIGS. 41, 42, and 43. The first side elongated downwardly extending lip 1104 extends over and somewhat adjacent to top member 710 and the second side elongated downwardly extending lip 1106 extends over and somewhat adjacent to top member 910.

The first roof hatch 1100 defines a series of spaced apart openings 1130, 1132, and 1134 that are configured to enable pressurized gas in the cylinder(s) 510 of the first cylinder assembly 500 or a force from any de-compressive venting of any of those cylinders 510 within the railroad car to be directed upwardly and out of the railroad car 10.

Although not shown, the first roof hatch 1100 further includes a plurality of burst panels configured to be connected to the panel 1102 of the first roof hatch 1100 in areas of and covering the respective openings 1130, 1132, and 1134. The burst panels can be configured in any suitable manner. The burst panels are generally configured to give way or burst if there is a build-up of gas pressure inside the railroad car to relieve the internal gas pressure buildup.

In certain embodiments, each of the burst panels is pivotally connected to the panel 1102 by one or more suitable hinges along one edges of that burst panel that enable the burst panel to pivot open when necessary.

In certain such embodiments, the hinge extends along one side portion of the burst panel and includes a creased section or otherwise weakened section that that facilitates the opening of the bursts panel when a suitable force is applied to the interior surface of the burst panel. In certain such embodiments, the burst panel is connected (such as by spot welds) to the panel 1102 of the roof hatch 1100 such that an internal force applied to such burst panel will cause such burst panel to break such connections and pivot open along the crease.

In certain other embodiments, each of such pivotable burst panels is biased to a closed position by one or more biasing mechanisms such as one or more springs. In certain embodiments, the burst panels are made from a mesh material.

In certain other embodiments, each of the burst panels is made from a suitable fabric material that tears open when necessary. In certain other embodiments, each of the burst panels is made from a suitable fabric material supported by a steel mesh material that enables the fabric material to tear open when necessary. In various such embodiments, such fabric material is waterproof to keep water out of the railroad car.

The second roof hatch 1200 is identical or substantially identical to the first roof hatch 1100 (except oppositely positioned) and is thus not described herein for brevity. It should further be appreciated that the second roof hatch 1200 does not need to be identical or substantially identical to the first roof hatch 1100 in accordance with the present disclosure.

The present disclosure provides that: (1) the quantity of roof hatches may vary; (2) the positions of the roof hatches may vary; (3) the shape and configuration of the roof hatches may vary; (4) the material(s) that the roof hatches are made from may vary; and/or (5) the attachment mechanisms used in conjunction with the roof hatches may vary.

The present disclosure provides that: (1) the quantity of burst panels may vary; (2) the positions of the burst panels may vary; (3) the size, shape, and configuration of the burst panels may vary; (4) the material(s) that the burst panels are made from may vary; and/or (5) the attachment mechanisms used in to attach the burst panels to the roof hatches may vary.

Cylinder Force Spreaders

Turning now to FIGS. 46, 47, 48, and 49, one example embodiment of a cylinder force spreader 2000 of the present disclosure is generally illustrated. In this illustrated example embodiment, the cylinder force spreader 2000 includes: (1) a first curved or concave cylinder engagement wall 2010; (2) a second curved or concave cylinder engagement wall 2030; (3) a connector wall 2020; (4) a first end wall 2040; (5) a second end wall 2050; and (6) an interior support structure 2060. The first wall 2010 and the second wall 2030 face in generally opposite directions to engage the outer rounded surfaces of adjacent cylinders.

In this illustrated example embodiment, the first curved cylinder engagement wall 2010 is integrally connected to the connector wall 2020, the first end wall 2040, the second end wall 2050 and the interior support structure 2060. The second curved cylinder engagement wall 2020 is integrally connected to the connector wall 2020, the first end wall 2040, the second end wall 2050 and the interior support structure 2060.

The connector wall 2020 is integrally connected to the first curved cylinder engagement wall 2010, the second curved cylinder engagement wall 2020, the first end wall 2040, the second end wall 2050 and the interior support structure 2060. The first end wall 2040 is integrally connected to the first curved cylinder engagement wall 2010, the second curved cylinder engagement wall 2030, the connector wall 2020, and the interior support structure 2060. The second end wall 2050 is integrally connected to the first curved cylinder engagement wall 2010, the second curved cylinder engagement wall 2030, the connector wall 2020, and the interior support structure 2060. The interior support structure 2060 is integrally connected to the first curved cylinder engagement wall 2010, the connector wall 2020, the second curved cylinder engagement wall 2030, the first end wall 2040, and the second end wall 2050. The support structure 2060 includes a plurality of members (not labeled) that provide the needed support for the first curved cylinder engagement wall 2010, the connector wall 2020, the second curved cylinder engagement wall 2030, the first end wall 2040, and the second end wall 2050.

The cylinder force spreader 2000 is made from a suitable plastic material of similar surface stiffness as the cylinder in this illustrated example embodiment. It should be appreciated that the cylinder force spreader can be made from other suitable materials in accordance with the present disclosure. It should be appreciated that the cylinder force spreader act as insulators.

In various embodiments of the present disclosure, the cylinder force spreaders have a lower melting point than the resin used in the fiberglass of the cylinder wall material.

In various embodiments of the present disclosure, the cylinder force spreaders are spaced out at positions such that they are more likely to absorb heat from below the cylinders than the cylinders themselves.

In various such embodiments of the present disclosure, certain of the cylinders are about an inch off the inside floor of the underframe, a total of about 6 inches above the top of the rail, and about 15 inches above ground level.

In various example embodiments of the present disclosure, the cylinder force spreaders are about 12 inches long and are spaced about 12 inches apart. In various example embodiments of the present disclosure, the curvature of each of the cylinder engagement walls is about 1/16 less than the curvature of the cylinders and is configured to be snuggly fitted to the cylinder (but not too tight).

The cylinder force spreader 2000 is configured to be positioned between two adjacent cylinders of a cylinder assembly such that first curved cylinder engagement wall 2010 engages one of the adjacent cylinders and the second curved cylinder engagement wall 2030 engages the adjacent cylinder.

The cylinder force spreader 2000 is thus configured to be positioned between adjacent cylinders and to spread out the forces at which one cylinder will contact the adjacent cylinder in the event of an accident where the forces of the accident (such as a side penetration) has not been dissipated through the penetration resistant structures of the railroad car 10 such that forces are applied to one or more of the cylinders of the cylinder assemblies. The cylinder force spreader cause the forces between adjacent cylinders to be spread out from along a single line of contact to a substantial portion of the adjacent cylinders. This substantially reduces the risk that adjacent cylinders will contact each other with sufficient force to cause one or both of the cylinders to be damaged to the point of leaking stored compressed gas.

Figure 50:
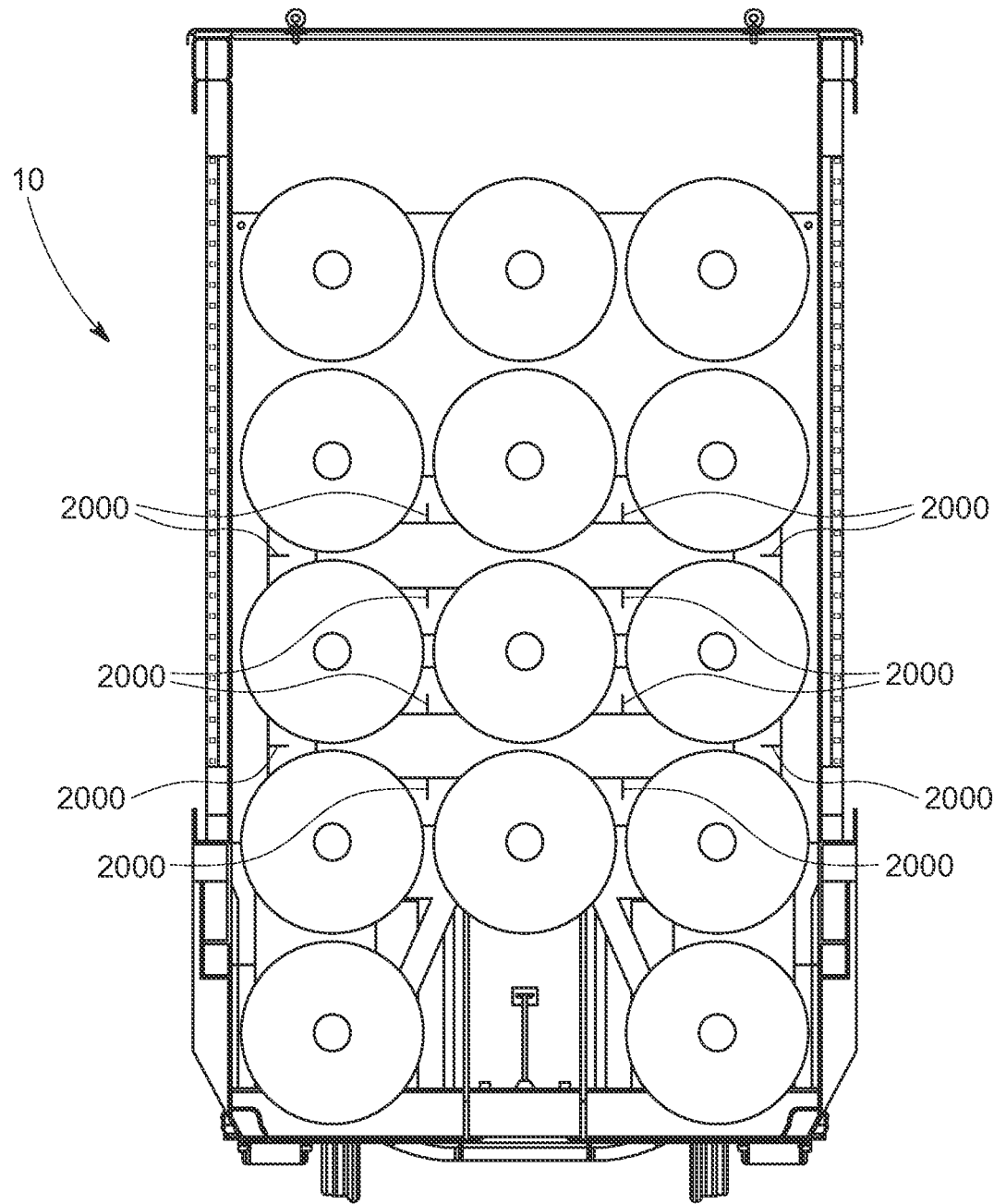
FIG. 50 is a diagrammatic sectional view of the cylinder of the railroad car of FIG. 1 shown with multiple cylinder force spreaders of FIG. 45 employed in various positions relative to the cylinders of one of the cylinder assemblies of the railroad car of FIG. 1.
Figure 51:
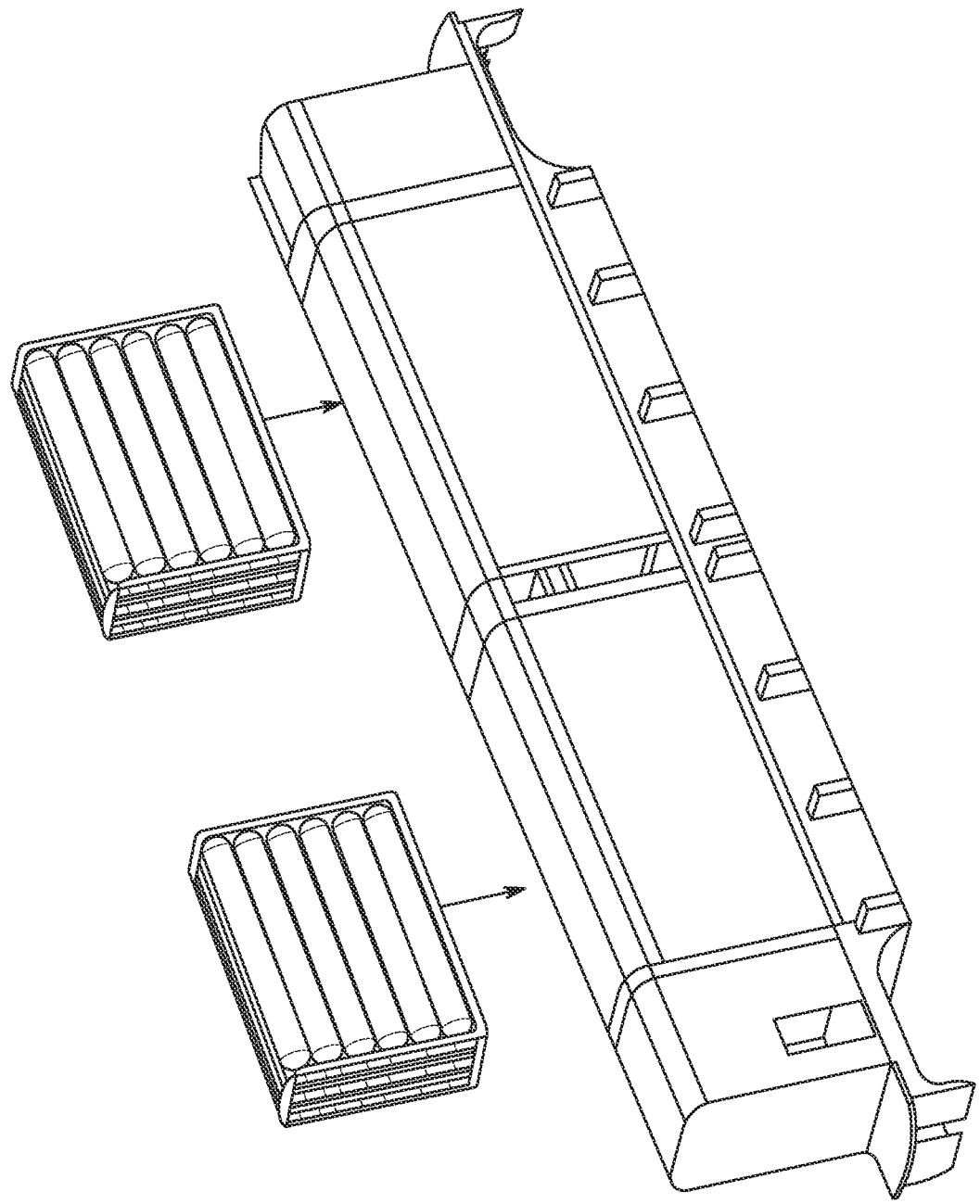
FIG. 51 is a diagrammatic perspective view of another example embodiment of the railroad car of one example alternative embodiment of the present disclosure.
Figure 52A:
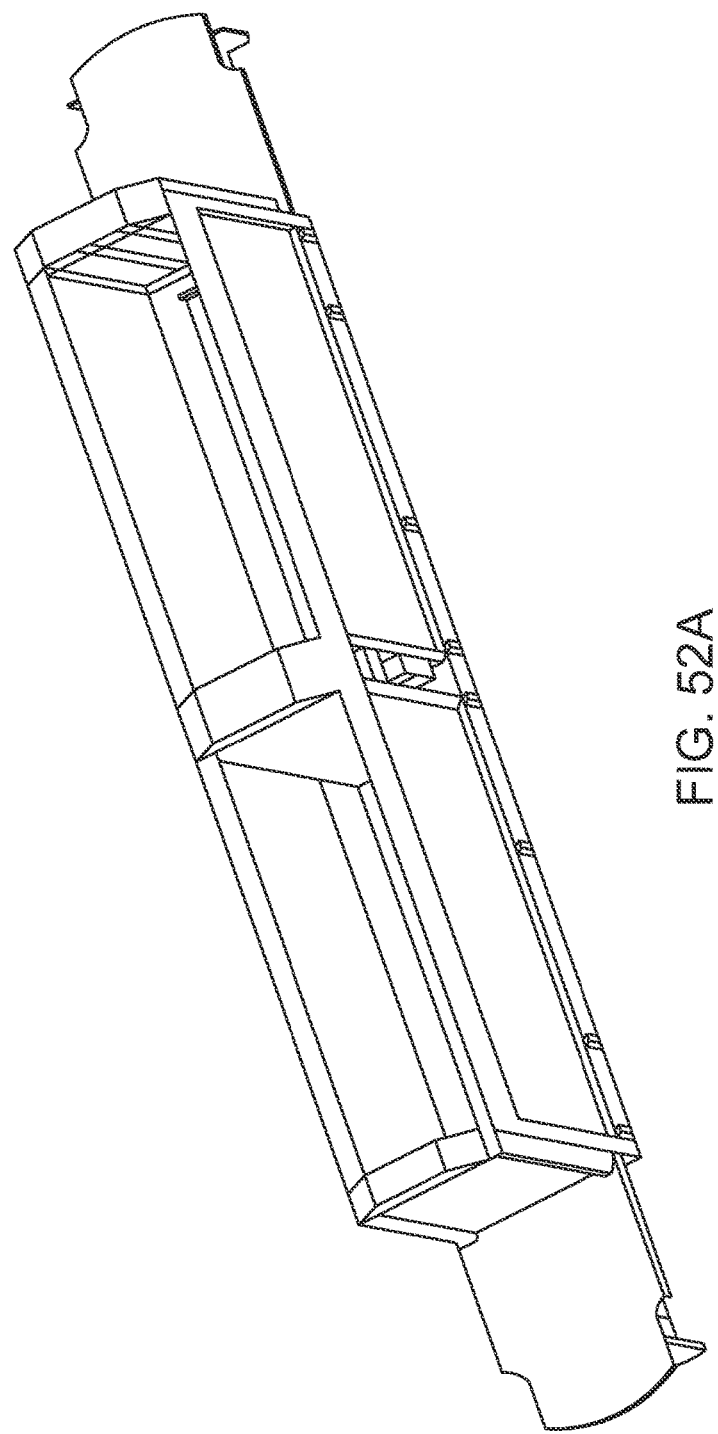
FIG. 52A is a diagrammatic top perspective view of part of the example railroad car of FIG. 51.
Figure 52B:
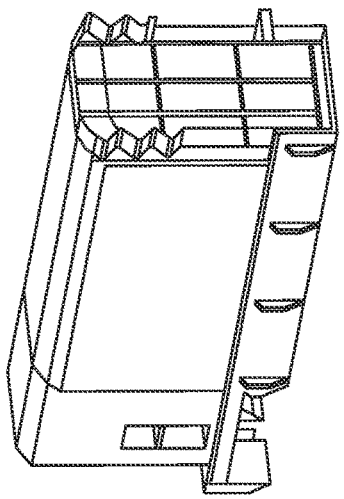
FIG. 52B is a diagrammatic fragmentary perspective view of part of the example railroad car of FIG. 51.
Figure 53:
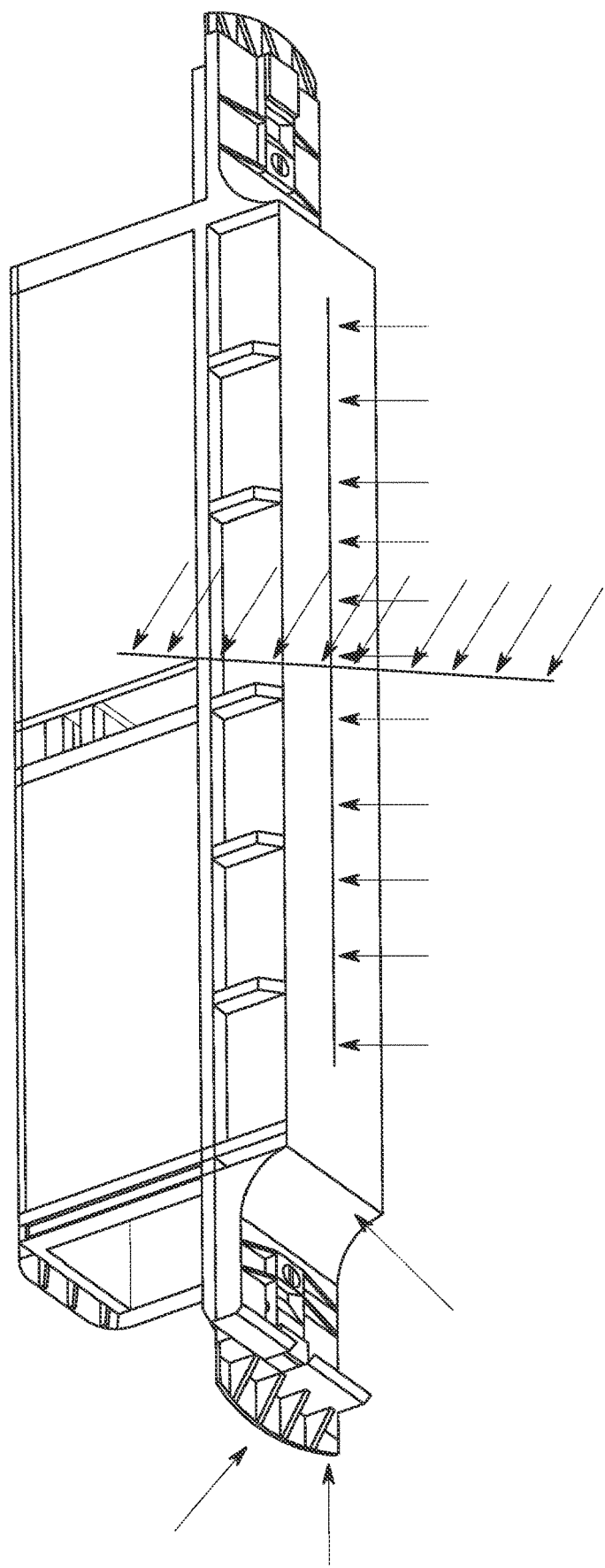
FIG. 53 is a diagrammatic side perspective view of part of the example railroad car of FIG. 51.

It should be appreciated that each of the cylinder assemblies 500 and 600 will include multiple spaced apart cylinder force spreaders 2000 in accordance with the present disclosure. For example, as shown in FIG. 50, the railroad car 10 includes a plurality of cylinder force spreaders 2000 positioned between various of the cylinders 510 of the cylinder assembly 500.

The present disclosure provides that: (1) the quantity of cylinder force spreaders may vary; (2) the positions of the cylinder force spreaders may vary; (3) the size, shape, and configuration of the cylinder force spreaders may vary; (4) the material(s) that the cylinder force spreaders are made from may vary; and/or (5) the attachment mechanisms used in conjunction with the cylinder force spreaders may vary.

Cylinder Force Spreader Support Members

It should be appreciated that in various embodiments of the present disclosure, each of the cylinder assemblies 500 and 600 will include support members (not shown) for supporting the cylinder force spreaders such as the multiple spaced apart cylinder force spreaders 2000 in that cylinder assembly.

In various example embodiments of the present disclosure, the support member include a plurality of light cables that runs through openings (not shown) defined by the cylinder forces spreaders and are suitably coupled at each end to the spaced apart racks of the cylinder assembly.

The present disclosure provides that: (1) the quantity of cylinder force spreader support members may vary; (2) the positions of the cylinder force spreader support members may vary; (3) the size, shape, and configuration of the cylinder force spreader support members may vary; (4) the material(s) that the cylinder force spreader support members are made from may vary; and/or (5) the attachment mechanisms used in conjunction with the cylinder force spreader support members may vary.

Other Components and Other Variations

In various embodiments of the present disclosure, the railroad car includes various seamless gas piping or pipes (not shown) that reduce the likelihood that such pipes will rupture in an accident. In various such embodiments of the present disclosure, certain of the various seamless gas piping or pipes are positioned in the belly or pocket of the underframe to protect such pipes from rupturing in an accident. In various example embodiments, the piping or pipes includes one or more bends without welded or other similar connections. This reduces the risk or weld or connection failure.

In various embodiments of the present disclosure, the railroad car includes multiple opposing vents (or vent stacks) (not shown) that facilitate venting of gas from inside of the railroad car. In various such embodiments, the vents (or vent stacks) are configured to facilitate the venting of gas even in accidents where the railroad car has rolled over on either side. In various example embodiments, the top end of each vent is configured to enable gas to escape the railroad car if the railroad car has rolled over on the opposite side of the vent (e.g., the top end is faced upward or in another suitable position when the railroad car is laying on the opposite side of the vent).

In various such embodiments, the vents (or vent stacks) are positioned at a central location in the railroad car, and are connected to the center bulkhead 400 and protected by the center bulkhead 400. The vents (or vent stacks) are located at the center of the railroad car to provide an adequate distance from possible ignitions sources such as any electrical components in the end compartments and the one or more locomotives coupled to the railroad car.

In various embodiments of the present disclosure, the railroad car includes one or more normally closed solenoid valves coupled to the inside end of every cylinder. These normally closed valves close whenever power is removed. Thus, any event that interrupts power shuts down the flow of gas from all the cylinders. For example, an accident that disconnects the locomotive would cause the railroad car to power down.

In various embodiments of the present disclosure, any accident (including any incident) that causes anything unexpected in the internal gas pressure measurements will result in a command to close all the valves.

In various embodiments of the present disclosure, the railroad car includes one or more emergency shut off switches that will power down the railroad car including the valves which causes such valves to close.

In various embodiments of the present disclosure, various of the safety critical valves include the fill valves used to fill the cylinders with gas. In various such embodiments, these valves are relatively large about 1 inch ball valves that are actuated by air operated solenoid valves. In various embodiments of the present disclosure, these valves, when closed, prevent gas from moving out to the fill housing quick disconnects. In various embodiments of the present disclosure, these valves are closed all the time, except when the cylinders of the railroad car are actually being filled. In various embodiments of the present disclosure, these valves are normally closed and closed whenever power or air pressure is removed. In various embodiments of the present disclosure, the valves are positioned in the belly of the underframe or the center bulkhead.

FIGS. 51, 52A, 52B, and 53 generally illustrate an example alternative railroad car with penetration resistant and protective structures of another example embodiment of the present disclosure. In this embodiment, the underframe, the bulkheads, and the side walls are alternatively configured. It should be appreciated from this example, that various combinations of the above described components may be implemented in various different combinations for a railroad car that functions as a fuel tender.

Figure 54A:
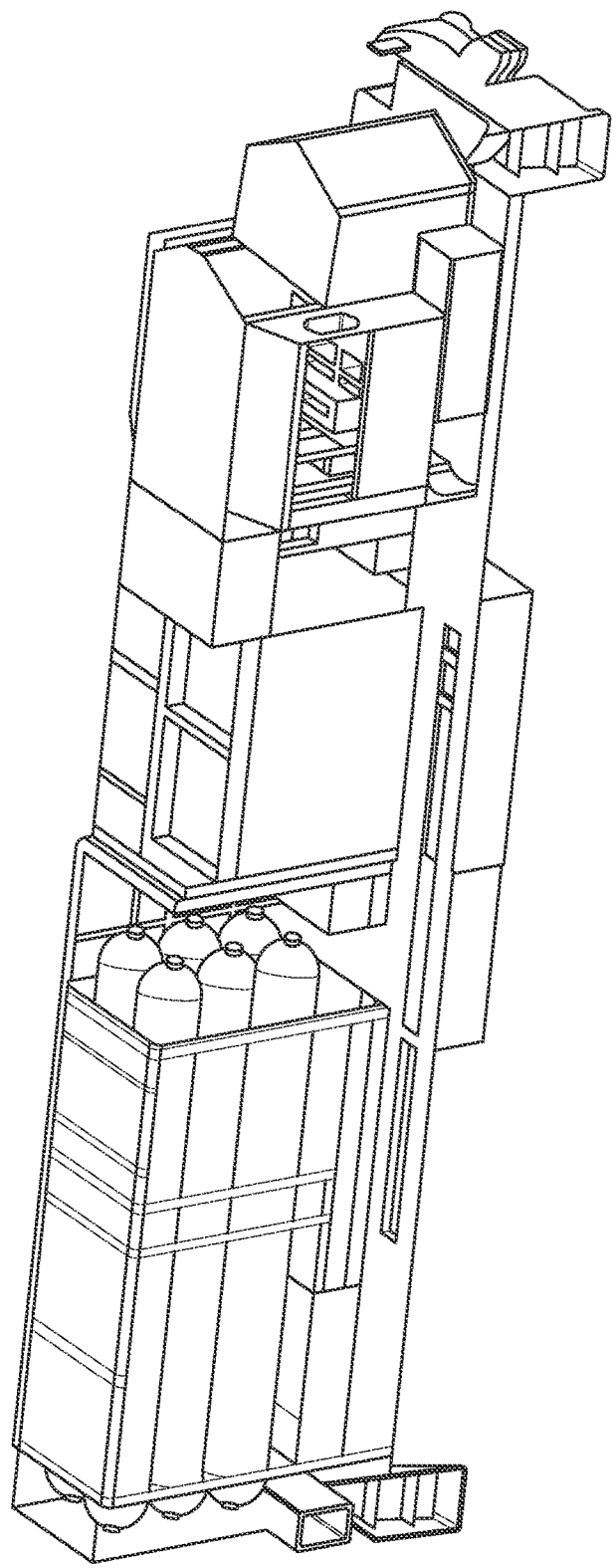
FIG. 54A is a diagrammatic perspective view of another example alternative embodiment of a railroad car of the present disclosure that also functions as a locomotive.
Figure 54B:
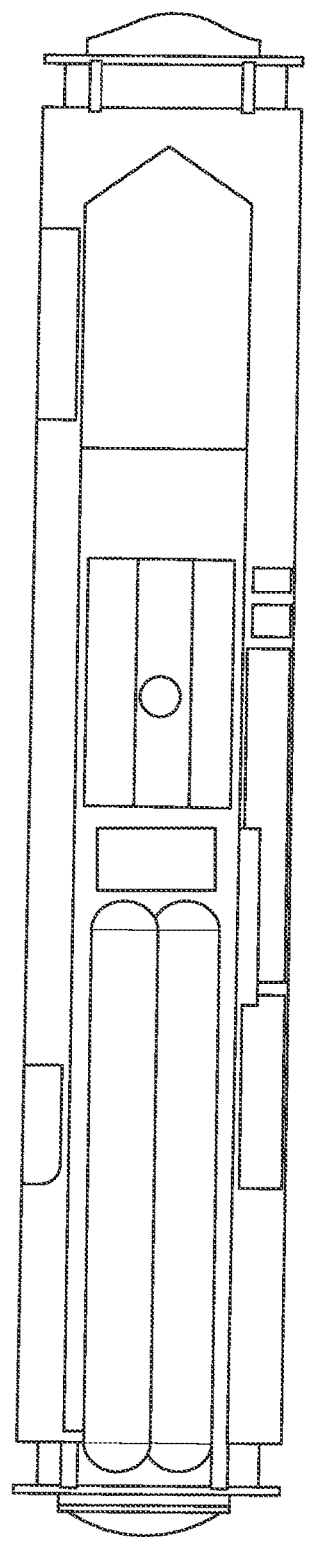
FIG. 54B is a diagrammatic top view of the example railroad car of FIG. 54A.

FIGS. 54A and 54B generally illustrate another alternative railroad car with penetration resistant and protective structures of another example embodiment of the present disclosure. In this embodiment, certain of the components described above are implemented in a locomotive railroad car. It should be appreciated from this example, that various combinations of the above described components may be implemented in various different combinations for a railroad car that functions as a locomotive.

It should further be appreciated that one or more of the penetration resistant and protective structures of the present disclosure can be employed in other suitable content transport devices such as shipping containers.

It should be appreciated that the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or".

Various other changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A railroad car comprising:
a first truck;
a second truck;
a underframe supported by the first truck and the second truck;
a first end bulkhead connected to the underframe, the first end bulkhead including a first cylinder rack receiver;
a second bulkhead connected to the underframe, the second end bulkhead including a second cylinder rack receiver;
a center bulkhead connected to the underframe, the center bulkhead including a third cylinder rack receiver and a fourth cylinder rack receiver;
a first cylinder assembly connected to the first end bulkhead and to the center bulkhead, the first cylinder assembly including a plurality of elongated first cylinders, a first cylinder holder rack received by the first cylinder rack receiver, a second cylinder holder rack received by the third cylinder rack receiver, and a plurality of spaced apart first cylinder force spreaders, each first cylinder force spreader positioned between two of the first cylinders; and
a second cylinder assembly connected to the second end bulkhead and to the center bulkhead, the second cylinder assembly including a plurality of elongated second cylinders, a third cylinder holder rack received by the second cylinder rack receiver, a fourth cylinder holder rack received by the fourth cylinder rack receiver, and a plurality of spaced apart second cylinder force spreaders, each second cylinder force spreader positioned between two of the second cylinders.

2. The railroad car of claim 1, wherein each cylinder force spreader includes: (i) a first concave cylinder engagement wall; (ii) a second concave cylinder engagement wall; (iii) a connector wall; (iv) a first end wall; (v) a second end wall; and (vi) an interior support structure, wherein the first wall and the second wall face in opposite directions such that they are engagable by outer rounded surfaces of two adjacent cylinders of the respective cylinder assembly.

3. The railroad car of claim 2, wherein for each cylinder force spreader, the support structure includes a plurality of members that support for the first concave cylinder engagement wall, the connector wall, the second concave cylinder engagement wall, the first end wall, and the second end wall.

4. The railroad car of claim 1, wherein for one of the cylinder force spreaders, a radius of curvature of a cylinder engagement wall of the cylinder force spreader is different than a radius of curvature of a wall of the cylinder adjacent to the cylinder force spreader.

5. The railroad car of claim 1, wherein each cylinder force spreader is made from a plastic material.

6. The railroad car of claim 1, wherein each cylinder force spreader is positioned between two respective adjacent cylinders to spread out forces at which said cylinders will contact each other from along a single line of contact to a substantial portion of the two adjacent cylinders.

7. The railroad car of claim 1, wherein each of the cylinder assemblies includes a plurality of support members that support the plurality of force spreaders.

8. The railroad car of claim 1, wherein the first cylinder assembly is configured to allow the cylinders to detach from one or both of the first and second cylinder holder racks and to enable the first cylinders to bunch up to absorb certain forces to prevent rupturing of the first cylinders.

9. A railroad car comprising:
a first truck;
a second truck;
an underframe supported by the first truck and the second truck;
a first bulkhead connected to the underframe;
a second bulkhead connected to the underframe; and
a cylinder assembly connected to the first bulkhead and to the second bulkhead, the cylinder assembly including a plurality of elongated cylinders and a plurality of spaced apart cylinder force spreaders, wherein each cylinder force spreader is positioned between two of the cylinders, wherein for one of the cylinder force spreaders, a radius of curvature of a cylinder engagement wall of that cylinder force spreader is different than a radius of curvature of a wall of the cylinder of the plurality of elongated cylinders adjacent to that cylinder force spreader.

10. The railroad car of claim 9, wherein each cylinder force spreader includes: (i) a first concave cylinder engagement wall; (ii) a second concave cylinder engagement wall; (iii) a connector wall; (iv) a first end wall; (v) a second end wall; and (vi) an interior support structure, wherein the first wall and the second wall face in opposite directions such that they are engagable by outer rounded surfaces of adjacent cylinders of the cylinder assembly.

11. The railroad car of claim 10, wherein for each cylinder force spreader, the support structure includes a plurality of members that support for the first concave cylinder engagement wall, the connector wall, the second concave cylinder engagement wall, the first end wall, and the second end wall.

12. The railroad car of claim 9, wherein each cylinder force spreader is made from a plastic material.

13. The railroad car of claim 9, wherein each cylinder force spreader is positioned between two adjacent cylinders to spread out forces at which the two adjacent cylinders will contact each other from along a single line of contact to a substantial portion of the two adjacent cylinders.

14. A railroad car cylinder force spreader comprising:
a first concave cylinder engagement wall;
a second concave cylinder engagement wall, wherein the first concave cylinder engagement wall and the second concave cylinder engagement wall face in opposite directions and are engagable by outer rounded surfaces of two adjacent cylinders of a cylinder assembly;
a connector wall;
a first end wall;
a second end wall; and
an interior support structure,
wherein the railroad car cylinder force spreader is positionable between the two adjacent cylinders of the cylinder assembly such that first concave cylinder engagement wall can be engaged one of the two adjacent cylinders and the second concave cylinder engagement wall can be engaged the other of the two adjacent cylinders, wherein a radius of curvature of each of the cylinders engagement walls is different than the radius of curvatures of the cylinders configured to engage the cylinder engagement walls.

15. The railroad car cylinder force spreader of claim 14, which is positionable to spread out forces between the two adjacent cylinders from along a single line of contact to along substantial portions of the two adjacent cylinders.

16. The railroad car cylinder force spreader of claim 14, wherein (i) the first concave cylinder engagement wall is connected to the connector wall, the first end wall, the second end wall, and the interior support structure, and (ii) the second concave cylinder engagement wall is connected to the connector wall, the first end wall, the second end wall, and the interior support structure.

17. The railroad car cylinder force spreader of claim 14, wherein the interior support structure includes a plurality of members that support for the first concave cylinder engagement wall, the connector wall, the second concave cylinder engagement wall, the first end wall, and the second end wall.

18. The railroad car cylinder force spreader of claim 14, which is made from a plastic material.

* * * * *